US009736004B2

United States Patent
Jung et al.

(10) Patent No.: US 9,736,004 B2
(45) Date of Patent: *Aug. 15, 2017

(54) METHODS AND SYSTEMS FOR MANAGING DEVICE DATA

(71) Applicant: Elwha LLC, Bellevue, WA (US)

(72) Inventors: Edward K. Y. Jung, Bellevue, WA (US); Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 646 days.

This patent is subject to a terminal disclaimer.

(21) Appl. No.: 13/692,829

(22) Filed: Dec. 3, 2012

(65) Prior Publication Data

US 2014/0122719 A1 May 1, 2014

(51) Int. Cl.
*H04L 12/24* (2006.01)
*H04L 29/06* (2006.01)
(Continued)

(52) U.S. Cl.
CPC .......... *H04L 29/0602* (2013.01); *G06F 21/60* (2013.01); *G06F 21/6218* (2013.01); *G06F 21/6254* (2013.01); *H04L 29/06* (2013.01); *H04L 29/06551* (2013.01); *H04L 29/08072* (2013.01); *H04L 29/0899* (2013.01); *H04L 41/00* (2013.01); *H04L 41/5054* (2013.01); *H04L 63/10* (2013.01); *H04L 67/16* (2013.01);
(Continued)

(58) Field of Classification Search
CPC ...... H04L 29/0602; H04L 63/10; G06F 21/60
See application file for complete search history.

(56) References Cited

U.S. PATENT DOCUMENTS 6,029,175 A 2/2000 Chow et al.
6,122,520 A 9/2000 Want et al.
(Continued)

FOREIGN PATENT DOCUMENTS

| EP | 1818807 A | 8/2007 | |
|---|---|---|---|
| WO | WO 01/28273 | * 4/2001 | ............... H04Q 7/38 |
| WO | WO 01/28273 A1 | 4/2001 | |

OTHER PUBLICATIONS

Zhou, Yajin et al., "Taming Information-Stealing Smartphone Applications (on Android)," Proceedings of the 4th Conference on Trust and Trustworthy Computing, Pittsburgh, PA, Jun. 2011, 15 pages.
(Continued)

*Primary Examiner* — Brandon Hoffman
*Assistant Examiner* — Wasika Nipa

(57) ABSTRACT

Computationally implemented methods and systems include acquiring an offer to facilitate execution of one or more services that utilize a particular portion of a device, in exchange for access to the particular portion of the device, determining whether to accept the offer to facilitate execution of the one or more services and grant access to the particular portion of the device, and facilitating access to the particular portion upon a determination to accept the offer to facilitate the execution of the one or more services. In addition to the foregoing, other aspects are described in the claims, drawings, and text.

47 Claims, 33 Drawing Sheets

(51) Int. Cl.
  *H04L 29/08* (2006.01)
  *G06F 21/60* (2013.01)
  *G06F 21/62* (2013.01)
(52) U.S. Cl.
  CPC ............. *H04L 67/18* (2013.01); *H04L 67/32* (2013.01); *G06F 2221/2107* (2013.01); *G06F 2221/2111* (2013.01); *G06F 2221/2117* (2013.01); *G06F 2221/2141* (2013.01); *G06F 2221/2149* (2013.01); *G06F 2221/2153* (2013.01)

(56) References Cited

U.S. PATENT DOCUMENTS

| | | | |
|---|---|---|---|
| 6,871,277 B1 * | 3/2005 | Keronen | 713/167 |
| 7,178,034 B2 | 2/2007 | Cihula et al. | |
| 7,203,752 B2 | 4/2007 | Rice et al. | |
| 7,269,853 B1 | 9/2007 | Dunn | |
| 7,496,652 B2 | 2/2009 | Pezzutti | |
| 7,647,164 B2 | 1/2010 | Reeves | |
| 7,685,238 B2 * | 3/2010 | Etelapera | 709/205 |
| 7,849,311 B2 | 12/2010 | Donlin et al. | |
| 7,860,807 B2 | 12/2010 | Kaneko et al. | |
| 7,873,957 B2 | 1/2011 | Nallipogu et al. | |
| 7,913,312 B2 | 3/2011 | de Jong | |
| 7,917,154 B2 | 3/2011 | Fortescue et al. | |
| 7,996,682 B2 | 8/2011 | Schutz et al. | |
| 8,364,389 B2 | 1/2013 | Dorogusker et al. | |
| 8,387,155 B2 | 2/2013 | Gregg et al. | |
| 8,504,729 B2 | 8/2013 | Pezzutti | |
| 8,554,608 B1 | 10/2013 | O'Connor | |
| 8,578,483 B2 | 11/2013 | Seshadri et al. | |
| 8,630,494 B1 | 1/2014 | Svendsen | |
| 8,756,321 B2 | 6/2014 | Clark et al. | |
| 8,838,751 B1 | 9/2014 | Scofield et al. | |
| 9,047,648 B1 | 6/2015 | Lekutai et al. | |
| 2001/0025316 A1 | 9/2001 | Oh | |
| 2002/0032798 A1 | 3/2002 | Xu | |
| 2003/0023726 A1 | 1/2003 | Rice et al. | |
| 2003/0045308 A1 | 3/2003 | Sidhu et al. | |
| 2003/0191877 A1 | 10/2003 | Zaudtke et al. | |
| 2004/0002902 A1 | 1/2004 | Muehlhaeuser | |
| 2004/0036611 A1 | 2/2004 | Kidney et al. | |
| 2004/0128500 A1 | 7/2004 | Cihula et al. | |
| 2004/0230835 A1 | 11/2004 | Goldfeder et al. | |
| 2005/0182825 A1 | 8/2005 | Eytchison | |
| 2005/0278342 A1 | 12/2005 | Abdo et al. | |
| 2006/0010047 A1 | 1/2006 | Minor | |
| 2007/0006321 A1 | 1/2007 | Bantz et al. | |
| 2007/0044143 A1 | 2/2007 | Zhu et al. | |
| 2007/0113079 A1 | 5/2007 | Ito et al. | |
| 2007/0136466 A1 | 6/2007 | Etelapera | |
| 2007/0142727 A1 | 6/2007 | Zhang et al. | |
| 2007/0232268 A1 | 10/2007 | Park et al. | |
| 2007/0273583 A1 | 11/2007 | Rosenberg | |
| 2008/0046886 A1 | 2/2008 | Brown et al. | |
| 2008/0102856 A1 | 5/2008 | Fortescue et al. | |
| 2008/0126541 A1 | 5/2008 | Rosenberg et al. | |
| 2008/0153670 A1 | 6/2008 | McKirdy et al. | |
| 2008/0189793 A1 | 8/2008 | Kirkup et al. | |
| 2008/0207232 A1 | 8/2008 | Rice et al. | |
| 2008/0229389 A1 | 9/2008 | Singh et al. | |
| 2009/0077085 A1 | 3/2009 | Olivieri et al. | |
| 2010/0024020 A1 | 1/2010 | Baugher et al. | |
| 2010/0070475 A1 | 3/2010 | Chen | |
| 2010/0082237 A1 | 4/2010 | Black | |
| 2010/0107225 A1 | 4/2010 | Spencer et al. | |
| 2010/0324819 A1 | 12/2010 | Nurminen et al. | |
| 2011/0018759 A1 | 1/2011 | Bennett et al. | |
| 2011/0022468 A1 | 1/2011 | Muster et al. | |
| 2011/0099040 A1 | 4/2011 | Felt et al. | |
| 2011/0128568 A1 | 6/2011 | Bhogal et al. | |
| 2011/0136472 A1 | 6/2011 | Rector et al. | |
| 2011/0145089 A1 | 6/2011 | Khunger et al. | |
| 2011/0179366 A1 * | 7/2011 | Chae | 715/764 |
| 2011/0190009 A1 | 8/2011 | Gerber, Jr. et al. | |
| 2011/0209221 A1 | 8/2011 | Hanson et al. | |
| 2011/0243553 A1 | 10/2011 | Russell | |
| 2011/0274011 A1 | 11/2011 | Stuempert et al. | |
| 2011/0295899 A1 | 12/2011 | James et al. | |
| 2011/0313804 A1 | 12/2011 | Camp et al. | |
| 2012/0036345 A1 | 2/2012 | Chen et al. | |
| 2012/0054841 A1 | 3/2012 | Schultz et al. | |
| 2012/0084247 A1 | 4/2012 | Aguera y Arcas et al. | |
| 2012/0089465 A1 | 4/2012 | Froloff | |
| 2012/0096080 A1 | 4/2012 | Levesque et al. | |
| 2012/0101952 A1 | 4/2012 | Raleigh et al. | |
| 2012/0117232 A1 | 5/2012 | Brown et al. | |
| 2012/0143662 A1 * | 6/2012 | Heath | 705/14.5 |
| 2012/0185912 A1 * | 7/2012 | Lee et al. | 726/1 |
| 2012/0197852 A1 | 8/2012 | Dutta et al. | |
| 2012/0209923 A1 | 8/2012 | Mathur et al. | |
| 2012/0222083 A1 | 8/2012 | Vaha-Sipila et al. | |
| 2012/0291101 A1 | 11/2012 | Ahlstrom et al. | |
| 2012/0293465 A1 | 11/2012 | Nandu et al. | |
| 2012/0317565 A1 | 12/2012 | Carrara et al. | |
| 2013/0014212 A1 | 1/2013 | Cohen | |
| 2013/0046632 A1 | 2/2013 | Grigg et al. | |
| 2013/0054139 A1 | 2/2013 | Bodin et al. | |
| 2013/0110854 A1 | 5/2013 | Lockhart et al. | |
| 2013/0124546 A1 | 5/2013 | Wormley et al. | |
| 2013/0179244 A1 | 7/2013 | Laffoon et al. | |
| 2013/0179988 A1 | 7/2013 | Bekker et al. | |
| 2013/0219461 A1 | 8/2013 | Esaki et al. | |
| 2013/0232573 A1 | 9/2013 | Saidi et al. | |
| 2013/0263000 A1 | 10/2013 | Lucas et al. | |
| 2013/0263206 A1 | 10/2013 | Nefedov et al. | |
| 2013/0282227 A1 | 10/2013 | Chen et al. | |
| 2013/0290359 A1 | 10/2013 | Eronen et al. | |
| 2013/0318627 A1 | 11/2013 | Lundkvist et al. | |
| 2013/0339234 A1 | 12/2013 | Prakash et al. | |
| 2014/0006616 A1 | 1/2014 | Aad et al. | |
| 2014/0031959 A1 | 1/2014 | Glode et al. | |
| 2014/0047062 A1 | 2/2014 | Krueger et al. | |
| 2014/0059695 A1 | 2/2014 | Parecki et al. | |
| 2014/0074570 A1 | 3/2014 | Hope et al. | |
| 2014/0122890 A1 | 5/2014 | Prot | |
| 2014/0123300 A1 | 5/2014 | Jung et al. | |
| 2014/0195349 A1 | 7/2014 | Muster et al. | |
| 2015/0222641 A1 | 8/2015 | Lu et al. | |

OTHER PUBLICATIONS

PCT International Search Report; International App. No. PCT/US14/19562; Jun. 10, 2014; pp. 1-2.
Reddy et al.; "Biketastic: Sensing and Mapping for Better Biking"; CHI 2010; Apr. 10-15, 2010; pp. 1-4; ACM; located at http://research.cens.ucla.edu/people/estrin/resources/conferences/2010apr-Reddy-Shilton-Biketastic.pdf.
Holder, Joseph; "BlackBerry 101—Application permissions"; bearing a date of Dec. 31, 2010; printed on Sep. 28, 2016; pp. 1-6.
Extended European Search Report; European App. No. EP 14 75 7393; Oct. 13, 2016 (received by our Agent on Oct. 14, 2016); pp. 1-8.
Tasker; "Total Automation for Android"; User Guide, Jul. 5, 2012;14 pages; located at: http://tasker.dinglisch.net/.
Beresford et al.; "MockDroid: trading privacy for application functionality on smartphones"; Hotmobile '11; Mar. 1-3, 2011; pp. 49-54.
Hildenbrand, Jerry; "Android app permissions-How Google gets it right . . . "; bearing a date of Feb. 2012; printed on Apr. 1, 2017; pp. 1-22; located at: http://www.androidcentral.com/android-permissions-privacy-security.

* cited by examiner

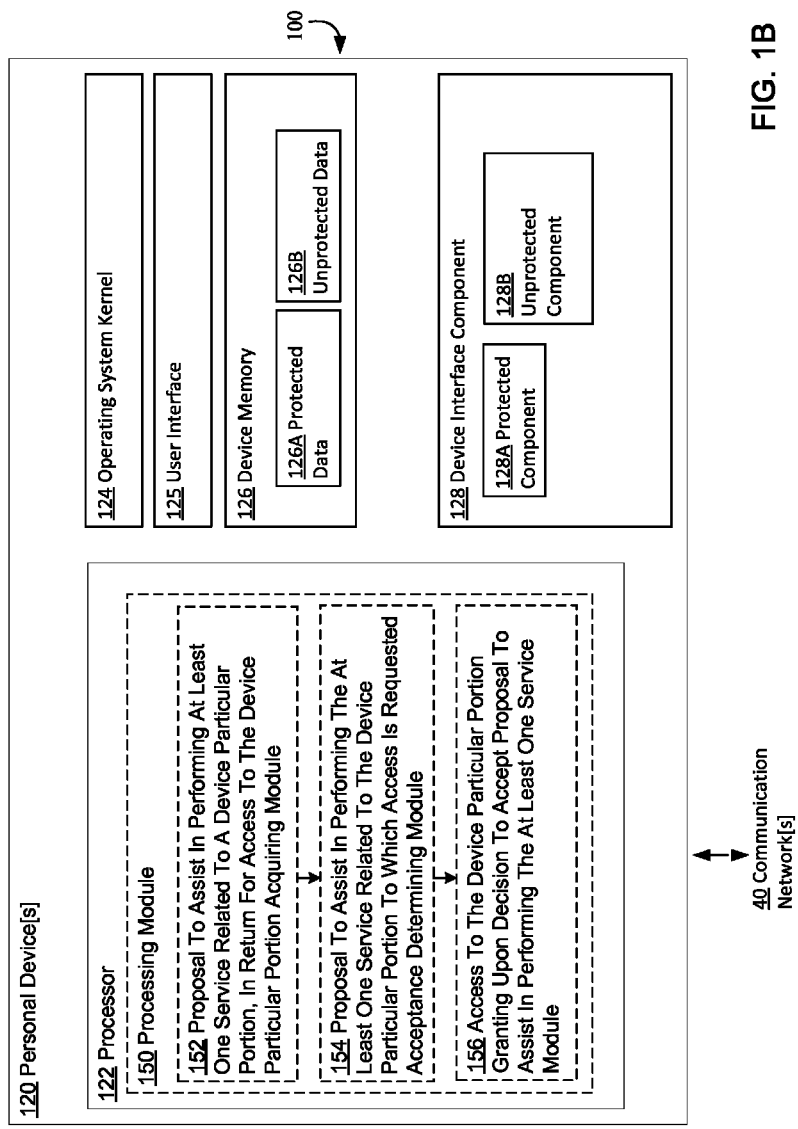

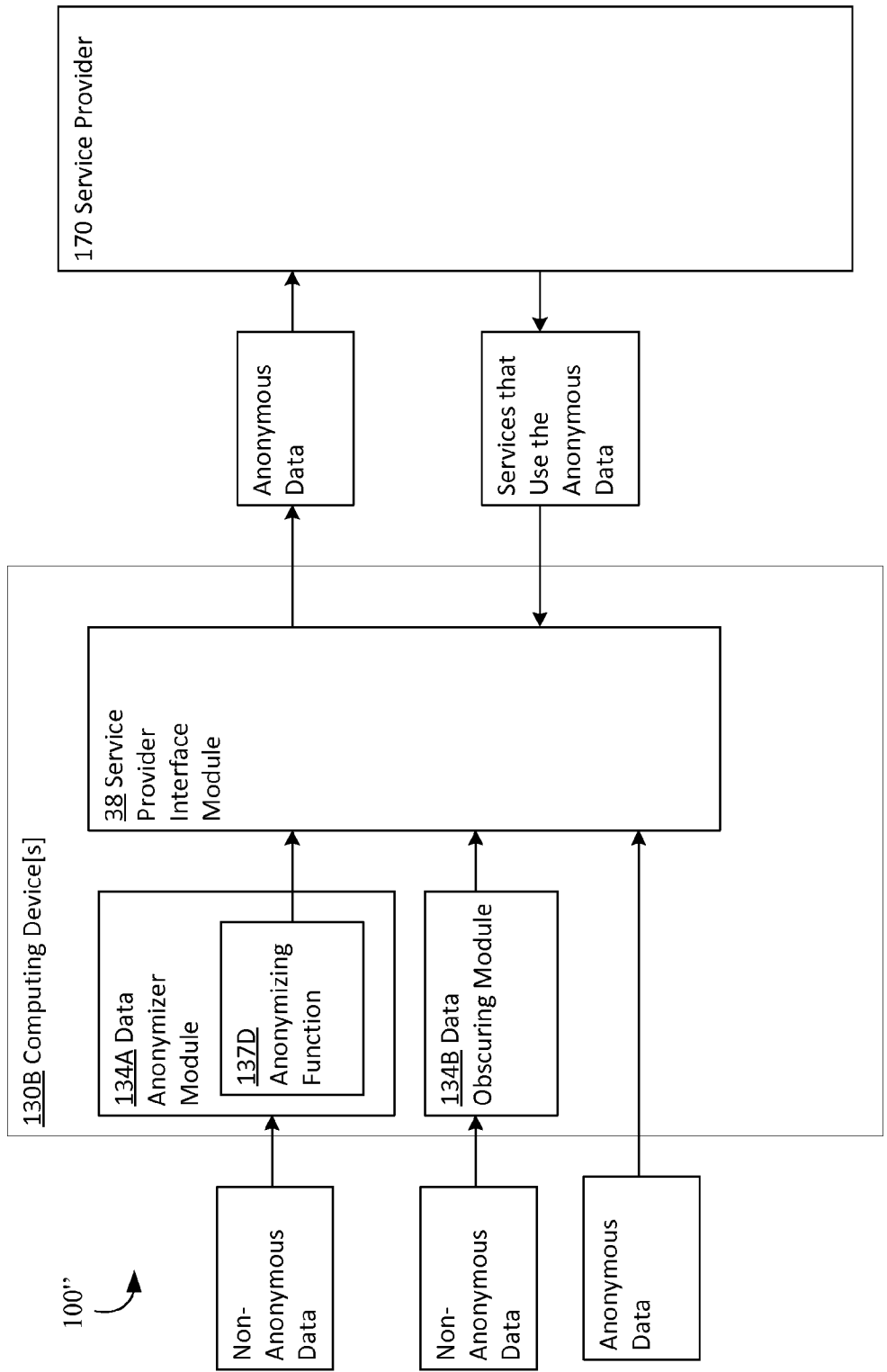

| Fig. 2A | Fig. 2B | Fig. 2C | Fig. 2D | Fig. 2E |

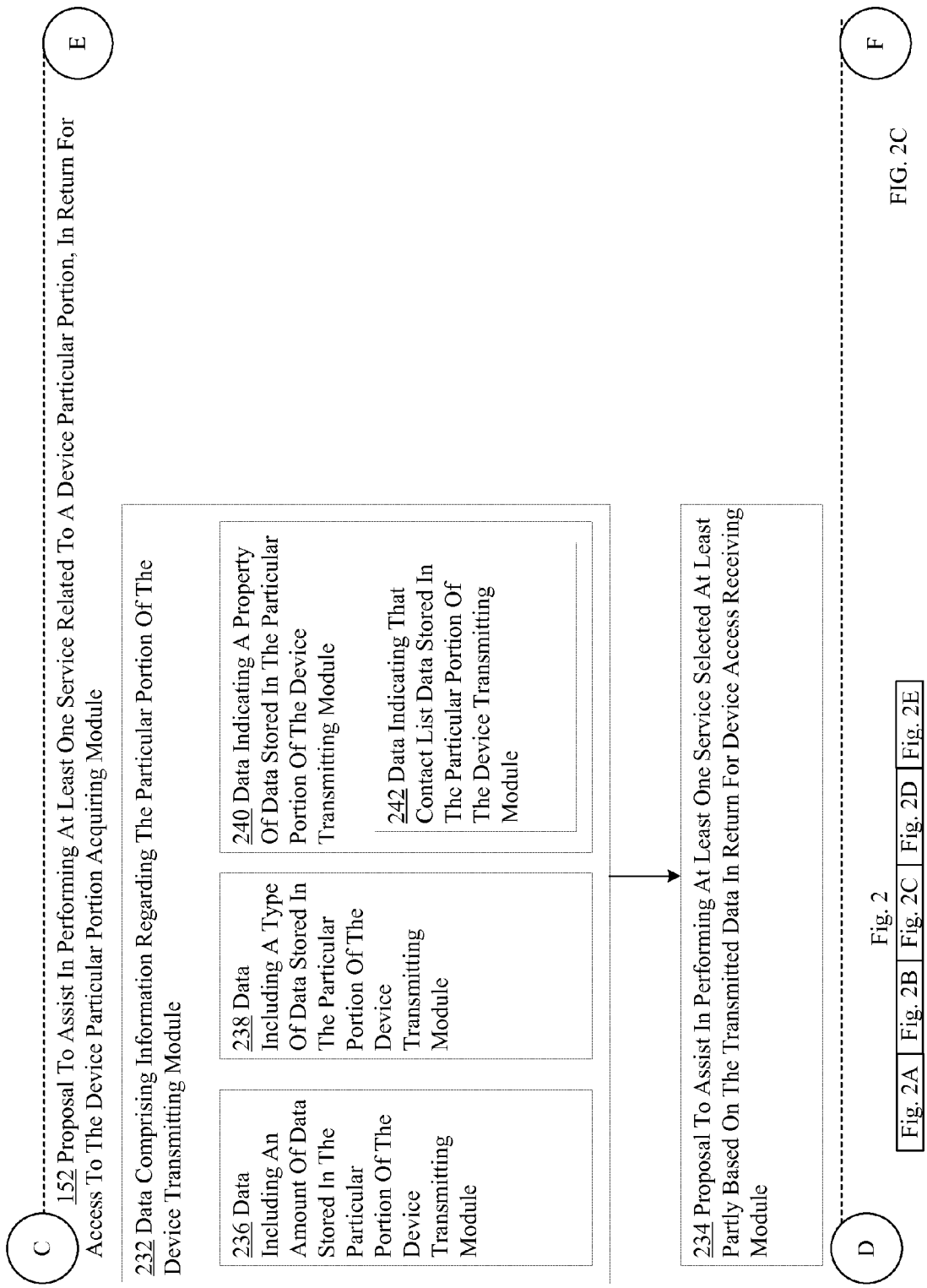

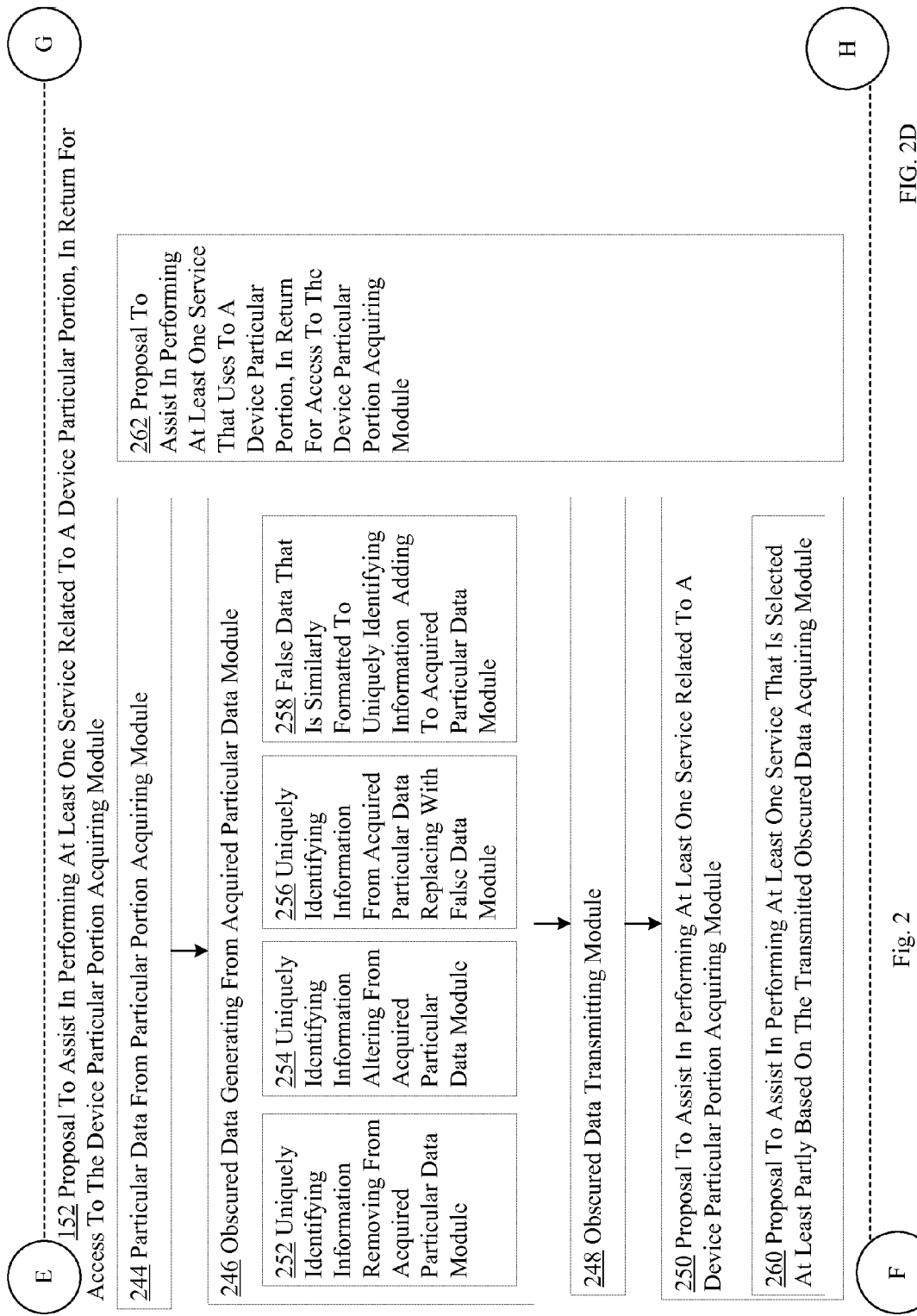

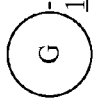
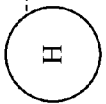

152 Proposal To Assist In Performing At Least One Service Related To A Device Particular Portion, In Return For Access To The Device Particular Portion Acquiring Module 264 Proposal To Assist In Performing At Least One Service Using The Device Particular Portion, In Return For Access To The Device Particular Portion Acquiring Module 266 Proposal To Assist In Performing At Least One Service That Uses To A Device Particular Portion, In Return For Access To The Device Particular Portion Acquiring Module 268 Proposal To Assist In Performing At Least One Service That Uses To A Device Particular Portion, In Return For Access To The Device Particular Portion Acquiring Module

Fig. 2

| Fig. 2A | Fig. 2B | Fig. 2C | Fig. 2D | Fig. 2E |

FIG. 2E

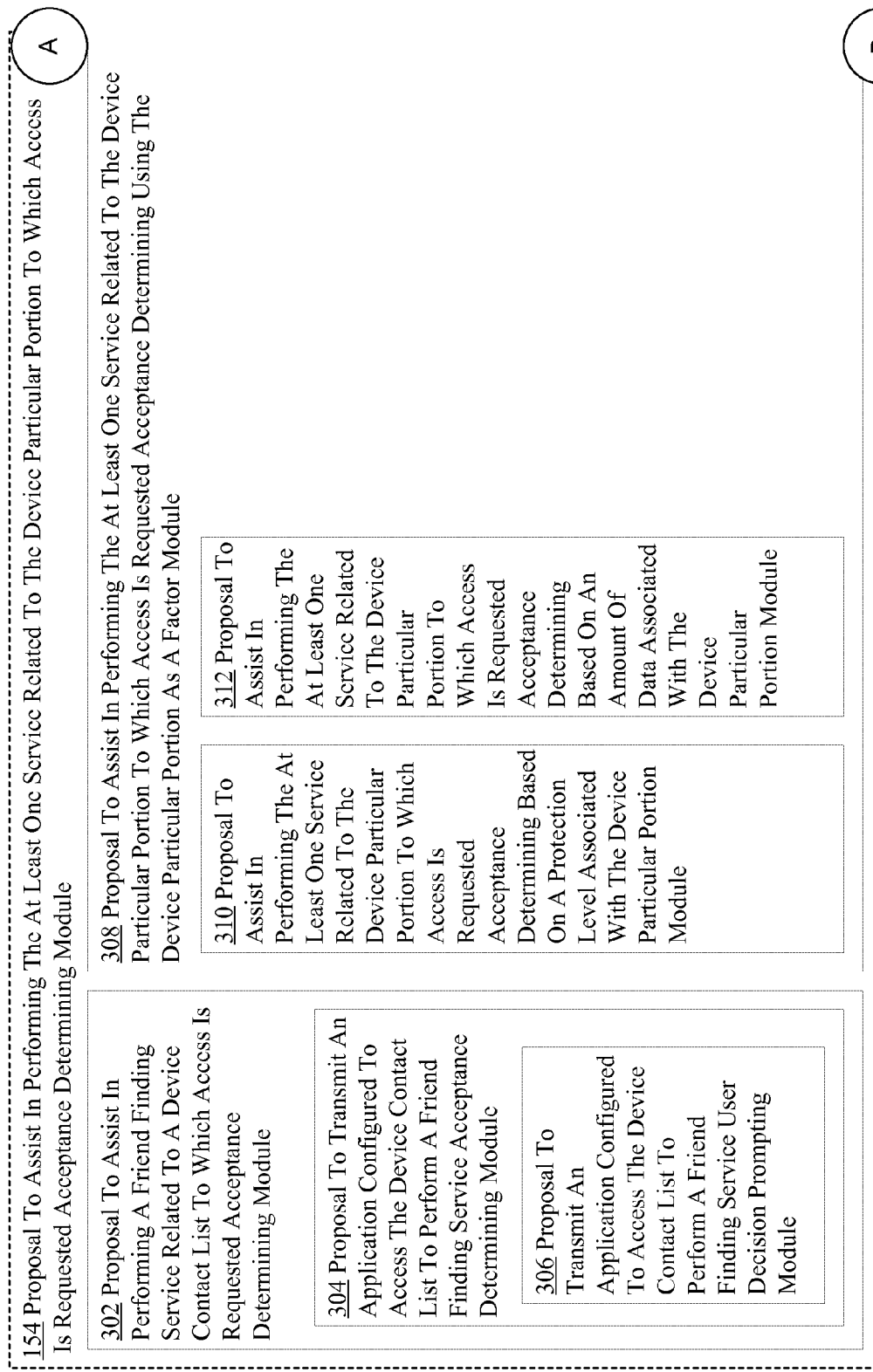

| Fig. 3A | Fig. 3B | Fig. 3C | Fig. 3D | Fig. 3E | Fig. 3F |

154 Proposal To Assist In Performing The At Least One Service Related To The Device Particular Portion To Which Access Is Requested Acceptance Determining Module 326 Proposal To Assist In Performing The At Least One Service Related To A Device Sensor To Which Access Is Requested Acceptance Determining Module 328 Proposal To Assist In Performing The At Least One Service Related To A Device Speedometer To Which Access Is Requested Acceptance Determining Module 330 Proposal To Assist In Performing The At Least One Service Related To Particular Device Data To Which Access Is Requested Acceptance Determining Module 332 Proposal To Assist In Performing The At Least One Service Related To Particular Device Data Controlled By And External To The Device To Which Access Is Requested Acceptance Determining Module 334 Proposal To Assist In Performing The At Least One Service Related To Particular Device Data Controlled By The Device And Stored With A Cloud Service To Which Access Is Requested Acceptance Determining Module 336 Proposal To Assist In Performing The At Least One Service Related To The Device Particular Portion To Which Access Is Requested User Decision Prompting Module 338 Option For User To Select A Proposal To Perform The At Least One Service Related To The Device Particular Portion To Which Access Is Requested Presenting Module 340 Selection Screen For User To Interact With To Decide Whether To Accept The Proposal To Perform The At Least One Service Related To The Device Particular Portion To Which Access Is Requested Screen Presenting Module

Fig. 3

| Fig. 3A | Fig. 3B | Fig. 3C | Fig. 3D | Fig. 3E | Fig. 3F |

FIG. 3C

154 Proposal To Assist In Performing The At Least One Service Related To The Device Particular Portion To Which Access Is Requested Acceptance Determining Module 342 Proposal To Carry Out At Least A Portion Of The One Or More Services Presenting To A User Of The Device Module

344 Request For Access To The Device Particular Portion Presenting To User As A Condition For Carrying Out The At Least A Portion Of The One Or More Services Module

| 346 Request For Access To The Device Particular Portion Presenting As A Condition For Carrying Out The At Least A Portion Of The One Or More Services To The User After Presenting The Proposal To Carry Out At Least A Portion Of The One Or More Services Module | 348 Request For Access To The Device Particular Portion Presenting As A Condition For Carrying Out The At Least A Portion Of The One Or More Services To The User After Presenting The Proposal To Carry Out At Least A Portion Of The One Or More Services Module |

Fig. 3

| Fig. 3A | Fig. 3B | Fig. 3C | Fig. 3D | Fig. 3E | Fig. 3F |

FIG. 3D

154 Proposal To Assist In Performing The At Least One Service Related To The Device Particular Portion To Which Access Is Requested Acceptance Determining Module 350 Proposal To Assist In Performing The At Least One Service Related To The Device Particular Portion To Which Access Is Requested Acceptance Determining At Least Partly Based On The At Least One Service Module

| 352 Proposal To Assist In Performing The At Least One Service Related To The Device Particular Portion To Which Access Is Requested Acceptance Determining At Least Partly Based On An Origination Property Of The At Least One Service Module | 354 Proposal To Assist In Performing The At Least One Service Related To The Device Particular Portion To Which Access Is Requested Acceptance Determining At Least Partly Based On A Creator Of The At Least One Service Module | 356 Proposal To Assist In Performing The At Least One Service Related To The Device Particular Portion To Which Access Is Requested Acceptance Determining At Least Partly Based On An Amount Of Device Resources Demanded By The At Least One Service Module | 358 Proposal To Assist In Performing The At Least One Service Related To The Device Particular Portion To Which Access Is Requested Acceptance Determining At Least Partly Based On An Amount Of Access Demanded By The At Least One Service Module | 360 Proposal To Assist In Performing The At Least One Service Related To The Device Particular Portion To Which Access Is Requested Acceptance Determining At Least Partly Based On An Estimated Duration Of The At Least One Service Module | 362 Proposal To Assist In Performing The At Least One Service Related To The Device Particular Portion To Which Access Is Requested Acceptance Determining At Least Partly Based On One Or More External Resources Requested By The At Least One Service Module |
|---|---|---|---|---|---|
| | | | | | 364 Proposal To Assist In Performing The At Least One Service Related To The Device Particular Portion To Which Access Is Requested Acceptance Determining At Least Partly Based On One Or More External Social Networking Site Resources Requested By The At Least One Service Module |

| Fig. 3A | Fig. 3B | Fig. 3C | Fig. 3D | Fig. 3E | Fig. 3F |

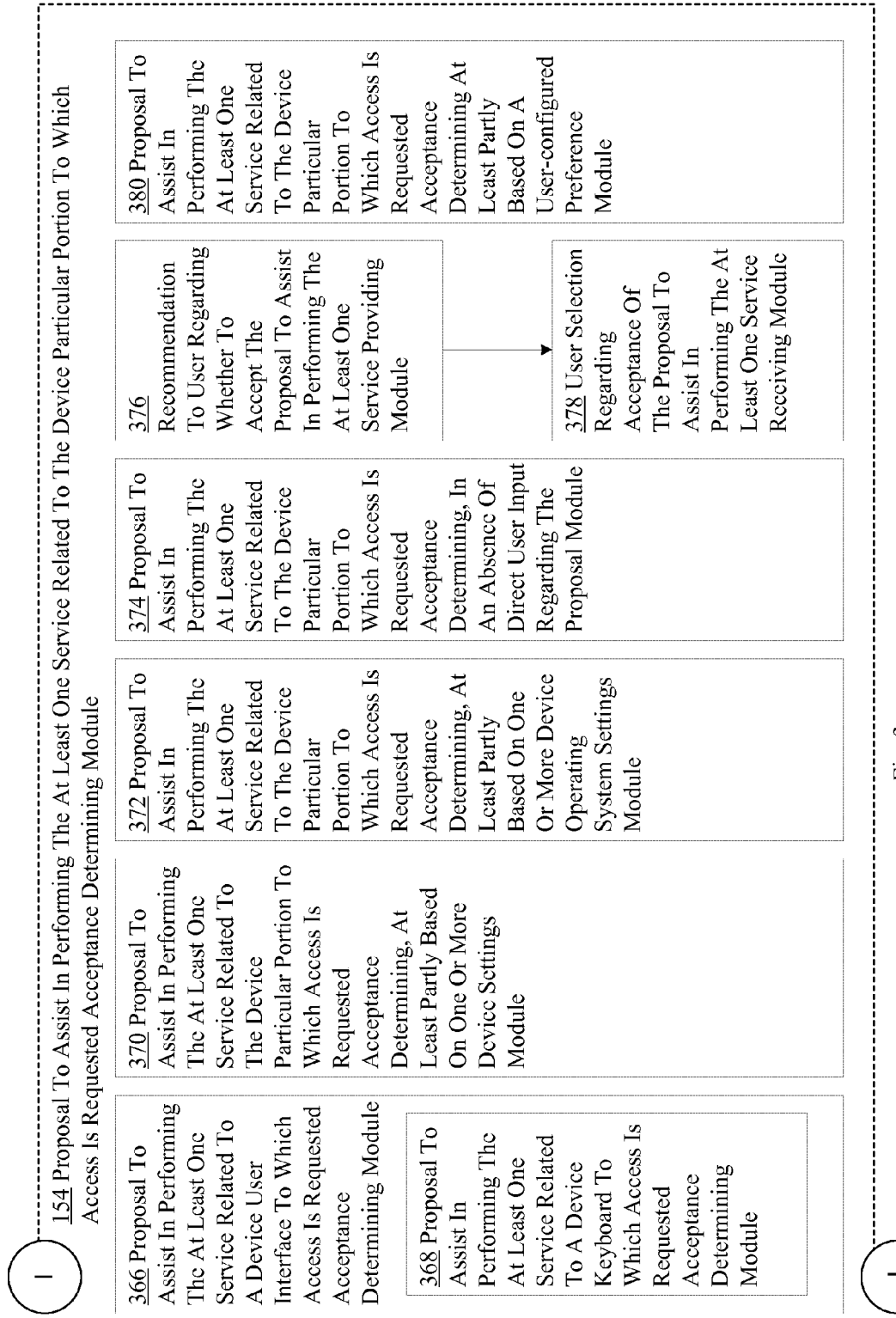

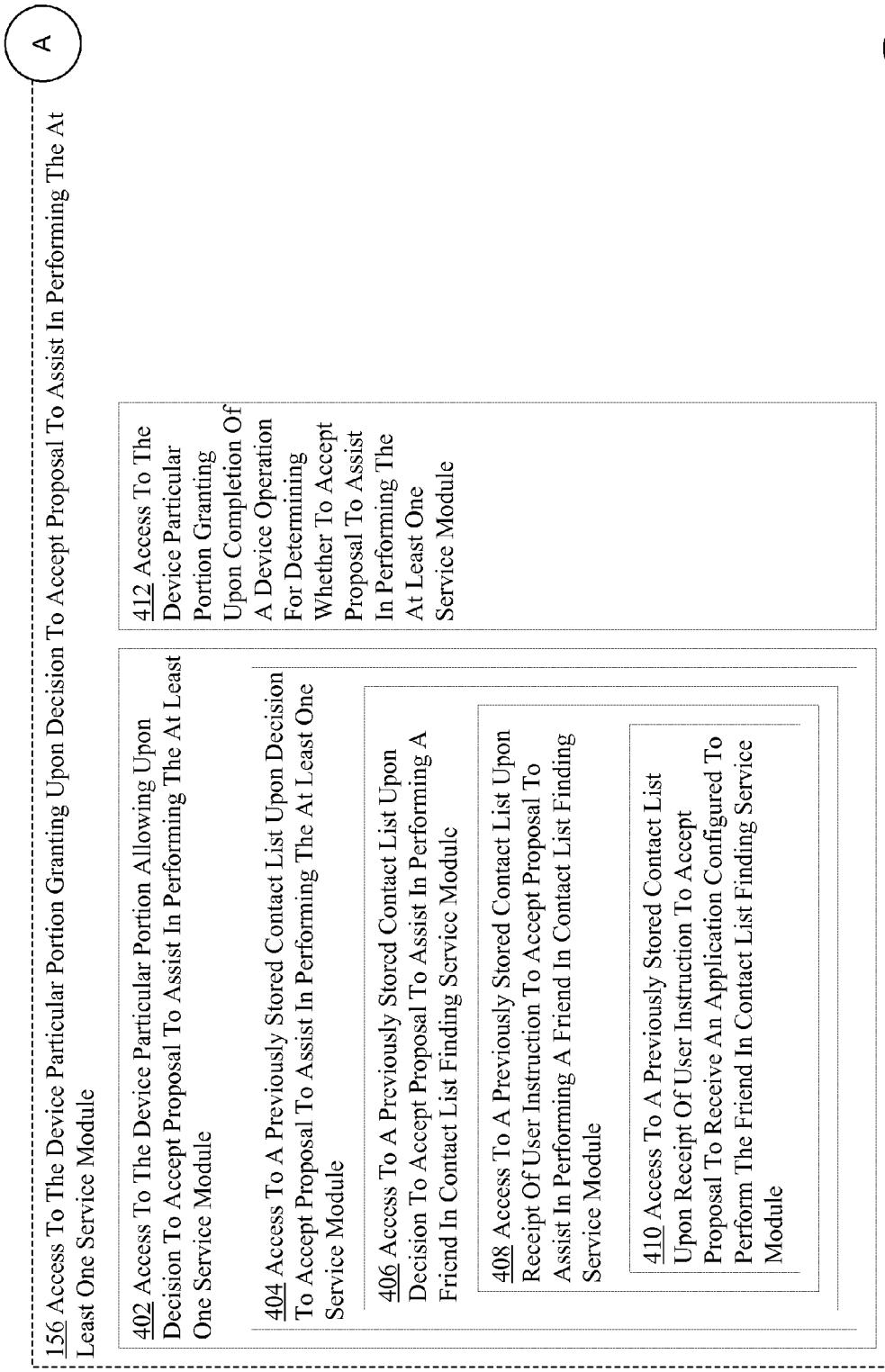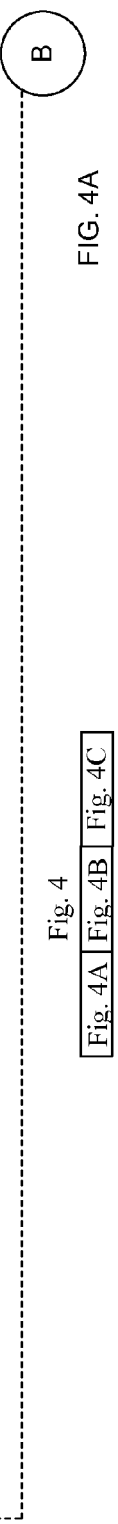
Fig. 4
| Fig. 4A | Fig. 4B | Fig. 4C |
FIG. 4A

156 Access To The Device Particular Portion Granting Upon Decision To Accept Proposal To Assist In Performing The At Least One Service Module

| 414 One Or More Device Particular Portion Access Credentials Transmitting Upon Decision To Accept Proposal To Assist In Performing The At Least One Service Module | 420 Data Under Control Of Device Particular Portion Transmitting Upon Decision To Accept Proposal To Assist In Performing The At Least One Service Module | 422 Access To At Least One Sensor That Is Part Of The Device Particular Portion Granting Upon Decision To Accept Proposal To Assist In Performing The At Least One Service Module |

| 416 Login And Password Information For Device Particular Portion Transmitting Upon Decision To Accept Proposal To Assist In Performing The At Least One Service Module | 418 Data Stored In Device Particular Portion Unlocking Information Transmitting Upon Decision To Accept Proposal To Assist In Performing The At Least One Service Module |

Fig. 4

| Fig. 4A | Fig. 4B | Fig. 4C |

FIG. 4B

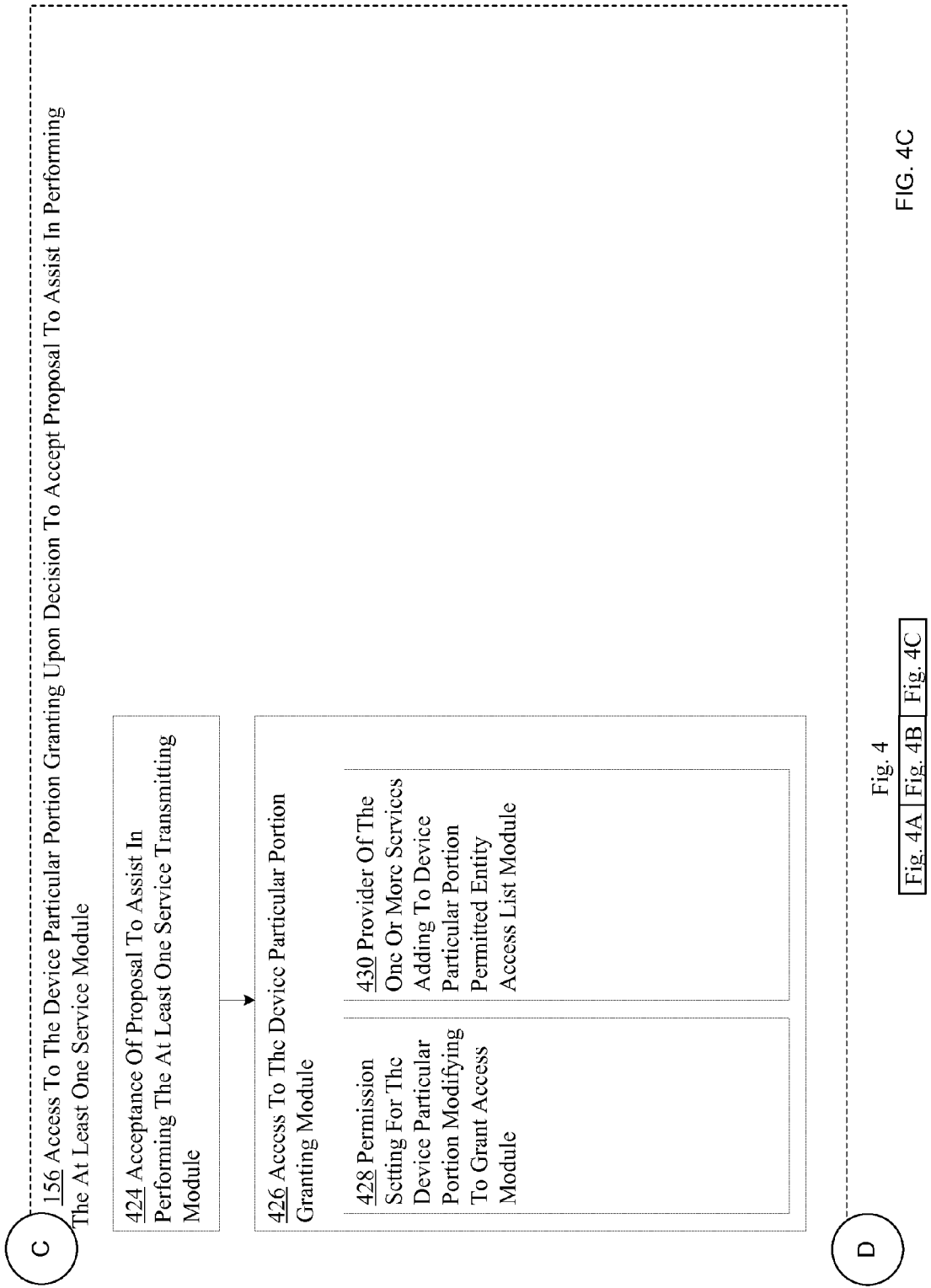

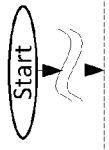
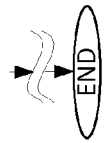

502 Acquiring An Offer To Facilitate Execution Of One Or More Services That Utilize A Particular Portion Of A Device, In Exchange For Access To The Particular Portion Of The Device 602 Receiving Data Including An Offer To Facilitate Execution Of One Or More Services That Utilize A Particular Portion Of A Device, In Exchange For Access To The Particular Portion Of The Device 604 Receiving Data Including An Offer To Facilitate Execution Of A Service That Locates One Or More Entities That Utilizes A Contact List Of The Device, In Exchange For Access To The Contact List Of The Device 606 Receiving Data Including An Offer To Transmit An Application Configured To Execute The Service That Locates One Or More Entities That Utilizes The Contact List Of The Device, In Exchange For Access To The Contact List Of The Device 608 Receiving Data Including An Offer To Transmit The Application Configured To Execute The Service That Locates One Or More Entities That Utilize The Contact List Stored On A Phone Device, In Exchange For Access To The Contact List Stored On The Phone Device 610 Receiving An Indication That The Device Has A Positioning Sensor Configured To Collect Position Information Of The Device, For Which The Device Is Configured To Selectively Allow Access To One Or More Applications On The Device 612 Retrieving An Offer To Facilitate Execution Of One Or More Services That Utilize The Particular Portion Of The Device, In Exchange For Access To The Particular Portion Of The Device

FIG. 6A

502 Acquiring An Offer To Facilitate Execution Of One Or More Services That Utilize A Particular Portion Of A Device, In Exchange For Access To The Particular Portion Of The Device

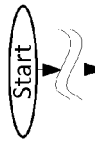

632 Transmitting Data Regarding The Particular Portion Of The Device

| 636 Transmitting Data Regarding An Amount Of Data Stored In The Particular Portion Of The Device | 638 Transmitting Data Regarding A Type Of Data Stored In The Particular Portion Of The Device | 640 Transmitting Data Indicating A Property Of Data Stored In The Particular Portion |
|  |  | 642 Transmitting Data Indicating That A Contact List Data Stored In The Particular Portion Has Over Fifty Entries |

634 Receiving An Offer To Facilitate Execution Of One Or More Services Selected At Least Partly Based On The Transmitted Data, In Exchange For Access To The Particular Portion Of The Device

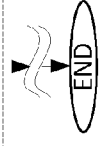

FIG. 6C

504 Determining Whether To Accept The Offer To Facilitate Execution Of The One Or More Services And Grant Access To The Particular Portion Of The Device

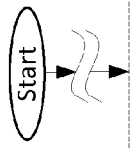

708 Determining, At Least Partly Based On The Particular Portion Of The Device To Which Access Is Requested, Whether To Accept The Offer To Facilitate Execution Of The One Or More Services And Grant Access To The Particular Portion Of The Device

714 Determining, At Least Partly Based On Whether The Particular Portion Of The Device Contains One Or More Pieces Of Data Designated As Limited Access, Whether To Accept The Offer To Facilitate Execution Of The One Or More Services And Grant Access To The Particular Portion Of The Device

716 Determining, At Least Partly Based On Whether A Web Browsing History Of The Device Contains One Or More Visited Websites Designated As Limited Access, Whether To Accept The Offer To Facilitate Execution Of The One Or More Services And Grant Access To The Particular Portion Of The Device

718 Determining, At Least Partly Based On A Type Of Information Stored On The Particular Portion Of The Device, Whether To Accept The Offer To Facilitate Execution Of The One Or More Services And Grant Access To The Particular Portion Of The Device

720 Determining, At Least Partly Based On Whether The Information Stored On The Particular Portion Of The Device Is Location Information, Whether To Accept The Offer To Facilitate Execution Of The One Or More Services And Grant Access To The Particular Portion Of The Device

722 Determining, At Least Partly Based On An Amount Of Information Collected By The Particular Portion Of The Device, Whether To Accept The Offer To Facilitate Execution Of The One Or More Services And Grant Access To The Particular Portion Of The Device

724 Determining, At Least Partly Based On How Often A Sensor That Is Part Of The Particular Portion Of The Device Is Collecting Data, Whether To Accept The Offer To Facilitate Execution Of The One Or More Services And Grant Access To The Particular Portion Of The Device

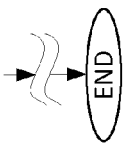

FIG. 7B

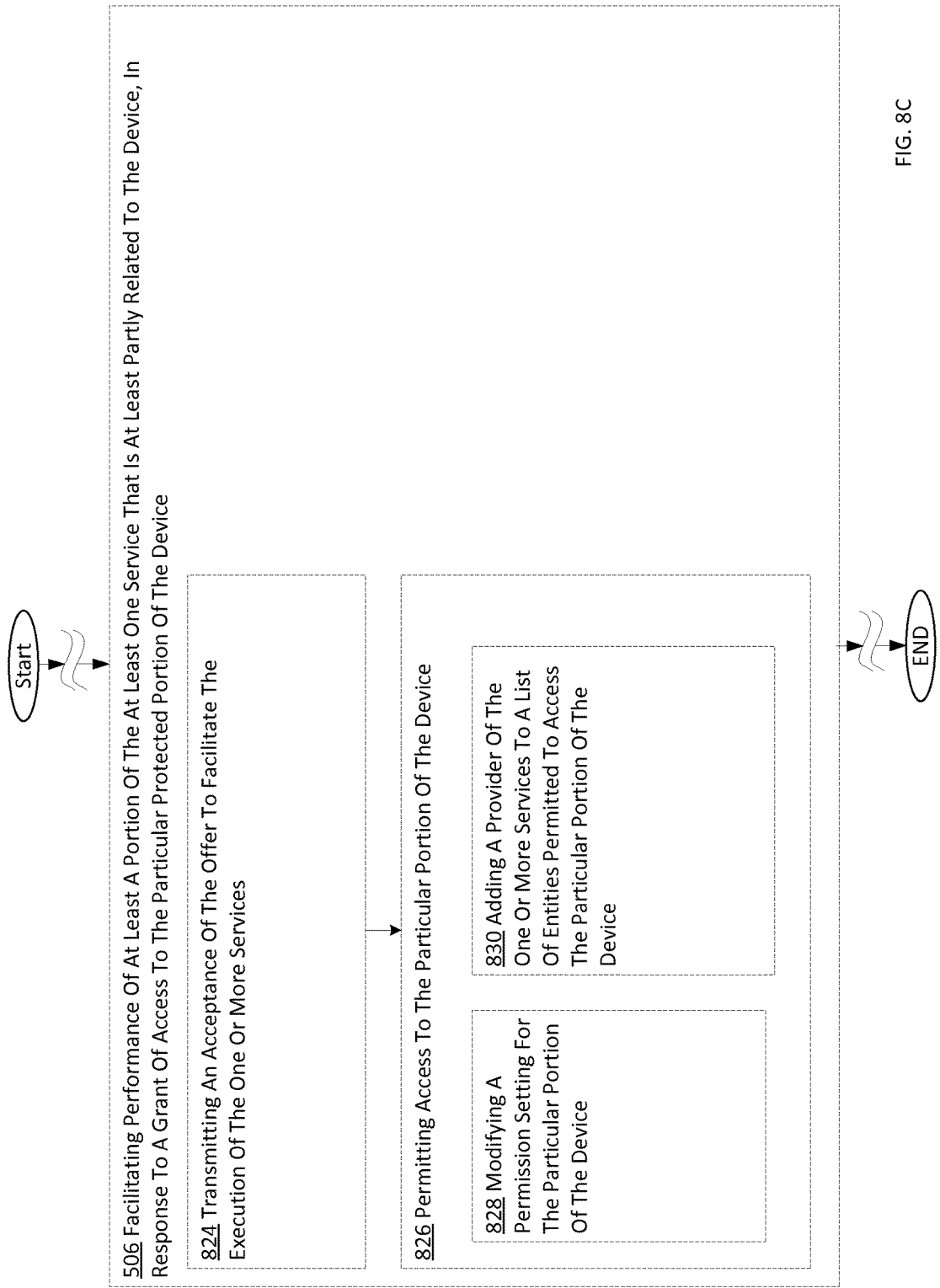

METHODS AND SYSTEMS FOR MANAGING DEVICE DATA

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 61/720,245 titled METHODS AND SYSTEMS FOR DATA SERVICES, naming Edward K. Y. Jung, Royce A. Levien, Richard T. Lord, Robert W. Lord, and Mark A. Malamud as inventors, filed 30 Oct. 2012, which was filed within the twelve months preceding the filing date of the present application or is an application of which a currently application is entitled to the benefit of the filing date.

For purposes of the USPTO extra-statutory requirements, the present application claims benefit of priority of U.S. Provisional Patent Application No. 61/720,874 titled METHODS AND SYSTEMS FOR DATA SERVICES, naming Edward K. Y. Jung, Royce A. Levien, Richard T. Lord, Robert W. Lord, and Mark A. Malamud as inventors, filed 31 Oct. 2012, which was filed within the twelve months preceding the filing date of the present application or is an application of which a currently application is entitled to the benefit of the filing date.

RELATED APPLICATIONS

U.S. patent application Ser. No. 13/685,485, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

U.S. patent application Ser. No. 13/685,609, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

U.S. patent application Ser. No. 13/685,488, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

U.S. patent application Ser. No. 13/685,612, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

U.S. patent application Ser. No. 13/685,491, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

U.S. patent application Ser. No. 13/685,613, entitled METHODS AND SYSTEMS FOR MANAGING DATA, naming Edward K. Y. Jung, Royce A. Levien, Richard T. Lord, Robert W. Lord, and Mark A. Malamud as inventors, filed 26 Nov. 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to data services.

SUMMARY

In one or more various aspects, a method includes but is not limited to acquiring an offer to facilitate execution of one or more services that utilize a particular portion of a device, in exchange for access to the particular portion of the device, determining whether to accept the offer to facilitate execution of the one or more services and grant access to the particular portion of the device, and facilitating access to the particular portion upon a determination to accept the offer to facilitate the execution of the one or more services. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring an offer to facilitate execution of one or more services that utilize a particular portion of a device, in exchange for access to the particular portion of the device, means for determining whether to accept the offer to facilitate execution of the one or more services and grant access to the particular portion of the device, and means for facilitating access to the particular portion upon a determination to accept the offer to facilitate the execution of the one or more services. In addition to the foregoing, other system aspects are described in the claims, drawings, and text forming a part of the disclosure set forth herein.

In one or more various aspects, a system includes, but is not limited to, circuitry for acquiring an offer to facilitate execution of one or more services that utilize a particular portion of a device, in exchange for access to the particular portion of the device, circuitry for determining whether to accept the offer to facilitate execution of the one or more services and grant access to the particular portion of the device, and circuitry for facilitating access to the particular portion upon a determination to accept the offer to facilitate the execution of the one or more services. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring an offer to facilitate execution of one or more services that utilize a particular portion of a device, in exchange for access to the particular portion of the device, one or more instructions for determining whether to accept the offer to facilitate execution of the one or more services and grant access to the particular portion of the device, and one or more instructions for facilitating access to the particular portion upon a determination to accept the offer to facilitate the execution of the one or more services. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring an offer to facilitate execution of one or more services that utilize a particular portion of a device, in exchange for access to the particular portion of the device, one or more interchained physical machines ordered for determining whether to accept the offer to facilitate execution of the one or more services and grant access to the particular portion of the device, and one or more interchained physical machines ordered for facilitating access to the particular portion upon a determination to accept the offer to facilitate the execution of the one or more services.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1B shows a high-level block diagram of a personal device 120 operating in an exemplary environment 100, according to an embodiment.

FIG. 1D shows a high-level block diagram of a computing device 130B operating in an exemplary embodiment 100", according to an embodiment.

FIG. 2, including FIGS. 2A-2E, shows a proposal to assist in performing at least one service related to a device particular portion, in return for access to the device particular portion acquiring module 152 of processing module 150 of computing device 130 of FIG. 1B, according to an embodiment.

FIG. 3, including FIGS. 3A-3F, shows a particular perspective of the presentation of a proposal to assist in performing the at least one service related to the device particular portion to which access is requested acceptance determining module 154 of processing module 150 of computing device 130 of FIG. 1B, according to an embodiment.

FIG. 4, including FIGS. 4A-4C, shows a particular perspective of an access to the device particular portion granting upon decision to accept proposal to assist in performing the at least one service module 156 of processing module 150 of computing device 130 of FIG. 1B, according to an embodiment.

FIG. 6A is a high-level logic flow chart of a process depicting alternate implementations of an acquiring an offer operation 502, according to one or more embodiments.

FIG. 6C is a high-level logic flow chart of a process depicting alternate implementations of an acquiring an offer operation 502, according to one or more embodiments.

FIG. 7B is a high-level logic flow chart of a process depicting alternate implementations of a determining whether to accept the offer module 504, according to one or more embodiments.

FIG. 8C is a high-level logic flow chart of a process depicting alternate implementations of a particular portion access facilitating operation 506, according to one or more embodiments.

DETAILED DESCRIPTION

Figure 1A:
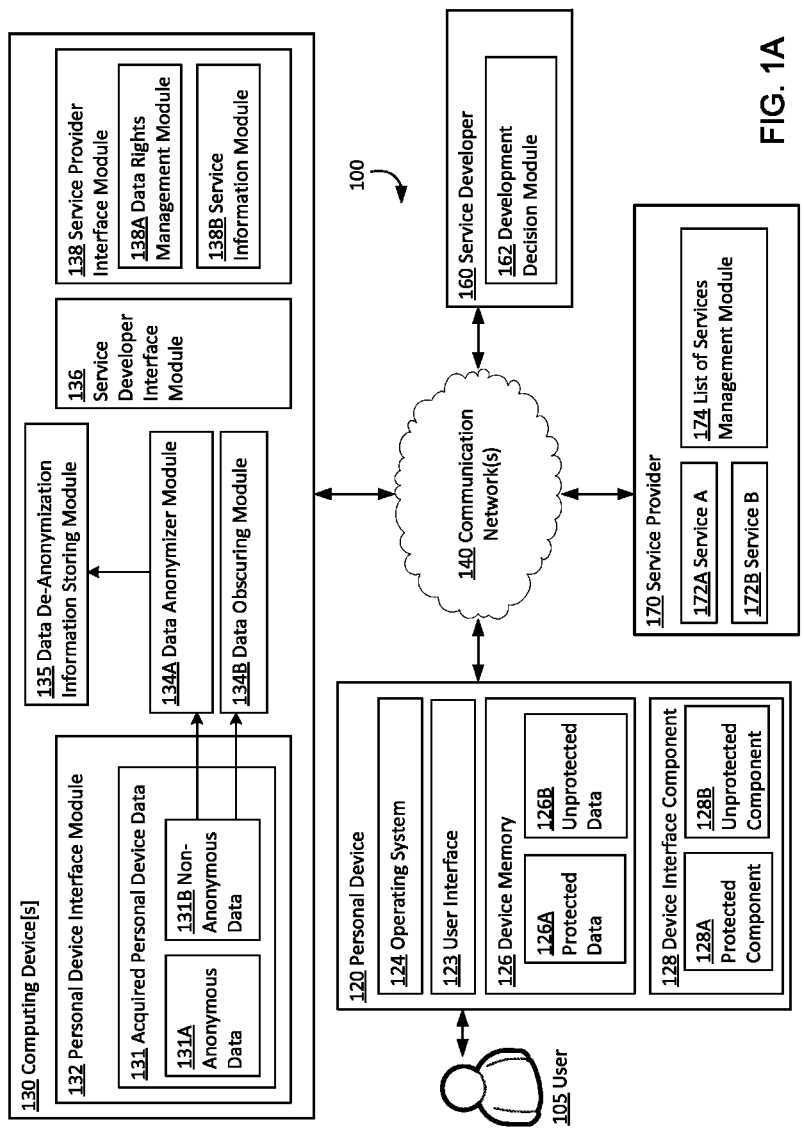
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring an offer to facilitate execution of one or more services that utilize a particular portion of a device, in exchange for access to the particular portion of the device, determining whether to accept the offer to facilitate execution of the one or more services and grant access to the particular portion of the device, and facilitating access to the particular portion upon a determination to accept the offer to facilitate the execution of the one or more services.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around -5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein, e.g., in FIG. 1, and other places, as a single illustrated figure, those skilled in the art will appreciate that user 105 may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In known systems, devices that are associated with one or more users, e.g., phones, tablets, laptops, desktops, cars, game systems, appliances, and the like, may collect data regarding the user. This data may be desired by third parties. The following describes, among other implementations, methods and systems of managing user data collected by one or more devices that may also be useful to entities that are not the user, and which entities may not necessarily have access to the data.

Referring now to FIG. 1, FIG. 1 illustrates an example environment 100 in which the methods, systems, circuitry, articles of manufacture, and computer program products and architecture, in accordance with various embodiments, may be implemented by one or more computing devices 130. As shown in FIG. 1A, one or more personal devices 120, one or more service providers 170, one or more service developers 160, and one or more computing devices 30 may communicate via one or more communication networks 140. In an embodiment, service provider 170 may have one or more services that personal device 120 may want. In an embodiment, computing device 130, which may be a remote or local server, or distributed set of servers, may manage data that is gathered, stored, controlled, accessed, restricted, monitored, under the control of, checked, examined, verified, authenticated, authorized, manipulated, updated, altered, filtered, or otherwise acted upon, whether passively or actively, by personal device 20. In an embodiment, as described in more detail herein, computing device 130 may have access to some or all of the data on personal device 120. In another embodiment, computing device 130 may have access to only a portion of the data on personal device 120. In still another embodiment, computing device 130 may have access to a modified version of the data on personal device 120. Specifically, in an embodiment, computing device 20 may have access to the data stored on personal device 120, but in anonymous form.

In an embodiment, computing device 130 may offer one or more services to personal device 120. In an embodiment, the offer of one or more services may be conditional on a grant of access to part or all of the data stored and/or collected by personal device 120. In an embodiment, computing device 30 may receive one or more services from service provider 170 and/or service developer 160, and may select one or more of the received services for presentation to the personal device 120. In an embodiment, the data from personal device 120 may be shared with one or more of service provider 170 and service developer 160. In an embodiment, the data from personal device 120 may be anonymized prior to sharing with service developer 160 and/or service developer 170.

Referring again to FIG. 1A, FIG. 1A shows a personal device 120. Personal device 120 may be any electronic device, portable or not, that may be operated by or associated with one or more users. Personal device 120 is shown as interacting with a user 105. As set forth above, user 105 may be a person, or a group of people, or another entity that mimics the operations of a user. In some embodiments, user 105 may be a computer or a computer-controlled device. Personal device 120 may be, but is not limited to, a cellular phone, a network phone, a smartphone, a tablet, a music player, a walkie-talkie, a radio, a USB drive, a portable solid state drive, a portable disc-type hard drive, an augmented reality device (e.g., augmented reality glasses and/or headphones), earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like.

Referring again to FIG. 1A, personal device 120 may include an operating system 124. In this context, operating system 124 refers to any hardware, software, firmware, and combination thereof which is considered at the core or baseline of a device. For example, applications that interact directly with hardware may be considered to be part of an operating system. In some embodiments, operating system 124 may be an FPGA, printed circuit board, or other wired device. In an embodiment, operating system 124 may include one or more of Google's Android, Apple's iOS, Microsoft's Windows, various implementations of Linux, and the like. In some embodiments, operating system 124 may include a root menu for one or more televisions, stereo systems, media players, and the like. In some embodiments, operating system 124 may be a "home" screen of a device.

Referring again to FIG. 1A, in an embodiment, personal device 20 may include a user interface 123. User interface 123 may include any hardware, software, firmware, and combination thereof that allow a user 105 to interact with a personal device 120, and for a personal device 120 to interact with a user 105. In some embodiments, user interface 123 may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, and the like.

Referring again to FIG. 1A, in some embodiments, personal device 120 may include a device memory 126. In some embodiments, device memory 126 may include memory, random access memory ("RAM"), read only memory ("ROM"), flash memory, hard drives, disk-based media, disc-based media, magnetic storage, optical storage, volatile memory, nonvolatile memory, and any combination thereof. In some embodiments, device memory 126 may be separated from the device, e.g., available on a different device on a network, or over the air. For example, in a networked system, there may be many personal devices 120 whose device memory 126 is located at a central server that may be a few feet away or located across an ocean.

Referring again to FIG. 1A, in some embodiments, device memory 126 may include one or more of protected data 126A and unprotected data 126B. Not all embodiments include each or both of these, but protected data 126A and unprotected data 126B may be present in one or more embodiments. Protected data 126A may include any data, including data stored on personal device 120, data for which personal device 120 maintains at least partial control of, data for which personal device 120 monitors or provides the ability to monitor, and the like, for which some form of authorization is required to access the data. The authorization may take any form and relate to any sub-unit, including both internally and externally to the device. For example, in an embodiment, protected data 126A may include data which is not available to at least one application running on a computing device. For another example, in an embodiment, protected data 126A may be available to one application at any time, and to another application at specific times, or at times when the first application is not using the data. In an embodiment, protected data 126A includes data for which an application must be authenticated (e.g., a Microsoft operating system certification, or a user flag set to true) in order to access the protected data 126A.

In an embodiment, protected data 126A includes data that a user, e.g., user 105, cannot view until the user 105 verifies their identity, e.g., through a password input or biometric identification. In an embodiment, protected data 126A is limited to the device, and is not transmitted to any other system not under the direct control of the personal device 120. In an embodiment, protected data 126A is limited to the personal device 120, and only applications originating at the personal device 120, or originating with the user 105, are allowed to read protected data 126A. In an embodiment, personal device 120 modifies or directs to be modified protected data 126A, so at least a portion of the protected data 126A is altered or obscured. In an embodiment, personal device 120 allows protected data 126A to be transmitted to an external entity under the condition that the external entity will alter or obscure at least a portion of the protected data 126A.

Referring again to FIG. 1A, in an embodiment, personal device 120 may include device memory 126, which, in some embodiments, may include unprotected data 26B. In an embodiment, unprotected data 126B may have no protections or limitations. In another embodiment, unprotected data 126B may have protections and limitations, but be less protected and/or less limited than protected data 126B. In an embodiment, unprotected data 126B is broadcasted or otherwise transmitted upon request. In an embodiment, unprotected data 126B cannot be accessed by an entity external to personal device 120 due to device design or other factors, but there is no specific protection on unprotected data 126B from access by one or more entities external to personal device 20.

Referring again to FIG. 1A, in an embodiment, personal device 120 may include device interface component 128. In an embodiment, device interface component 128 includes any component that allows the device to interact with its environment. For example, in an embodiment, device interface component 128 includes one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, and the like. In an embodiment, device interface component 128 also may include one or more user interface components, e.g., user interface 122 (e.g., although they are drawn separately, in some embodiments, user interface 122 is a type of device interface component 128), and in some embodiments including one or more user input receiving components and output presenting components.

Referring again to FIG. 1A, in an embodiment, device interface component 128 may include protected component 128A. Protected component 128A may include any device interface component 128, of which some non-limiting examples previously were enumerated, for which some form of authorization and/or authentication is required to access the data. The authorization may take any form and relate to any sub-unit, including both internally and externally to the device. In an embodiment, protected component 128A is similar to protected data 126A. For example, in an embodiment, a personal device 120, e.g., a smart phone, may have twelve applications running on the smartphone. In an embodiment, six of those applications may have access to a protected component 128A, e.g., a positioning sensor, and the other six may not. In some embodiments, data collected by a protected component 128A is part of the protected component 128A. In some embodiments, data collected by a protected component 128A becomes protected data 126A. In some embodiments, data collected by a protected component 128A becomes protected data 126A some of the time, or none of the time. In some embodiments, data collected by a protected component 128A may be part of protected component 128A for a particular amount of time, e.g., two weeks, and then may transition to unprotected data or data that is not considered protected or unprotected. In some embodiments, a protected component 128A may be accessible to everyone at particular times and/or circumstances. For example, a protected component 128A, e.g., a wireless radio, may be accessible to any entity between the hours of 7 and 8 pm, and only accessible to specific entities and/or applications at other times. In some embodiments, a protected component 128A, e.g., an image capturing component, may be accessible to any entity when one or more conditions are met, which conditions may or may not be related to the protected component 128A or the personal device 120, e.g., when the personal device 120 is at a particular location.

Referring again to FIG. 1A, in some embodiments, computing device 30 may include personal device interface module 132. In some embodiments, personal device interface module 132 may communicate with one or more personal devices 120. In some embodiments, personal device interface module 132 may receive data 131 received from a personal device 120. Acquired personal device data 131 may include any data gathered from personal device 120, in any manner. In some embodiments, computing device 30 may request data from personal device 120. In some embodiments, computing device 30 may receive data from personal device 120 on a schedule. In some embodiments, computing device 130 may retrieve data from personal device 120 when certain conditions are met. In some embodiments, personal device 120 is broadcasting data, and computing device 130 gathers the broadcasted data. In some embodiments, personal device 120 broadcasts data that only computing device 130 can use (e.g., decrypt, interpret, or the like). In some embodiments, personal device 120 may transmit acquired personal device data 131 to computing device 30 using one or more communication networks 140, which will be described in more detail herein.

Referring again to FIG. 1A, in some embodiments, the acquired personal device data 131 may be anonymous data 131A. In an embodiment, anonymous data refers to data from which the origin of the data cannot be uniquely identified. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification. It is noted that, in some embodiments, the device may be able to recognize the origin of the data, e.g., an identity of personal device 120, that is transmitting the data due to the nature of the data transmission, but be unable to deduce the origin of the data through the data itself, in which case, in some embodiments, this data is still considered anonymous data 131A.

Anonymous data 131A may include data for which uniquely identifying information has been removed, or data for which uniquely identifying information has been concealed, obscured, made uncertain, made ambiguous, screened, camouflaged, masked, veiled, shrouded, hidden, encoded, encrypted, or otherwise altered. In some embodiments, the received anonymous data 131A never included uniquely identifying information. In some embodiments, anonymous data 131A may partially or non-uniquely identify its origin, e.g., the user 105 or the personal device 120 from which the anonymous data came. In some embodiments, uniquely identifying information may be extracted from anonymous data 131A using additional information, e.g., a lookup table, hash, or other known algorithm. In some embodiments, uniquely identifying information may be deduced from anonymous data 131A without additional information. In some embodiments, uniquely identifying information may not be retrieved from anonymous data 131A once the data is in its anonymous format.

In an embodiment, acquired personal device data 131 may include non-anonymous data 131B. In some embodiments, non-anonymous data 131B may identify, either explicitly or implicitly, the origin of the data. In some embodiments, the origin of the data may refer to the personal device 120, e.g., a unique identifier, e.g., a MAC address. In some embodiments, the origin of the data may refer to a user 105 associated with the data, either through ownership, use, or other relationship with the device, e.g., a username, a user's name, or a user's social security or other identifying number, or network address or identification.

Referring to FIGS. 1A-1D, data anonymization systems and methods are illustrated. Although these systems and methods are illustrated as part of computing device 130, this is merely for convenience of drawing. In an embodiment, one or more of data de-anonymization information storing module 135, data anonymizer module 134A, and data obscuring module 134B may be located within personal device 120. In an embodiment, these modules may interact directly with device memory 126. In an embodiment, as pictured in FIG. 1A, computing device 130 may include a data anonymizer module 134A that converts non-anonymous data 131B into anonymized data, in a process described in more detail with respect to FIGS. 1C and 1D. In an embodiment, depending on the type of anonymization, there may be additional data that can be used to return the anonymized data into non-anonymous data, e.g., a lookup table. In some such embodiments, the additional data, e.g., de-anonymization data, may be stored in data de-anonymization information storing module 135.

Referring again to FIGS. 1A-1D, in an embodiment, computing device 130 may include a data obscuring module 134B. For example, in an embodiment, data obscuring module 134B may obscure the non-anonymous data 131B, similarly to the data anonymizer module 134A. For example, in an embodiment, data obscuring module 134B may apply data masking. In an embodiment, data obscuring module 134B may obscure by addition, e.g., by adding false identification information to the true identification information, so that the false identification information may not be distinguished from the true identification information. Data de-anonymization information storing module 135, data anonymizer module 134A, and data obscuring module 134B may be absent in some embodiments.

Referring again to FIG. 1A, in an embodiment, computing device 130 may include service developer interface module 136. Service developer interface module 136 may communicate with service developer 160, e.g., via communication network 140. Specifically, in an embodiment, service developer interface module 136 may provide limited information regarding the acquired personal device data 131. In an embodiment, for example, service developer interface module 136 may provide information to service developer 160 regarding the type of data collected. In an embodiment, for example, service developer interface module 136 may provide information to service developer 160 regarding an aggregate synopsis of the data collected. In an embodiment, service developer 160 may receive such information and make a decision about what types of services to develop, e.g., using development decision module 162.

Referring again to FIG. 1A, in an embodiment, computing device 130 may include service provider interface module 138. In an embodiment, service provider interface module 138 may communicate with service provider 170, e.g., via communication network 140.

In an embodiment, service provider interface module 138 may include data rights management module 138A. In an embodiment, data rights management module 138A may keep track of which services have rights to which personal device data. For example, in an embodiment, service 172A may have rights to certain anonymous data 131A. For another example, in an embodiment, service 172B may have rights to data that has been processed through the data anonymizer 134A.

Referring again to FIG. 1A, in an embodiment, service provider interface module 138 may include service information module 138B. Service information module 138B may include a list of services that are provided from service provider 170, so that such information may be delivered to personal device 120, in an embodiment. In an embodiment, computing device 130 may present one or more of the services listed in service information module 138B to personal device 120, either upon request, or upon detecting that personal device 120 may be interested in one or more of the services.

Referring again to FIG. 1A, in an embodiment, service provider 170 may provide services to a personal device 120. In an embodiment, these services may be delivered to directly to personal device 120. In an embodiment, service provider 170 has limited or no communication with personal device 120, and communication is handled through an intermediary, e.g., computing device 130. In an embodiment, computing device 130 handles the delivery of services and data between service provider 170 and personal device 120 such that protected data 126A and protected component 128A are protected from service provider 170, but that service provider 170 can still provide services, e.g., service 172A and service 172B, to personal device 120. In an embodiment, service provider 170 includes a list of services management module 174 that maintains a list of services to present to computing device 130, e.g., to allow service information module 138B of computing device 130 to maintain information about various services.

In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" as used herein and in the drawings refers to one or more communication networks, which may or may not interact with each other and which, in some embodiments, may work in concert, wittingly or unwittingly, to facilitate communication between one or more entities.

Figure 1C:
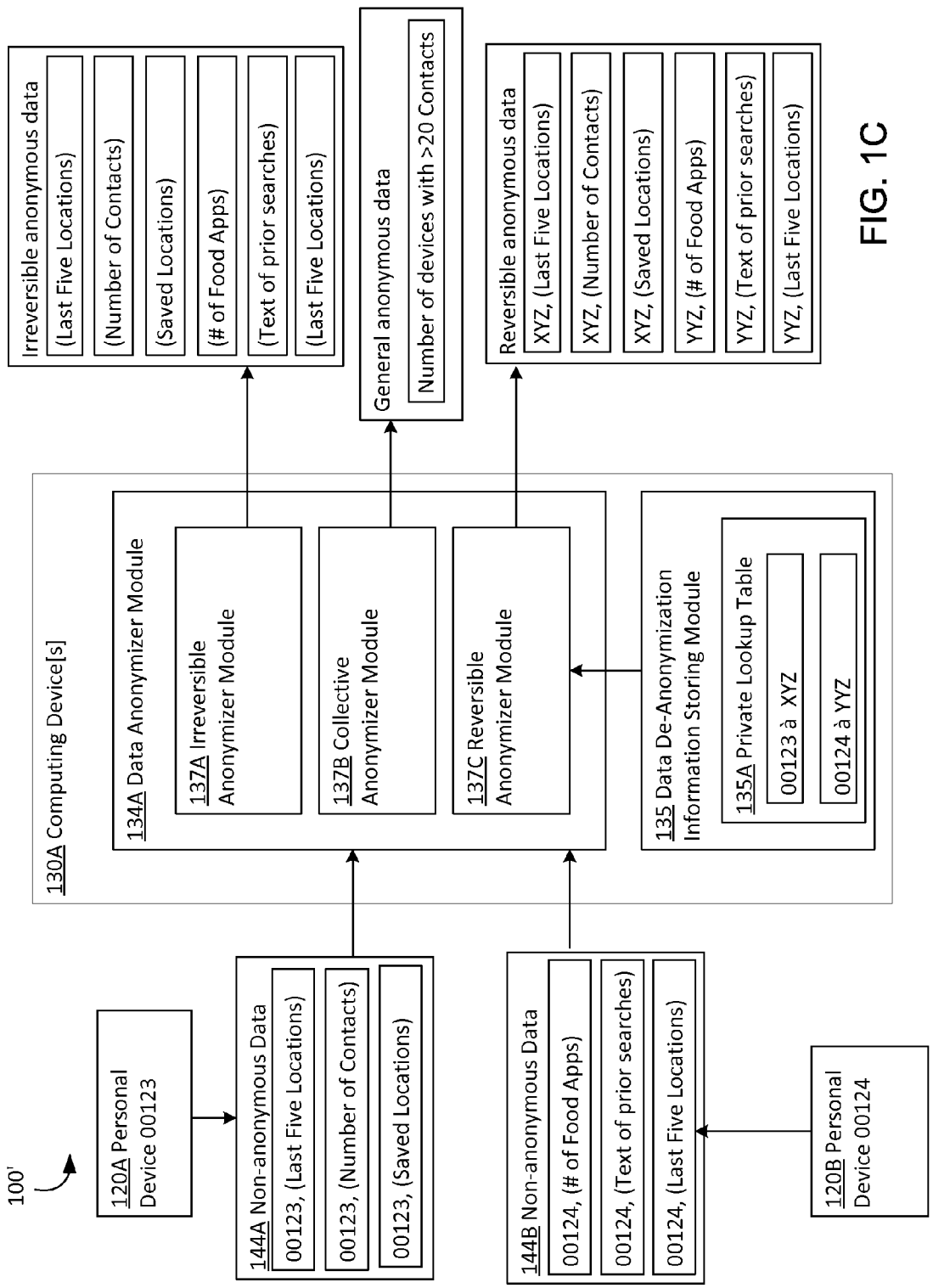
FIG. 1C shows a high level block diagram of a computing device 130A operating in an exemplary embodiment 100', according to an embodiment.

Referring now to FIG. 1C, an embodiment may include a personal device 120A and a personal device 120B. Personal device 120A may generate non-anonymous data 144A, and personal device 120B may generate non-anonymous data 144B. Non anonymous data 144A and non-anonymous data 144B may be transmitted to computing device 130A, which may be a non-exclusive and non-limiting example of computing device 130. In an embodiment, computing device 130A may include a data anonymizer module 134A. In an embodiment, data anonymizer module 134A may include irreversible anonymizer module 137A, which generates anonymous data that is irreversible, e.g., in an example, the identifying data has been removed. In an embodiment, data anonymizer module 134A may include collective anonymizer module 137B, which may take the non-anonymous data 144A and the non-anonymous data 144B and create an aggregated, general anonymous data, as shown FIG. 1C. In an embodiment, data anonymizer module 134A may include reversible anonymizer module 137C, which may use a private lookup table 135A to convert the non-anonymous data into anonymous data. In an embodiment, that private lookup table 135A may be stored in the data-deanonymization information storing module 135.

Referring now to FIG. 1D, in an embodiment, a computing device 130B may have a data anonymizer 134A that may apply an anonymizing function 132A, as shown in FIG. 1D. For example, an anonymizing function may use a cryptographic method, a perturbation method, a DataFly algorithm, top-down specialization, and/or Mondarian multi-dimensional k-anonymity, as non-limiting and non-exclusive examples. In another embodiment, a data obscuring module 134B obscures the non-anonymous data. In an embodiment, the obscuring may be accomplished by adding similar-looking and plausible "false" data to the actual identifying data, so that later, the true data cannot be determined merely by looking at the data. In an embodiment, the anonymized data may be used by the service provider interface module 38 to give data to the service provider 170, either to carry out a portion of a service, or to determine which services may be useful to one or more personal devices 120.

The examples shown in FIGS. 1C and 1D are merely examples of how a data anonymizer might be implemented, and are not intended to be limiting or exclusive. There are many other techniques for anonymizing the data, some of which will be mentioned herein.

Referring again to FIG. 1B, FIG. 1B shows a more detailed description of personal device 120. In an embodiment, personal device 120 may include a processor 122. Processor 122 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 122 may be a server. In some embodiments, processor 122 may be a distributed-core processor. Although processor 122 is as a single processor that is part of a single personal device 120, processor 132 may be multiple processors distributed over one or many personal devices 120, which may or may not be configured to operate together. Processor 122 is illustrated as being configured to execute computer readable instructions in order to execute one or more operations described above, and as illustrated in FIGS. 5, 6A-6F, 7A-7I, and 8A-8B. In some embodiments, processor 122 is designed to be configured to operate as processing module 150, which may include one or more of proposal to assist in performing at least one service related to a device particular portion, in return for access to the device particular portion acquiring module 152, proposal to assist in performing the at least one service related to the device particular portion to which access is requested acceptance determining module 154, and access to the device particular portion granting upon decision to accept proposal to assist in performing the at least one service module 154.

In an embodiment, personal device 120 may include a device memory 126. In some embodiments, memory 126 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 126 may be located at a single network site. In some embodiments, memory 126 may be located at multiple network sites, including sites that are distant from each other.

Figures 2, 2A:
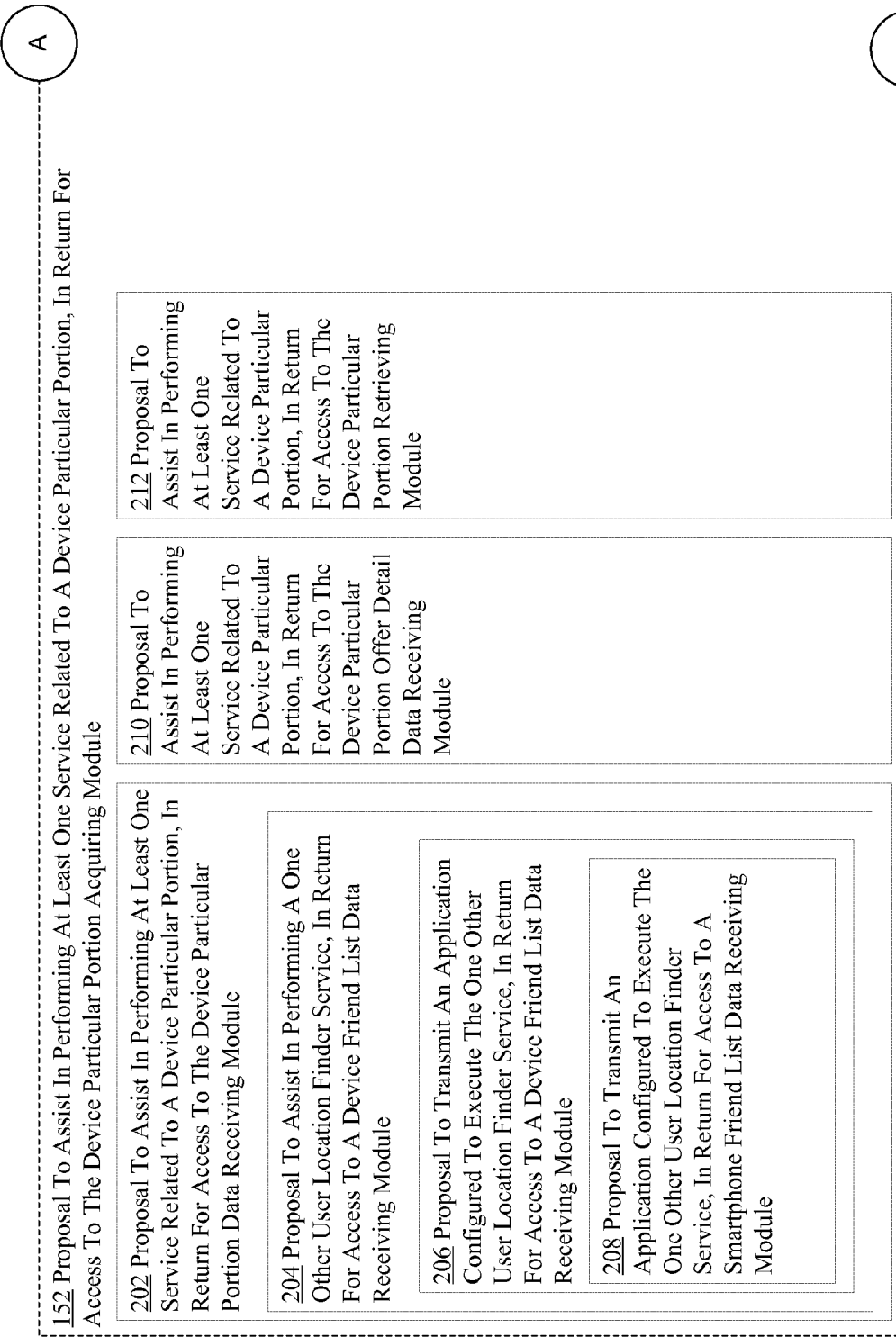

Referring now to FIG. 2, FIG. 2 illustrates an exemplary implementation of the proposal to assist in performing at least one service related to a device particular portion, in return for access to the device particular portion acquiring module 152. As illustrated in FIG. 2, the proposal to assist in performing at least one service related to a device particular portion, in return for access to the device particular portion acquiring module may include one or more sub-logic modules in various alternative implementations and embodiments. For example, as shown in FIG. 2, e.g., FIG. 2A, in some embodiments, module 152 may include one or more of proposal to assist in performing at least one service related to a device particular portion, in return for access to the device particular portion data receiving module 202, proposal to assist in performing at least one service related to a device particular portion, in return for access to the device particular portion offer detail data receiving module 210, and proposal to assist in performing at least one service related to a device particular portion, in return for access to the device particular portion retrieving module 212. In some embodiments, module 202 may include proposal to assist in performing a one other user location finder service, in return for access to a device friend list data receiving module 204. In some embodiments, module 204 may include proposal to transmit an application configured to execute the one other user location finder service, in return for access to a device friend list data receiving module 206. In some embodiments, module 206 may include proposal to transmit an application configured to execute the one other user location finder service, in return for access to a smartphone friend list data receiving module 208.

Figure 2B:
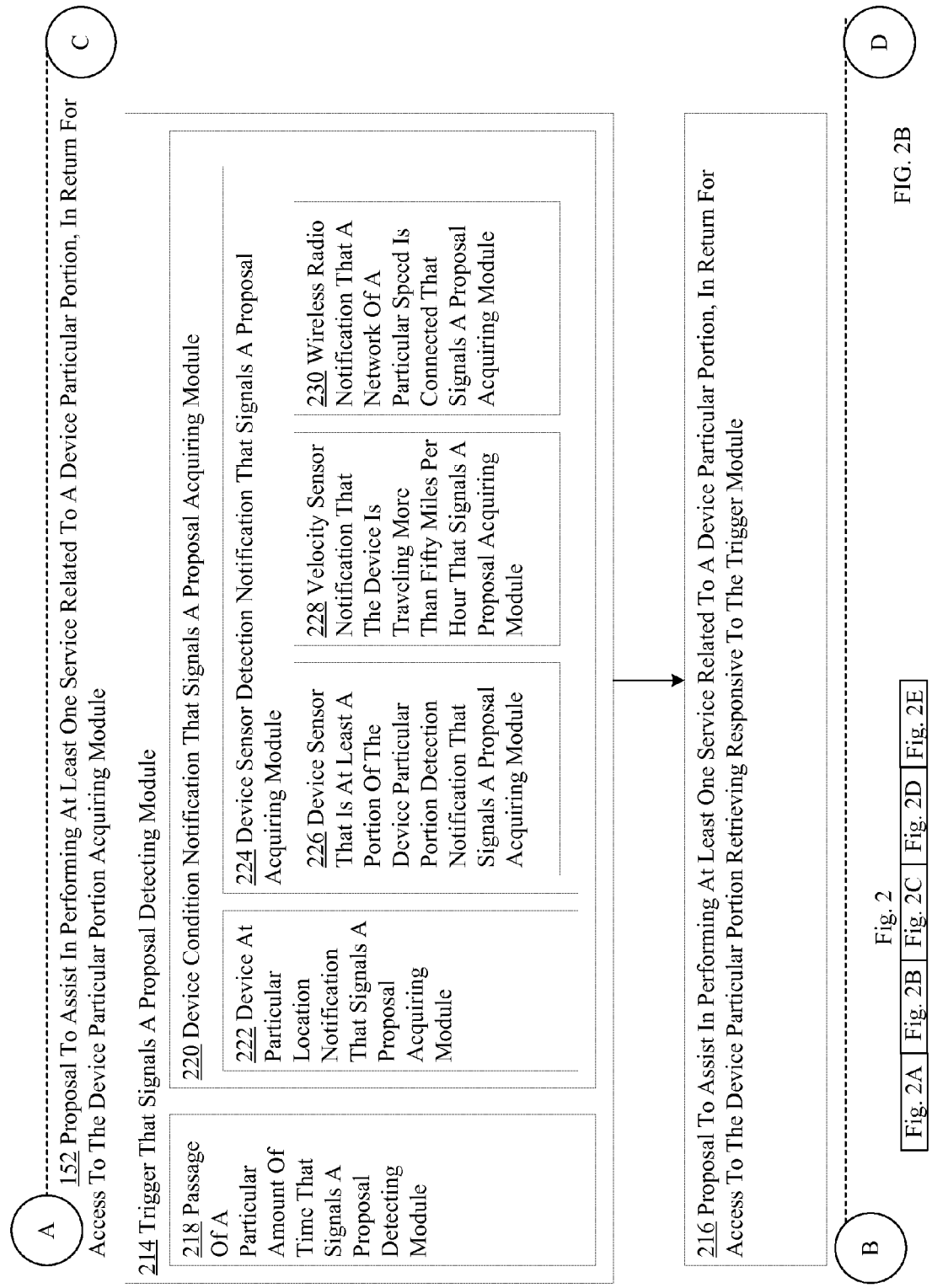

Referring again to FIG. 2, e.g., FIG. 2B, in some embodiments, module 152 may include one or more of trigger that signals a proposal detecting module 214 and proposal to assist in performing at least one service related to a device particular portion, in return for access to the device particular portion retrieving responsive to the trigger module 216. In some embodiments, module 214 may include one or more of passage of a particular amount of time that signals a proposal detecting module 218 and device condition notification that signals a proposal acquiring module 220. In some embodiments, module 220 may include one or more of device at particular location notification that signals a proposal acquiring module 222 and device sensor detection notification that signals a proposal acquiring module 224. In some embodiments, module 224 may include one or more of device sensor that is at least a portion of the device particular portion detection notification that signals a proposal acquiring module 226, velocity sensor notification that the device is traveling more than fifty miles per hour that signals a proposal acquiring module 228, and wireless radio notification that a network of a particular speed is connected that signals a proposal acquiring module 230.

Referring again to FIG. 2, e.g., FIG. 2C, as described above, in some embodiments, module 152 may include one or more of data comprising information regarding the particular portion of the device transmitting module 232 and proposal to assist in performing at least one service selected at least partly based on the transmitted data in return for device access receiving module 234. In some embodiments, module 232 may include one or more of data including an amount of data stored in the particular portion of the device transmitting module 236, data including a type of data stored in the particular portion of the device transmitting module 238, and data indicating a property of data stored in the particular portion of the device transmitting module 240. In some embodiments, module 240 may include data indicating that contact list data stored in the particular portion of the device transmitting module 242.

Referring again to FIG. 2, e.g., FIG. 2D, in some embodiments, module 152 may include one or more of particular data from particular portion acquiring module 244, obscured data generating from acquired particular data module 246, obscured data transmitting module 248, proposal to assist in performing at least one service related to a device particular portion acquiring module 250, and proposal to assist in performing at least one service that uses to a device particular portion, in return for access to the device particular portion acquiring module 262. In some embodiments, module 246 may include one or more of uniquely identifying information removing from acquired particular data module 252, uniquely identifying information altering from acquired particular data module 254, uniquely identifying information from acquired particular data replacing with false data module 256, and false data that is similarly formatted to uniquely identifying information adding to acquired particular data module 258. In some embodiments, module 250 may include proposal to assist in performing at least one service that is selected at least partly based on the transmitted obscured data acquiring module 260.

Referring again to FIG. 2, e.g., FIG. 2E, in some embodiments, module 152 may include one or more of proposal to assist in performing at least one service using the device particular portion, in return for access to the device particular portion acquiring module 264, proposal to acquire an application configured to perform at least one service using the device particular portion, in return for application access to the device particular portion acquiring module 266, and proposal to acquire an application configured to perform at least one service that requires data stored in the device particular portion, in return for access to the device particular portion acquiring module 268.

Figures 3, 3B:
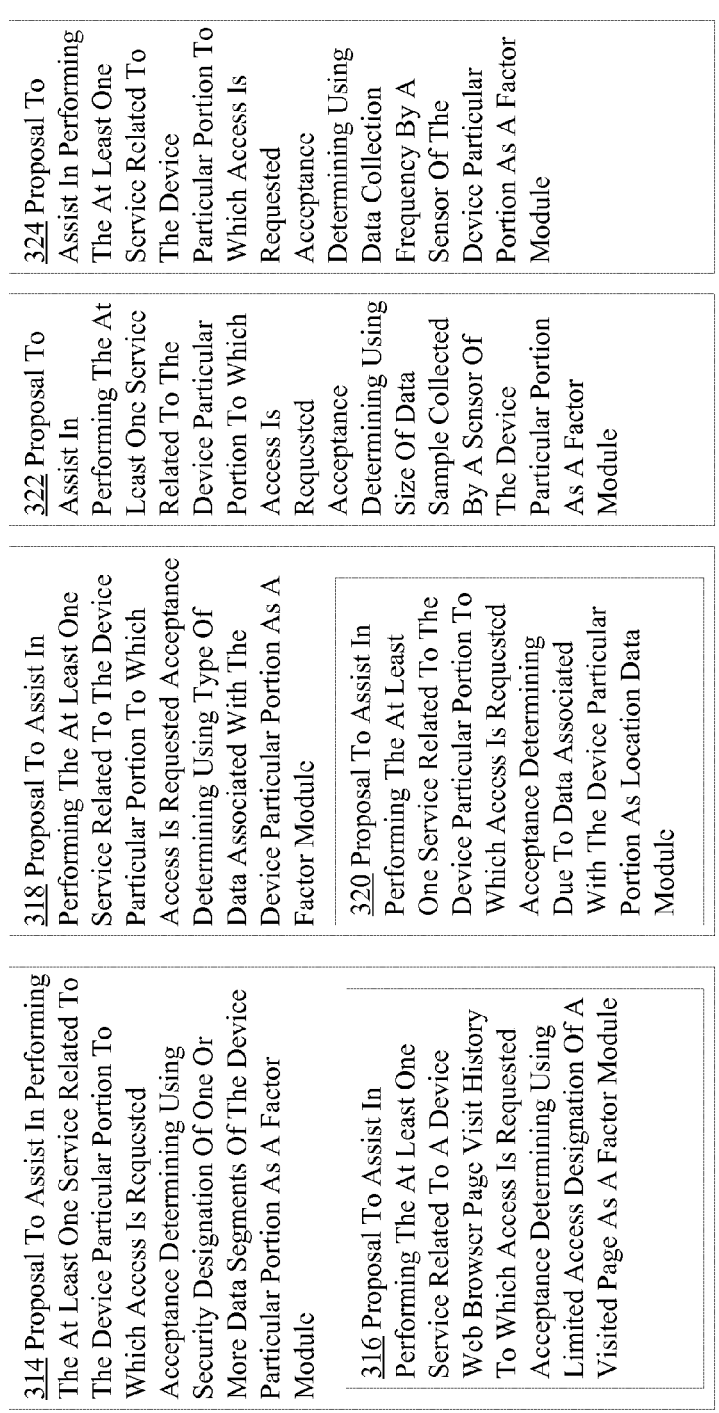

Referring now to FIG. 3, FIG. 3 illustrates an exemplary implementation of proposal to assist in performing the at least one service related to the device particular portion to which access is requested acceptance determining module 154. As illustrated in FIG. 3, the proposal to assist in performing the at least one service related to the device particular portion to which access is requested acceptance determining module 154 may include one or more sub-logic modules in various alternative implementations and embodiments. For example, as shown in FIG. 3 (e.g., FIG. 3A), in some embodiments, module 154 may include one or more of proposal to assist in performing a friend finding service related to a device contact list to which access is requested acceptance determining module 302 and proposal to assist in performing the at least one service related to the device particular portion to which access is requested acceptance determining using the device particular portion as a factor module 308. In some embodiments, module 302 may include proposal to transmit an application configured to access the device contact list to perform a friend finding service acceptance determining module 304. In some embodiments, module 304 may include one or more of proposal to transmit an application configured to access the device contact list to perform a friend finding service user decision prompting module 306. In some embodiments, module 308 may include one or more of proposal to assist in performing the at least one service related to the device particular portion to which access is requested acceptance determining based on a protection level associated with the device particular portion module 310 and proposal to assist in performing the at least one service related to the device particular portion to which access is requested acceptance determining based on an amount of data associated with the device particular portion module 312.

Referring again to FIG. 3, e.g., FIG. 3B, as described above, in some embodiments, module 154 may include module 308. In some embodiments, module 308 may include one or more of proposal to assist in performing the at least one service related to the device particular portion to which access is requested acceptance determining using security designation of one or more data segments of the device particular portion as a factor module 314, proposal to assist in performing the at least one service related to the device particular portion to which access is requested acceptance determining using type of data associated with the device particular portion as a factor module 318, proposal to assist in performing the at least one service related to the device particular portion to which access is requested acceptance determining using size of data sample collected by a sensor of the device particular portion as a factor module 322, and proposal to assist in performing the at least one service related to the device particular portion to which access is requested acceptance determining using data collection frequency by a sensor of the device particular portion as a factor module 324. In some embodiments, module 314 may include proposal to assist in performing the at least one service related to a device web browser page visit history to which access is requested acceptance determining using limited access designation of a visited page as a factor module 316. In some embodiments, module 318 may include proposal to assist in performing the at least one service related to the device particular portion to which access is requested acceptance determining due to data associated with the device particular portion as location data module 320.

Referring again to FIG. 3, e.g., FIG. 3C, in some embodiments, module 154 may include one or more of proposal to assist in performing the at least one service related to a device sensor to which access is requested acceptance determining module 326, proposal to assist in performing the at least one service related to particular device data to which access is requested acceptance determining module 330, proposal to assist in performing the at least one service related to particular device data controlled by and external to the device to which access is requested acceptance determining module 332, and proposal to assist in performing the at least one service related to the device particular portion to which access is requested user decision prompting module 336. In some embodiments, module 326 may include proposal to assist in performing the at least one service related to a device speedometer to which access is requested acceptance determining module 328. In some embodiments, module 332 may include proposal to assist in performing the at least one service related to particular device data controlled by the device and stored with a cloud service to which access is requested acceptance determining module 334. In some embodiments, module 336 may include option for user to select a proposal to perform the at least one service related to the device particular portion to which access is requested presenting module 338. In some embodiments, module 338 may include selection screen for user to interact with to decide whether to accept the proposal to perform the at least one service related to the device particular portion to which access is requested screen presenting module 340.

Referring again to FIG. 3, e.g., FIG. 3D, in some embodiments, module 154 may include one or more of proposal to carry out at least a portion of the one or more services presenting to a user of the device module 342 and request for access to the device particular portion presenting to user as a condition for carrying out the at least a portion of the one or more services module 344. In some embodiments, module 344 may include one or more of request for access to the device particular portion presenting as a condition for carrying out the at least a portion of the one or more services to the user after presenting the proposal to carry out at least a portion of the one or more services module 346 and request for access to the device particular portion presenting as a condition for carrying out the at least a portion of the one or more services to the user after the user has accepted the proposal to carry out at least a portion of the one or more services module 348.

Referring again to FIG. 3, e.g., FIG. 3E, in some embodiments, module 154 may include proposal to assist in performing the at least one service related to the device particular portion to which access is requested acceptance determining at least partly based on the at least one service module 350. In some embodiments, module 350 may include one or more of proposal to assist in performing the at least one service related to the device particular portion to which access is requested acceptance determining at least partly based on an origination property of the at least one service module 352, proposal to assist in performing the at least one service related to the device particular portion to which access is requested acceptance determining at least partly based on a creator of the at least one service module 354, proposal to assist in performing the at least one service related to the device particular portion to which access is requested acceptance determining at least partly based on an amount of device resources demanded by the at least one service module 356, proposal to assist in performing the at least one service related to the device particular portion to which access is requested acceptance determining at least partly based on an amount of device access demanded by the at least one service module 358, proposal to assist in performing the at least one service related to the device particular portion to which access is requested acceptance determining at least partly based on an estimated duration of the at least one service module 360, and proposal to assist in performing the at least one service related to the device particular portion to which access is requested acceptance determining at least partly based on one or more external resources requested by the at least one service module 362. In some embodiments, module 362 may include one or more of proposal to assist in performing the at least one service related to the device particular portion to which access is requested acceptance determining at least partly based on one or more external social networking site resources requested by the at least one service module 364.

Referring again to FIG. 3, e.g., FIG. 3F, in some embodiments, as described above, module 154 may include one or more of proposal to assist in performing the at least one service related to a device user interface to which access is requested acceptance determining module 366, proposal to assist in performing the at least one service related to the device particular portion to which access is requested acceptance determining, at least partly based on one or more device settings module 370, proposal to assist in performing the at least one service related to the device particular portion to which access is requested acceptance determining, at least partly based on one or more device operating system settings module 372, proposal to assist in performing the at least one service related to the device particular portion to which access is requested acceptance determining, in an absence of direct user input regarding the proposal module 374, recommendation to user regarding whether to accept the proposal to assist in performing the at least one service providing module 376, user selection regarding acceptance of the proposal to assist in performing the at least one service receiving module 378, and proposal to assist in performing the at least one service related to the device particular portion to which access is requested acceptance determining at least partly based on a user-configured preference module 380. In some embodiments, module 366 may include one or more of proposal to assist in performing the at least one service related to a device keyboard to which access is requested acceptance determining module 368.

Referring now to FIG. 4, FIG. 4 illustrates an exemplary implementation of access to the device particular portion granting upon decision to accept proposal to assist in performing the at least one service module 156. As illustrated in FIG. 4, the access to the device particular portion granting upon decision to accept proposal to assist in performing the at least one service module 156 may include one or more sub-logic modules in various alternative implementations and embodiments. For example, as shown in FIG. 4, e.g., FIG. 4A, in some embodiments, module 156 may include one or more of access to the device particular portion allowing upon decision to accept proposal to assist in performing the at least one service module 402 and access to the device particular portion granting upon completion of a device operation for determining whether to accept proposal to assist in performing the at least one service module 412. In some embodiments, module 402 may include access to a previously stored contact list upon decision to accept proposal to assist in performing the at least one service module 404. In some embodiments, module 404 may include one or more of access to a previously stored contact list upon decision to accept proposal to assist in performing a friend in contact list finding service module 406. In some embodiments, module 406 may include one or more of access to a previously stored contact list upon receipt of user instruction to accept proposal to assist in performing a friend in contact list finding service module 408. In some embodiments, module 408 may include one or more of access to a previously stored contact list upon receipt of user instruction to accept proposal to receive an application configured to perform the friend in contact list finding service module 410.

Referring again to FIG. 4, e.g., FIG. 4B, in some embodiments, module 156 may include one or more of one or more device particular portion access credentials transmitting upon decision to accept proposal to assist in performing the at least one service module 414, data under control of device particular portion transmitting upon decision to accept proposal to assist in performing the at least one service module 420, and access to at least one sensor that is part of the device particular portion granting upon decision to accept proposal to assist in performing the at least one service module 422. In some embodiments, module 414 may include one or more of login and password information for device particular portion transmitting upon decision to accept proposal to assist in performing the at least one service module 416 and data stored in device particular portion unlocking information transmitting upon decision to accept proposal to assist in performing the at least one service module 418.

Referring again to FIG. 4, e.g., FIG. 4C, in some embodiments, module 156 may include one or more of acceptance of proposal to assist in performing the at least one service transmitting module 424 and access to the device particular portion granting module 426. In some embodiments, module 426 may include one or more of permission setting for the device particular portion modifying to grant access module 428 and provider of the one or more services adding to device particular portion permitted entity access list module 430.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
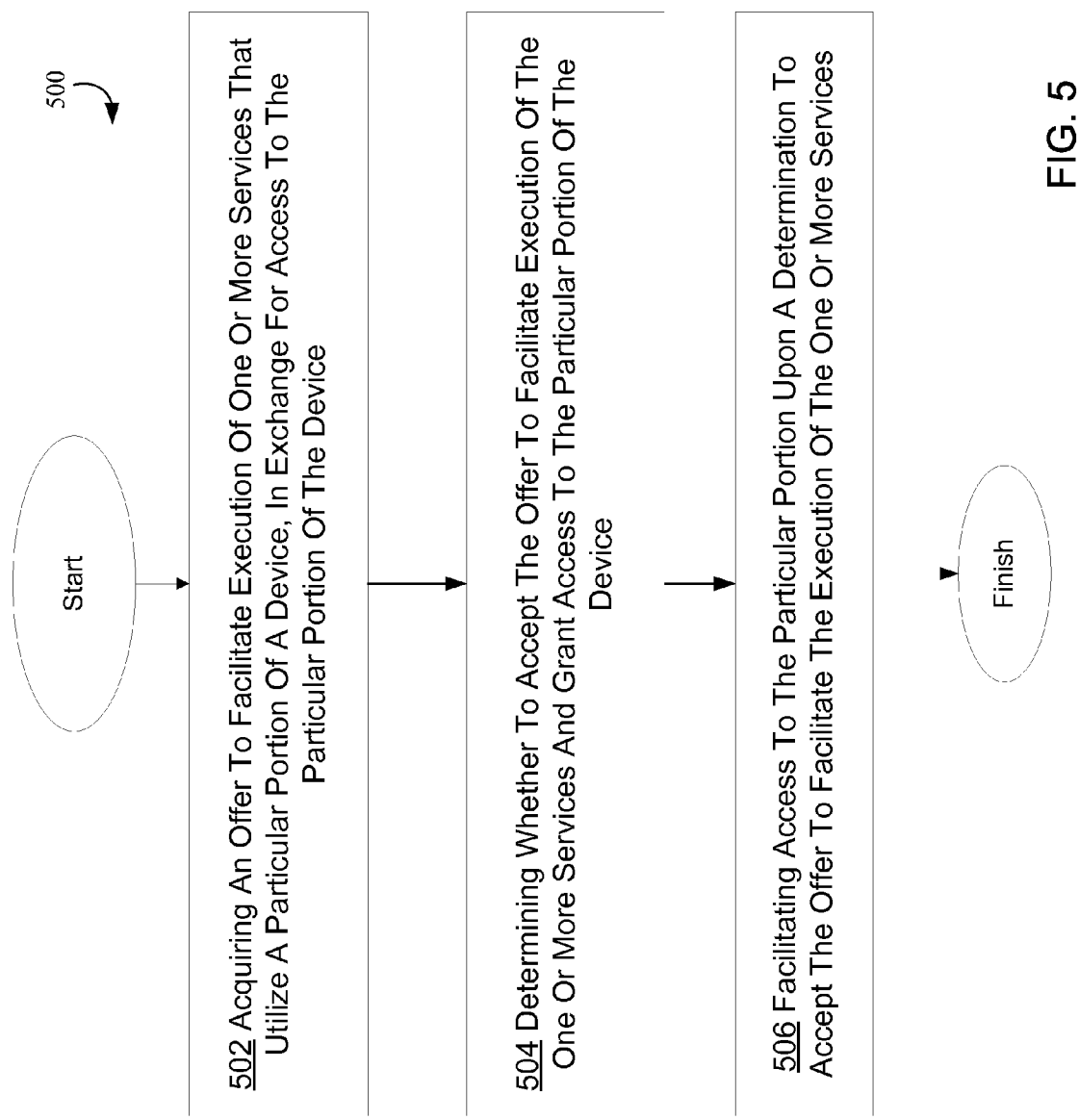
FIG. 5 is a high-level logic flowchart of a process, e.g., operational flow 500, according to an embodiment.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5-8 as well as the other operations to be described herein may be performed by at least one of a machine, an article of manufacture, or a composition of matter.

Referring now to FIG. 5, FIG. 5 shows operation 500, which may include operation 502 depicting acquiring an offer to facilitate execution of one or more services that utilize a particular portion of a device, in exchange for access to the particular portion of the device. For example, FIG. 1, e.g., FIG. 1B, shows proposal to assist in performing at least one service related to a device particular portion, in return for access to the device particular portion acquiring module 152 acquiring (e.g., receiving, retrieving, picking up, creating, generating, intercepting, reading, hearing, detecting, and the like) an offer (e.g., a presentation to a potential recipient for which the recipient is free to accept or reject, e.g., which may be in the form of, for example "this is a service we are willing to provide, are you interested," or any variant of that) to facilitate (e.g., taking one or more actions that, whether directly or indirectly, are intended to assist in the completion, execution, or carrying out of at least a portion of) execution of (e.g., execute, intend to execute, or begin executing, or taking one or more steps to allow the execution of) one or more services (e.g., a service that tags pictures stored on a user's device with one or more names) that utilize (e.g., use, make use of, employ as a means for, employ as a tool for, make reference to, access, operation, manipulate, modify, and the like) a particular portion (e.g., any portion of the device or any data stored in or manipulated by any component, module, part, or portion of the device, including, but not limited to, hardware, software, applications, Application Programming Interfaces ("APIs"), one or more virtual machines, one or more Dynamically Loaded Libraries ("DLLs"), one or more relational databases, one or more GUI frameworks, one or more COM structured storages, or any portion of any other device that is under control of a device, e.g., a cloud resource, and the like, e.g., in an embodiment, a particular portion may be a contact list, e.g., a stored list on a device of one or more names of entities that the user has stored a name of, and/or one or more pieces of information about, e.g., a telephone number), which, e.g., may be stored in any format, including a format utilized by Microsoft Outlook, or a format used to store names and telephone numbers on SIM cards) of a device (e.g., a cellular phone, smart phone, IP phone, VOIP phone, handset, microphone, camera (e.g., video camera, still camera, digital camera, and the like), headphone, earpiece, screen, monitor, television, game system, receiver (e.g., an audio/visual receiver), media player (e.g., DVD player, Blu-ray player, CD player, MP3 player, cassette tape player), tablet device, netbook computer, notebook computer, router, wireless router, bridge, network equipment, server, desktop computer, personal computer, personal computer component (e.g., RAM, hard drive, video card, and the like), personal navigation system, vehicle navigation system, motor vehicle, motor vehicle stereo, motor vehicle control system, motor vehicle communication system (e.g., OnStar), appliance, security system (e.g., a home security system), electronic safety device (e.g., an electronic safe, a door security system, a door locking system), stereo system, speaker, remote control (e.g., a universal remote control, or a device remote control), radio, two-way radio, walkie-talkie, ham radio, a metal detector, a radar detector, a weather station, a robot (e.g., a Roomba), a vacuum cleaner, and the like), in exchange for access (e.g., one or more of reading, writing, modifying, altering, deleting, encrypting, transmitting, receiving, or performing any of one or more actions or operations upon) to the particular portion (e.g., one or more pictures taken by a camera of the device and stored in the device's memory, and in an embodiment, the particular portion may refer to one or more of the picture data, the physical portion of the memory that stores the picture data, whether removable or not, and whether part of the device or not, the image capturing sensor that collects the image data to generate the picture, the user interface (e.g., button, whether a hard button or soft button) that indicates the device to take the picture, if triggered by a user), and any of the circuitry used to capture, process, store, and/or manipulate the image data gathered by the image capturing sensor) of the device (e.g., a smartphone, e.g., the user's smartphone).

Referring again to FIG. 5, operation 500 may include operation 504 depicting determining whether to accept the offer to facilitate execution of the one or more services and grant access to the particular portion of the device. For example, FIG. 1, e.g., FIG. 1B, shows proposal to assist in performing the at least one service related to the device particular portion to which access is requested acceptance determining module 154 determining (e.g., making a decision, contributing to making a decision, providing information to assist in making a decision, generating information to assist in making a decision, providing a framework to receive input regarding a decision, receiving input, e.g., from a person or user, regarding a decision, prompting an entity, e.g., a user, for a decision, and the like) whether to accept the offer (e.g., a presentation to a potential recipient for which the recipient is free to accept or reject, e.g., which may be in the form of, for example "this is a service we are willing to provide, are you interested," or any variant of that) to facilitate (e.g., taking one or more actions that, whether directly or indirectly, are intended to assist in the completion, execution, or carrying out of at least a portion of) execution of (e.g., execute, intend to execute, or begin executing, or taking one or more steps to allow the execution of) one or more services and grant access (e.g., the bestowing of one or more authentication tools, e.g., passwords, privileges, logins, addresses, and the like, or permission, authorization, authentication, and the like, or the changing of the permissions of the entity to which access is requested in order to allow access to the grantee entity, regardless of whether such change is narrow (e.g., limited to the grantee entity) or broad (e.g., given to the universe at large)) to the particular portion (e.g., the one or more pictures taken by a camera of the device and stored in the device's memory).

Referring again to FIG. 5, operation 500 may include operation 506 depicting facilitating access to the particular portion upon a determination to accept the offer to facilitate the execution of the one or more services. For example. FIG. 1, e.g., FIG. 1B, shows access to the device particular portion granting upon decision to accept proposal to assist in performing the at least one service module 156 facilitating access (e.g., one or more of reading, writing, modifying, altering, deleting, encrypting, transmitting, receiving, or performing any of one or more actions or operations upon, including the giving of one or more authentication tools, e.g., passwords, privileges, logins, addresses, and the like, or permission, authorization, authentication, and the like) to the particular portion (e.g., the one or more pictures taken by a camera of the device and stored in the device's memory) upon a determination (e.g., a decision, whether made by the user, the device, or a combination thereof, or based on predetermined factors, e.g., device settings, whether changeable by the user or not, or based on any other factor that can aid in making a decision) to accept the offer (e.g., the presentation to a potential recipient for which the recipient is free to accept or reject, e.g., which may be in the form of, for example "this is a service we are willing to provide, are you interested," or any variant of that) to facilitate (e.g., to take one or more actions that, whether directly or indirectly, are intended to assist in the completion, execution, or carrying out of at least a portion of) the execution (e.g., one or more steps or instructions that have the purpose and/or effect of furthering the carrying out of) the one or more services (e.g., a service that tags pictures stored on a user's device with one or more names).

Figure 6B:
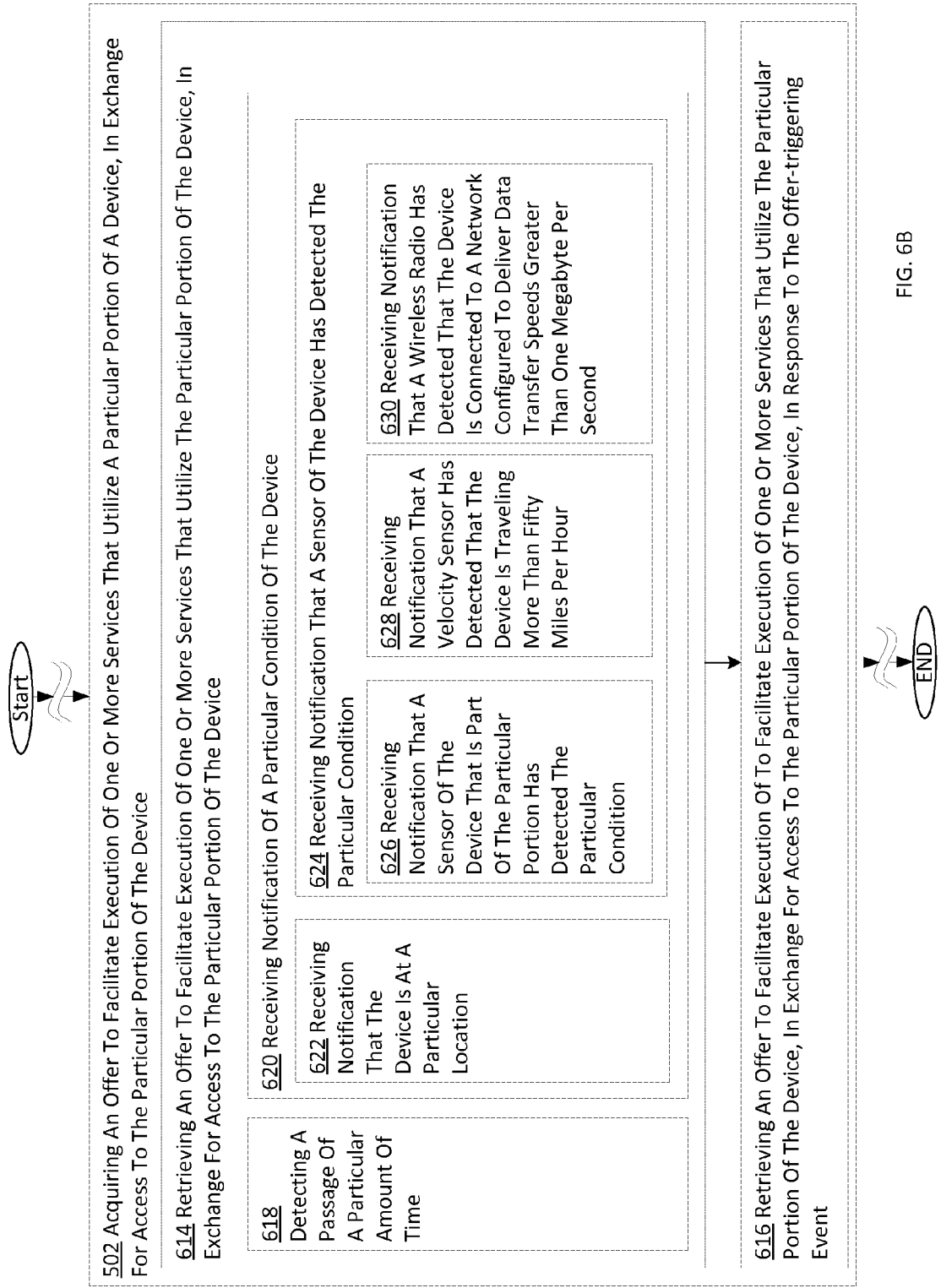
FIG. 6B is a high-level logic flow chart of a process depicting alternate implementations of an acquiring an offer operation 502, according to one or more embodiments.

FIGS. 6A-6E depict various implementations of operation 502, depicting acquiring an offer to facilitate execution of one or more services that utilize a particular portion of a device, in exchange for access to the particular portion of the device according to embodiments. Referring now to FIG. 6A, operation 502 may include operation 602 depicting receiving data including an offer to facilitate execution of one or more services that utilize a particular portion of a device, in exchange for access to the particular portion of the device. For example, FIG. 2, e.g., FIG. 2A shows proposal to assist in performing at least one service related to a device particular portion, in return for access to the device particular portion data receiving module 202 receiving data including an offer to (e.g., a presentation to a potential recipient for which the recipient is free to accept or reject, e.g., which may be in the form of, for example "this is a service we are willing to provide, are you interested," or any variant of that) to facilitate (e.g., taking one or more actions that, whether directly or indirectly, are intended to assist in the completion, execution, or carrying out of at least a portion of) execution of (e.g., execute, intend to execute, or begin executing, or taking one or more steps to allow the execution of) one or more services (e.g., a service that analyzes a person's typing style and makes recommendations) that utilize (e.g., use, make use of, employ as a means for, employ as a tool for, make reference to, access, operation, manipulate, modify, and the like) a particular portion (e.g., a device keyboard) of a device (e.g., a laptop computer), in exchange for access to the particular portion of the device (e.g., the input device, e.g., the keyboard).

Referring again to FIG. 6A, operation 602 may include operation 604 depicting receiving data including an offer to facilitate execution of a service that locates one or more entities that utilizes a contact list of the device, in exchange for access to the contact list of the device. For example, FIG. 2, e.g., FIG. 2A, shows proposal to assist in performing a one other user location finder service, in return for access to a device friend list data receiving module 204 receiving data including an offer to facilitate execution (e.g., an offer to provide an address at which an application may be downloaded) of a service that locates (e.g., determines a position of) one or more entities (e.g., users) that utilizes (e.g., uses the contact list to find which entities to look for) of the device (e.g., a user's computer running Microsoft Outlook), in exchange for access (e.g., the ability to read all the data in) to the contact list (e.g., in an embodiment that uses Microsoft Outlook, this may be a list of all the people that have emailed the user, and the known facts about them) of the device (e.g., the user's computer).

Referring again to FIG. 6A, operation 604 may include operation 606 depicting receiving data including an offer to transmit an application configured to execute the service that locates one or more entities that utilizes the contact list of the device, in exchange for access to the contact list of the device. For example, FIG. 2, e.g., FIG. 2A, shows proposal to transmit an application configured to execute the one other user location finder service, in return for access to a device friend list data receiving module 206 receiving data (e.g., an instruction to display the offer) including an offer to transmit an application configured to execute the service that locates one or more entities (e.g., users in the user's social networking site, e.g., Facebook, friends list) that utilizes the contact list of the device (e.g., the Facebook friends list, that can be edited by the device, e.g., the user's tablet device), in exchange for access to the contact list (e.g., in exchange for being able to read the user's social networking site friend list, e.g., by providing the application with social networking site login credentials, e.g., a Facebook password) of the device).

Referring again to FIG. 6A, operation 606 may include operation 608 depicting receiving data including an offer to transmit the application configured to execute the service that locates one or more entities that utilize the contact list stored on a phone device, in exchange for access to the contact list stored on the phone device. For example, FIG. 2, e.g., FIG. 2A, shows proposal to transmit an application configured to execute the one other user location finder service, in return for access to a smartphone friend list data receiving module 208 receiving data including an offer to transmit the application configured to execute the service that locates one or more entities (e.g., users in the user's contact list) the contact list (e.g., the names and telephone numbers that a user has entered or received a call from on the smartphone device) of the device (e.g., the smartphone), in exchange for access (e.g., an ability to copy, and update at periodic intervals) to the contact list stored on the phone device (e.g., a user's smartphone).

Referring again to FIG. 6A, operation 502 may include operation 610 depicting receiving data indicating an offer to facilitate execution of one or more services that utilize a particular portion of a device, in exchange for access to the particular portion of the device. For example, FIG. 2, e.g., FIG. 2A, shows proposal to assist in performing at least one service related to a device particular portion, in return for access to the device particular portion offer detail data receiving module 210 receiving data indicating an offer to facilitate execution (e.g., provide a registration code for an application already residing on a device) of one or more services (e.g., an application that collects concert information and selects concerts a user of a device might be interested in, based on music listened to by a user of a device, e.g., a media player, or a device that includes a media player) that utilize a particular portion of a device (e.g., data indicating of the songs stored on the device, which is stored at one location on the device and has access rights set X, and the frequency with which they are played, which is stored at another location on the device and has access rights set Y), in exchange for access to the particular portion (e.g., both the data indicating the songs stored on the device, and the frequency with which the songs are played) of the device (e.g., the media player).

Referring again to FIG. 6A, operation 502 may include operation 612 depicting retrieving an offer to facilitate execution of one or more services that utilize the particular portion of the device, in exchange for access to the particular portion of the device. For example, FIG. 2, e.g., FIG. 2A, shows proposal to assist in performing at least one service related to a device particular portion, in return for access to the device particular portion retrieving module 212 retrieving (e.g., downloading, from a remote location) an offer to facilitate execution (e.g., an offer to provide a set of instructions for carrying out) of one or more services (e.g., a hiking trail status tracking application that tracks a usability of a particular hiking trail in the current climate conditions), in exchange for access to the particular portion (e.g., a temperature sensor) of the device (e.g., a personal assistant device made for hikers and/or backpackers).

Referring now to FIG. 6B, operation 502 may include operation 614 depicting detecting an offer-triggering event. For example, FIG. 2, e.g., FIG. 2B, shows trigger that signals a proposal detecting module 214 detecting (e.g., observing, realizing, identifying, receiving a notification of, and the like) an offer-triggering event (e.g., a user presses a combination of keys indicating that the user desires to see an offer).

Referring again to FIG. 6B, operation 502 may include operation 616 depicting retrieving an offer to facilitate execution of one or more services that utilize the particular portion of the device, in exchange for access to the particular portion of the device, in response to the offer-triggering event. For example, FIG. 2, e.g., FIG. 2B, shows proposal to assist in performing at least one service related to a device particular portion, in return for access to the device particular portion retrieving responsive to the trigger module 216 retrieving an offer to facilitate execution (e.g., an offer to provide one or more pieces of information to assist in the execution of, e.g., a bicycling trail map) one or more services (e.g., a bicycling trail information and status tracking application) that utilize the particular portion (e.g., a speedometer) of the device (e.g., a smart watch that measures speed and distance worn by a user on a bicycle), in exchange for access to the particular portion (e.g., the speedometer) of the device, in response to the offer-triggering event (e.g., the user pressing a button indicating they would like to see the various bicycle services available).

Referring again to FIG. 6B, operation 614 may include operation 618 depicting detecting a passage of a particular amount of time. For example, FIG. 2, e.g., FIG. 2B, shows passage of a particular amount of time that signals a proposal detecting module 218 detecting a passage of a particular amount of time (e.g., an offer is shown every twenty-four hours, and the passage of twenty-four hours acts as trigger for the offer).

Referring again to FIG. 6B, operation 614 may include operation 620 depicting receiving notification of a particular condition of the device. For example, FIG. 2, e.g., FIG. 2B, shows device condition notification that signals a proposal acquiring module 220 receiving notification of a particular condition of the device (e.g., no applications of a particular type, e.g., financial and/or banking applications, have been accessed by the user in more than seven days, and this triggers an offer for a new banking service to be executed).

Referring again to FIG. 6B, operation 620 may include operation 622 depicting receiving notification that the device is at a particular location. For example, FIG. 2, e.g., FIG. 2B, shows device at particular location notification that signals a proposal acquiring module 222 receiving notification that the device is at a particular location (e.g., an offer triggering event is that the device is located at a food court of the mall).

Referring again to FIG. 6B, operation 620 may include operation 624 depicting receiving notification that a sensor of the device has detected the particular condition. For example, FIG. 2, e.g., FIG. 2B, shows device sensor detection notification that signals a proposal acquiring module 224 receiving notification that a sensor of the device (e.g., a vehicle gas sensor) has detected the particular condition (e.g., a motor vehicle is nearing empty on gas, or the battery of a motor vehicle is nearing empty of charge).

Referring again to FIG. 6B, operation 624 may include operation 626 depicting receiving notification that a sensor of the device that is part of the particular portion has detected the particular condition. For example, FIG. 2, e.g., FIG. 2B, shows device sensor that is at least a portion of the device particular portion detection notification that signals a proposal acquiring module 226 receiving notification that a sensor (e.g., a speedometer) of the device (e.g., a motor vehicle control system) that is part of the particular portion (e.g., the particular portion is the speedometer and the storage of the vehicle's speed at different times) has detected the particular condition (e.g., the device is traveling at over sixty miles per hour).

Referring again to FIG. 6B, operation 624 may include operation 628 depicting receiving notification that a velocity sensor has detected that the device is traveling more than fifty miles per hour. For example, FIG. 2, e.g., FIG. 2B, shows velocity sensor notification that the device is traveling more than fifty miles per hour that signals a proposal acquiring module 228 receiving notification that a velocity sensor has detected that the device is traveling more than fifty miles per hour.

Referring again to FIG. 6B, operation 624 may include operation 630 depicting receiving notification that a wireless radio has detected that the device is connected to a network configured to deliver data transfer speeds greater than one megabyte per second. For example, FIG. 2, e.g., FIG. 2B, shows wireless radio notification that a network of a particular speed is connected that signals a proposal acquiring module 230 receiving notification that a wireless radio has detected that the device (e.g., a tablet device with Wi-Fi enabled and an LTE cellular radio) is connected to a network configured to deliver data transfer speeds greater than one megabyte per second.

Referring now to FIG. 6C, operation 502 may include operation 632 depicting transmitting data regarding the particular portion of the device. For example, FIG. 2, e.g., FIG. 2C, shows data comprising information regarding the particular portion of the device transmitting module 232 transmitting data (e.g., data indicating that more than fifty contacts are present in the user's contact list) regarding the particular portion (e.g., the user's contact list) of the device (e.g., a user's work computer on an enterprise network).

Referring again to FIG. 6C, operation 502 may include operation 634 depicting receiving an offer to facilitate execution of one or more services selected at least partly based on the transmitted data, in exchange for access to the particular portion of the device. For example, FIG. 2, e.g., FIG. 2C, shows proposal to assist in performing at least one service selected at least partly based on the transmitted data in return for device access receiving module 234 receiving an offer to facilitate execution of one or more services (e.g., an offer to provide a download for an application for organizing pictures) selected at least partly based on the transmitted data (e.g., the transmitted data indicates that there are more than 200 pictures in a single directory on the user's device), in exchange for access to the particular portion (e.g., the image data) of the device (e.g., a user's computer).

Referring again to FIG. 6C, operation 632 may include operation 636 depicting transmitting data regarding an amount of data stored in the particular portion of the device. For example, FIG. 2, e.g., FIG. 2C, shows data including an amount of data stored in the particular portion of the device transmitting module 236 transmitting data regarding an amount of data (e.g., transmitting data indicating that more than 500 Pearl Jam songs are present on the device) stored in the particular portion (e.g., the music storing section) of the device (e.g., a smartphone configured to play music, e.g., an Apple iPhone).

Referring again to FIG. 6C, operation 632 may include operation 638 depicting transmitting data regarding a type of data stored in the particular portion of the device. For example, FIG. 2, e.g., FIG. 2C shows data including a type of data stored in the particular portion of the device transmitting module 238 transmitting data regarding a type of data (e.g., data indicating that a particular device stores barometric pressure data) stored in the particular portion (e.g., the device memory) of the device (e.g., a smartphone device with a barometer).

Referring again to FIG. 6C, operation 632 may include operation 640 depicting transmitting data indicating a property of data stored in the particular portion. For example, FIG. 2, e.g., FIG. 2C, shows data indicating a property of data stored in the particular portion of the device transmitting module 240 transmitting data indicating a property of data (e.g., the transmitted data indicates that of the velocity data stored in the particular portion, there are more than twenty examples of the velocity sensor detecting velocity of more than seventy miles per hour) stored in the particular portion (e.g., the velocity sensor and collected data of a motor vehicle control and monitoring system installed by a third party, e.g., an insurance company).

Referring again to FIG. 6C, operation 640 may include operation 642 depicting transmitting data indicating that a contact list data stored in the particular portion has more than fifty entries. For example, FIG. 2, e.g., FIG. 2C, shows data indicating that contact list data stored in the particular portion of the device has more than fifty entries transmitting module 242 transmitting data indicating that a contact list data stored in the particular portion has over fifty entries.

Figure 6D:
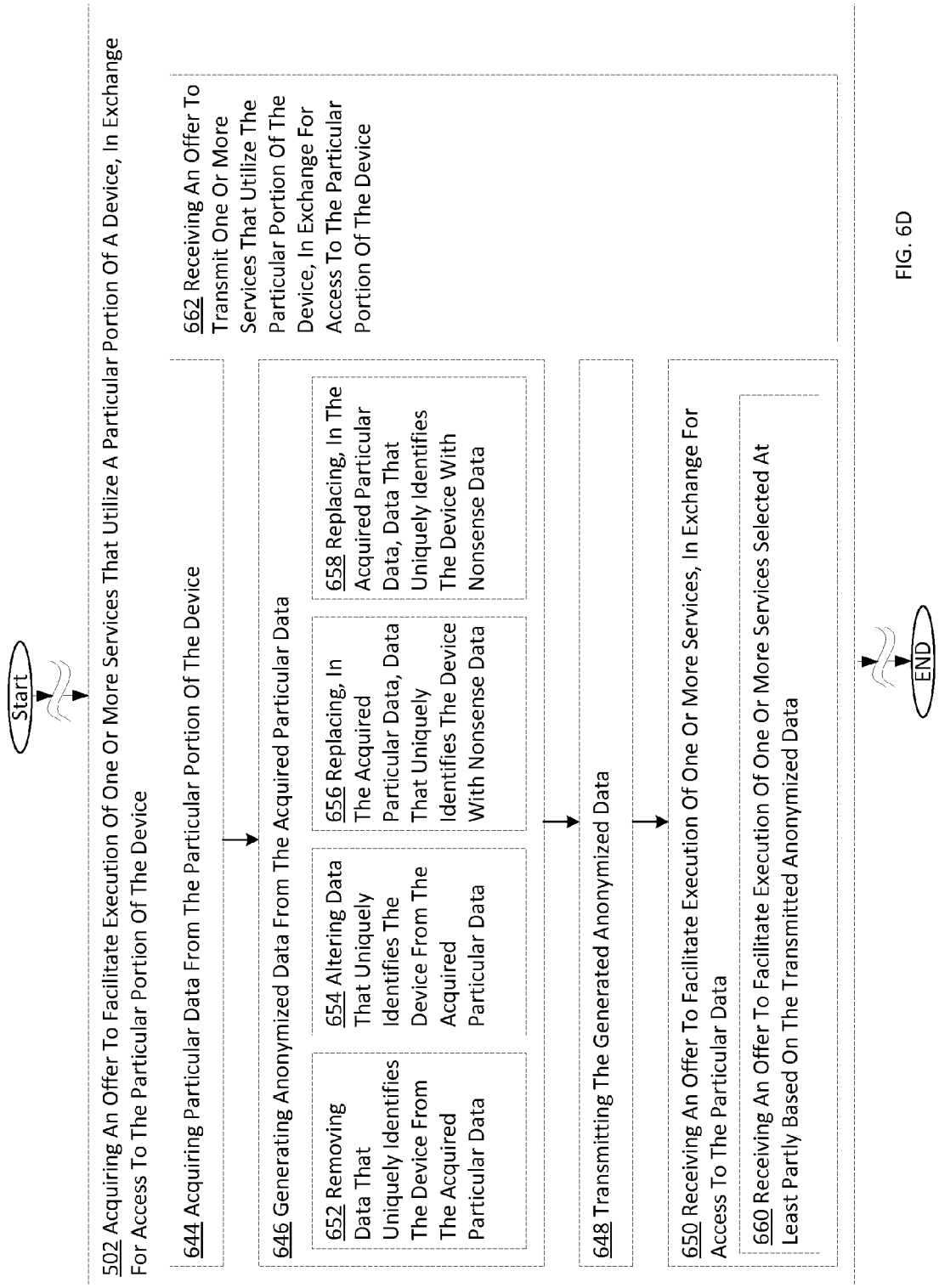
FIG. 6D is a high-level logic flow chart of a process depicting alternate implementations of an acquiring an offer operation 502, according to one or more embodiments.

Referring now to FIG. 6D, operation 502 may include operation 644 depicting acquiring particular data from the particular portion of the device. For example, FIG. 2, e.g., FIG. 2D, shows particular data from particular portion acquiring module 244 acquiring (e.g., creating, generating, storing, receiving, and/or retrieving) particular data (e.g., data indicating a position of the device and a device identification number) from the particular portion (e.g., the portion of memory storing the position information) of the device (e.g., a personal navigation system).

Referring again to FIG. 6D, operation 502 may include operation 646 depicting generating anonymized data from the acquired particular data. For example, FIG. 2, e.g., FIG. 2D, shows obscured data generating from acquired particular data module 246 generating (e.g., removing the uniquely identifying information, e.g., the device identification number) anonymzied data (e.g., data that does not uniquely identify the device) from the acquired particular data (e.g., data including the position of the device).

Referring again to FIG. 6D, operation 502 may include operation 648 depicting transmitting the generated anonymized data. For example, FIG. 2, e.g., FIG. 2D, shows obscured data transmitting module 248 transmitting (e.g., transmitting to a remote location, e.g., an entity that handles anonymous data) the generated anonymzied data (e.g., position data for which the device identification number has been removed).

Referring again to FIG. 6D, operation 502 may include operation 650 depicting receiving an offer to facilitate execution of one or more services, in exchange for access to the particular data. For example, FIG. 2, e.g., FIG. 2D, shows proposal to assist in performing at least one service related to a device particular portion acquiring module 250 receiving an offer to facilitate execution of one or more services (e.g., a rest stop finding service), in exchange for access to the particular data (e.g., data that includes uniquely identifying information, e.g., the device identification number and the position data of the device).

Referring again to FIG. 6D, operation 646 may include operation 652 depicting removing data that uniquely identifies the device from the acquired particular data. For example, FIG. 2, e.g., FIG. 2D, shows uniquely identifying information removing from acquired particular data module 252 removing (e.g., deleting) data that uniquely identifies the device (e.g., MAC address data for a network-enabled device, e.g., a tablet device) from the acquired particular data (e.g., data regarding the songs stored on the device).

Referring again to FIG. 6D, operation 646 may include operation 654 depicting altering data that uniquely identifies the device from the acquired particular data. For example, FIG. 2, e.g., FIG. 2D, shows uniquely identifying information altering from acquired particular data module 254 altering (e.g., changing, modifying, encrypting, obscuring, supplementing, or otherwise making one or more changes to) data that uniquely identifies the device (e.g., a unique device name on a network, e.g., "mom's computer") from the acquired particular data (e.g., web browsing history).

Referring again to FIG. 6D, operation 646 may include operation 656 depicting replacing, in the acquired particular data, data that uniquely identifies the device with nonsense data. For example, FIG. 2, e.g., FIG. 2D, shows uniquely identifying information from acquired particular data replacing with false data module 256 replacing, in the acquired particular data, data that uniquely identifies the device (e.g., MAC address data) with nonsense data (e.g., replacing the hexadecimal characters of the MAC address with randomly-selected hexadecimal characters, in a nonrepeating fashion (e.g., the first encountered "A" may be replaced with a "7" and the next encountered "A" may be replaced with a "9," for example).

Referring again to FIG. 6D, operation 646 may include operation 658 depicting adding, to the acquired particular data, data that is similar in format to data that uniquely identifies the device, and that is nonsense data. For example, FIG. 2, e.g., FIG. 2D, shows false data that is similarly formatted to uniquely identifying information adding to acquired particular data module 258 adding, to the acquired particular data (e.g., data identifying an IP address of the device that generated the data), data that is similar in format (e.g., four numbers ranging from zero to two hundred fifty five, for IPv4 data) to data that uniquely identifies the device (e.g., the IP address of a laptop), and is nonsense data (e.g., the added data is randomly selected data).

Referring again to FIG. 6D, operation 650 may include operation 660 depicting receiving an offer to facilitate execution of one or more services selected at least partly based on the transmitted anonymized data. For example, FIG. 2, e.g., FIG. 2D, shows proposal to assist in performing at least one service that is selected at least partly based on the transmitted obscured data acquiring module 260 receiving an offer to facilitate execution of one or more services (e.g., a new music finding service) selected at least partly based on the transmitted anonymzied data (e.g., a list of the songs stored on the device (e.g., a Microsoft Zune HD music player), with the device's identifier on the marketplace (e.g., the device's Microsoft Zune Marketplace identifier obscured or removed).

Referring again to FIG. 6D, operation 502 may include operation 662 depicting receiving an offer to transmit one or more services that utilize the particular portion of the device, in exchange for access to the particular portion of the device. For example, FIG. 2, e.g., FIG. 2D, shows proposal to assist in performing at least one service that uses to a device particular portion, in return for access to the device particular portion acquiring module 262 receiving an offer to transmit one or more services (e.g., a soda pop vending machine locating service) that utilize the particular portion of the device (e.g., a temperature sensor and a location sensor), in exchange for access to the particular portion of the device (e.g., a smartphone).

Figure 6E:
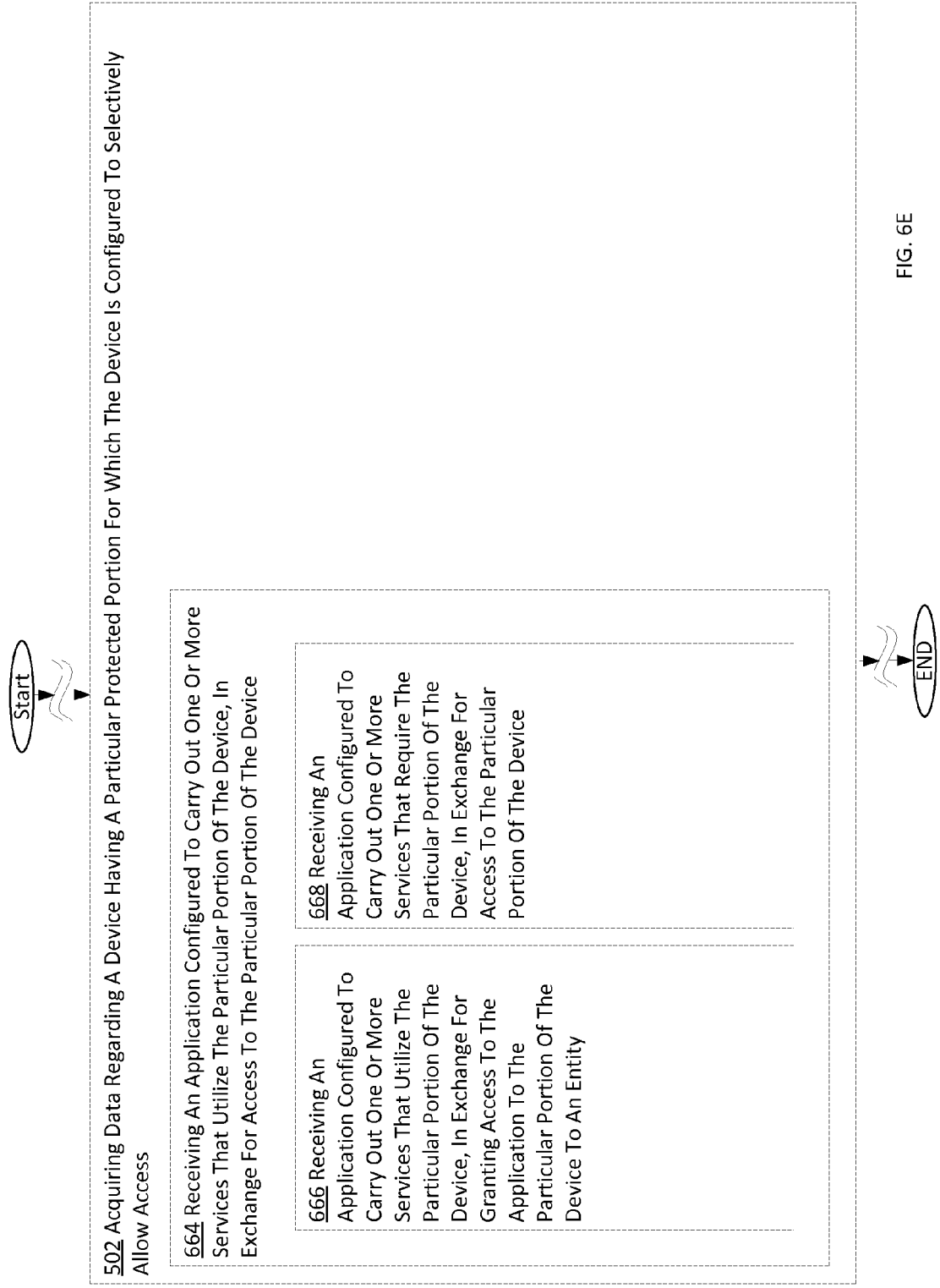
FIG. 6E is a high-level logic flow chart of a process depicting alternate implementations of an acquiring an offer operation 502, according to one or more embodiments.

Referring now to FIG. 6E, operation 502 may include operation 664 depicting receiving an application configured to carry out one or more services that utilize the particular portion of the device, in exchange for access to the particular portion of the device. For example, FIG. 2, e.g., FIG. 2E, shows proposal to assist in performing at least one service using the device particular portion, in return for access to the device particular portion acquiring module 264 receiving an application (e.g., a pickup football game scheduler that compares friends' locations and schedules) configured to carry out one or more services that utilize the particular portion of the device (e.g., a telephone number contact list stored on a smartphone), in exchange for access to the particular portion (e.g., the block of memory where the telephone number contact list is stored) of the device (e.g., a smartphone, e.g., an HTC Evo).

Referring again to FIG. 6E, operation 664 may include operation 666 depicting receiving an application configured to carry out one or more services that utilize the particular portion of the device, in exchange for granting access to the particular portion of the device to an entity. For example, FIG. 2, e.g., FIG. 2E, shows proposal to acquire an application configured to perform at least one service using the device particular portion, in return for application access to the device particular portion acquiring module 266 receiving an application configured to carry out one or more services (e.g., a bicycle-riding mapping application) that utilize the particular portion of the device (e.g., a velocity sensor), in exchange for granting access to the particular portion of the device to an entity (e.g., the developer of the bicycle-riding mapping application).

Referring again to FIG. 6E, operation 664 may include operation 668 depicting receiving an application configured to carry out one or more services that require the particular portion of the device, in exchange for access to the particular portion of the device. For example, FIG. 2, e.g., FIG. 2E, shows proposal to acquire an application configured to perform at least one service that requires data stored in the device particular portion, in return for access to the device particular portion acquiring module 268 receiving an application (e.g., a working time tracking application) configured to carry out one or more services (e.g., tracking an employee's use of their time in order to boost efficiency) that require the particular portion (e.g., the portion of the memory that shows which application windows are open on a computer, and for what duration) of the device (e.g., a user's work computer), in exchange for access to the particular protected portion of the device (e.g., the user's work computer).

Figure 7A:
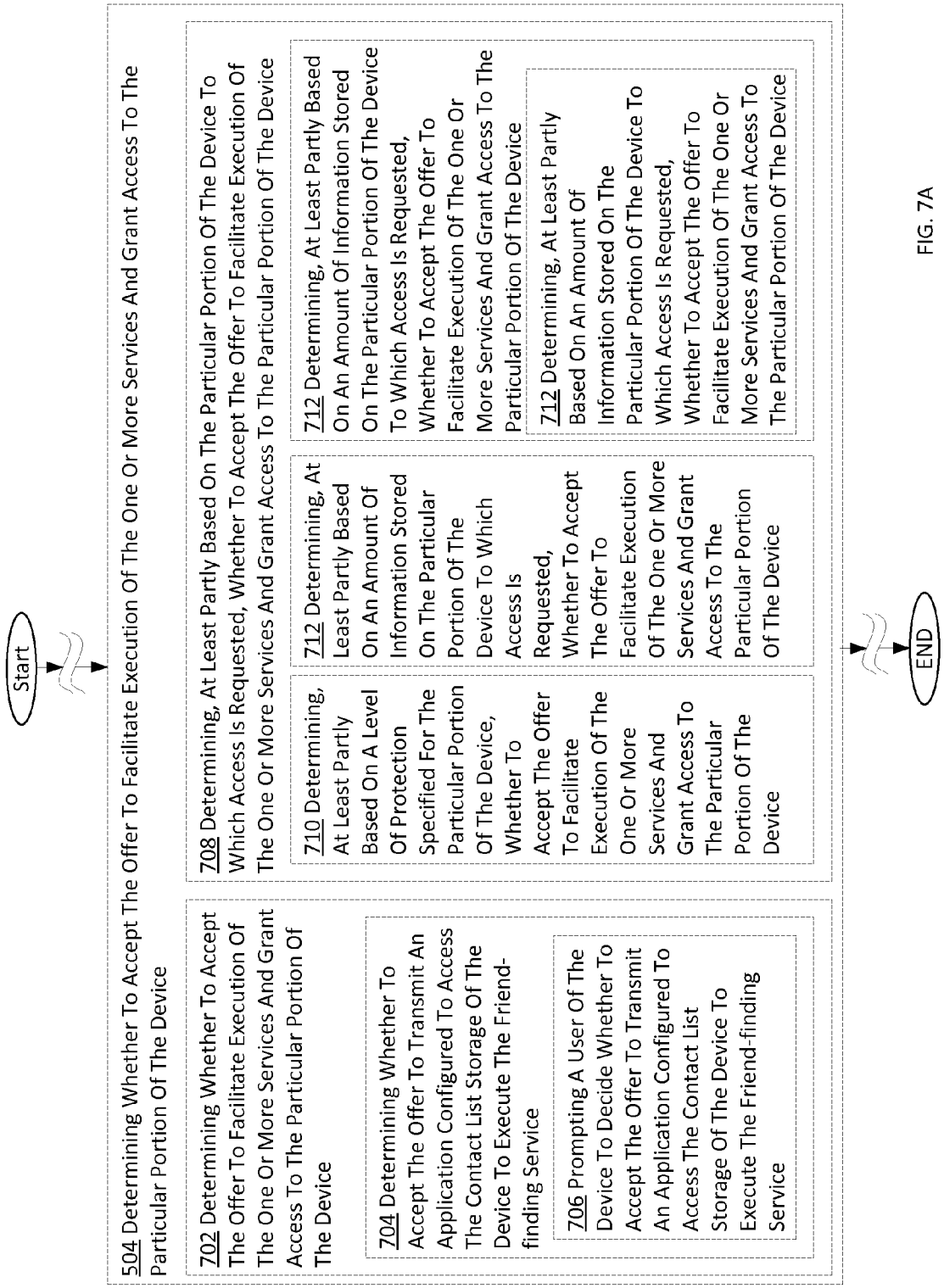
FIG. 7A is a high-level logic flow chart of a process depicting alternate implementations of a determining whether to accept the offer module 504, according to one or more embodiments.

FIGS. 7A-7F depict various implementations of operation 504, depicting determining whether to accept the offer to facilitate execution of the one or more services and grant access to the particular portion of the device, according to embodiments. Referring now to FIG. 7A, operation 504 may include operation 702 depicting determining whether to accept the offer to facilitate execution of a friend-finding service and grant access to a contact list storage of the device. For example, FIG. 3, e.g., FIG. 3A, shows proposal to assist in performing a friend finding service related to a device contact list to which access is requested acceptance determining module 302 determining whether to accept the offer to facilitate execution of a friend-finding service and grant access to a contact list storage (e.g., stored on a SIM card) of the device (e.g., a GSM-enabled smartphone, e.g., a Nokia E9 phone).

Referring again to FIG. 7A, operation 702 may include operation 704 depicting determining whether to accept the offer to transmit an application configured to access the contact list storage of the device to execute the friend-finding service. For example, FIG. 3, e.g., FIG. 3A, shows proposal to transmit an application configured to access the device contact list to perform a friend finding service acceptance determining module 304 determining whether to accept the offer to transmit an application (e.g., an application that carries out the friend-finding service when the user runs the application) configured to access the contact list storage (e.g., the hard drive memory) of the device (e.g., a user's laptop computer) to execute the friend-finding service.

Referring again to FIG. 7A, operation 704 may include operation 706 depicting prompting a user of the device to decide whether to accept the offer to transmit an application configured to access the contact list storage of the device to execute the friend-finding service. For example, FIG. 3, e.g., FIG. 3A, shows proposal to transmit an application configured to access the device contact list to perform a friend finding service user decision prompting module 306 prompting a user of the device (e.g., displaying a screen that requests the user's input) to decide whether to accept the offer to transmit an application (e.g., the friend-finding application) configured to access the contact list storage of the device (e.g., a tablet device) to execute the friend-finding service.

Referring again to FIG. 7A, operation 504 may include operation 708 depicting determining, at least partly based on the particular portion of the device to which access is requested, whether to accept the offer to facilitate execution of the one or more services and grant access to the particular portion of the device. For example, FIG. 3, e.g., FIG. 3A, shows proposal to assist in performing the at least one service related to the device particular portion to which access is requested acceptance determining using the particular portion of the device as a factor module 308 determining, at least partly based on the particular portion (e.g., a temperature sensor) of the device (e.g., a diver's watch worn by a hiker in Antarctica) to which access is requested, whether to accept the offer to facilitate execution of the one or more services (e.g., a research station weather status tracking application) and grant access to the particular portion (e.g., the temperature sensor) of the device (e.g., the diver's watch).

Referring again to FIG. 7A, operation 708 may include operation 710 depicting determining, at least partly based on a level of protection specified for the particular portion of the device, whether to accept the offer to facilitate execution of the one or more services and grant access to the particular portion of the device. For example, FIG. 3, e.g., FIG. 3A, shows proposal to assist in performing the at least one service related to the device particular portion to which access is requested acceptance determining based on a protection level associated with the device particular portion module 310 determining, at least partly based on a level of protection (e.g., a level of protection that outside entities can only access the data with specific permission from the user) specified for the particular portion (e.g., the user's identification of her favorite songs on the device) of the device (e.g., a portable music player, e.g., a Microsoft Zune), whether to accept the offer to facilitate execution of the one or more services (e.g., a music playlist creating service) and grant access to the particular portion (e.g., the favorite song identification section) of the device (e.g., the portable music player).

Referring again to FIG. 7A, operation 708 may include operation 712 depicting determining, at least partly based on an amount of information stored on the particular portion of the device to which access is requested, whether to accept the offer to facilitate execution of the one or more services and grant access to the particular portion of the device. For example, FIG. 3, e.g., FIG. 3A, shows proposal to assist in performing the at least one service related to the device particular portion to which access is requested acceptance determining based on an amount of data associated with the device particular portion module 312 determining, at least partly based on an amount of information (e.g., if a position sensor has detected more than fifty unique locations) stored on the particular portion (e.g., the favorite locations list) of the device (e.g., a portable navigation system) to which access is requested, whether to accept the offer to facilitate execution of the one or more services (e.g., a "find new fun places" service) and grant access to the particular portion of the device (e.g., the portable navigation system).

Referring now to FIG. 7B, operation 708 may include operation 714 depicting determining, at least partly based on whether the particular portion of the device contains one or more pieces of data designated as limited access whether to accept the offer to facilitate execution of the one or more services and grant access to the particular portion of the device. For example, FIG. 3, e.g., FIG. 3B, shows proposal to assist in performing the at least one service related to the device particular portion to which access is requested acceptance determining using security designation of one or more data segments of the device particular portion device as a factor module 314 determining, at least partly based on whether the particular portion (e.g., the picture storage) of the device (e.g., a network-enabled pocket digital camera) contains one or more pieces of data (e.g., pictures) designated as limited access (e.g., the user may have designated one or more pictures taken as "private" or "intimate," and detection of one of those pieces of data may factor into the determination of whether to accept the offer to facilitate execution and grant access) whether to accept the offer to facilitate execution of the one or more services (e.g., a pictures taken sharing service) and grant access to the particular portion (e.g., the picture storage area) of the device (e.g., the network-enabled pocket digital camera).

Referring again to FIG. 7B, operation 714 may include operation 716 depicting determining, at least partly based on whether a web browsing history of the device contains one or more visited websites designated as limited access, whether to accept the offer to facilitate execution of the one or more services and grant access to the particular portion of the device. For example, FIG. 3, e.g., FIG. 3B, shows proposal to assist in performing the at least one service related to a device web browser page visit history to which access is requested acceptance determining using limited access designation of a visited page as a factor module 316 determining, at least partly based on whether a web browsing history of the device (e.g., the laptop computer) contains one or more visited websites designated as limited access (e.g., the user may have visited particular websites that the user wants to keep private, and has designated as such, and in an example, if the device comes across one of those web pages, then a determination is made not to accept the offer), whether to accept the offer to facilitate execution of the one or more services (e.g., a common web page caching and updating service for offline and/or faster reading), and grant access to the particular portion (e.g., the web browsing history) of the device).

Referring again to FIG. 7B, operation 708 may include operation 718 depicting determining, at least partly based on a type of information stored on the particular portion of the device, whether to accept the offer to facilitate execution of the one or more services and grant access to the particular portion of the device. For example, FIG. 3, e.g., FIG. 3B, shows proposal to assist in performing the at least one service related to the device particular portion to which access is requested acceptance determining using type of data associated with the device particular portion as a factor module 318 determining, at least partly based on a type of information (e.g., a determination that there is blood pressure information, and the user may not want to allow access to that information) stored on the particular portion (e.g., the health profile storage portion) of the device (e.g., an athletic training assistance body monitoring device), whether to accept the offer to facilitate execution of the one or more services (e.g., an optimal workout designing service), and grant access to the particular portion of the device (e.g., the athletic training assistance body monitoring device).

Referring again to FIG. 7B, operation 718 may include operation 720 depicting determining, at least partly based on whether the information stored on the particular portion of the device is location information, whether to accept the offer to facilitate execution of the one or more services and grant access to the particular portion of the device. For example, FIG. 3, e.g., FIG. 3B, shows proposal to assist in performing the at least one service related to the device particular portion to which access is requested acceptance determining due to data associated with the device particular portion as location data module 320 determining, at least partly based on whether the information stored on the particular portion of the device (e.g., a user's smartphone) is location information (e.g., information about where the device is positioned, for which a user may have instructed the device not to grant access), whether to accept the offer to facilitate execution of the one or more services (e.g., an application that plans stops and sights and bathroom breaks on a road trip) and grant access to the particular portion of the device).

Referring again to FIG. 7B, operation 708 may include operation 722 depicting determining, at least partly based on an amount of information collected by the particular portion of the device, whether to accept the offer to facilitate execution of the one or more services and grant access to the particular portion of the device. For example, FIG. 3, e.g., FIG. 3B, shows proposal to assist in performing the at least one service related to the device particular portion to which access is requested acceptance determining using size of data sample collected by a sensor of the device particular portion as a factor module 322 determining, at least partly based on an amount of information (e.g., a barometer may have collected more than five thousand samples, and the user may wish to keep that information protected, e.g., proprietary, for various reasons, e.g., because with enough data, an outside person could reliably determine where that weather station was located) collected by the particular portion of the device (e.g., the barometer of a home weather station), whether to accept the offer to facilitate execution of the one or more services (e.g., a weather forecasting service) and grant access to the particular portion of the device (e.g., the home weather station).

Referring again to FIG. 7B, operation 708 may include operation 724 depicting determining, at least partly based on how often a sensor that is part of the particular portion of the device is collecting data, whether to accept the offer to facilitate execution of the one or more services and grant access to the particular portion of the device. For example, FIG. 3, e.g., FIG. 3B, shows proposal to assist in performing the at least one service related to the device particular portion to which access is requested acceptance determining using data collection frequency by a sensor of the device particular portion as a factor module 324 determining, at least partly based on how often a sensor (e.g., a velocity sensor) that is part of the particular portion of the device (e.g., a motor vehicle control system) is collecting data (e.g., if the velocity sensor is sampling the velocity every second, that may weigh against the decision to release the data, since that might be more likely to catch the user exceeding the speed limit in their vehicle), whether to accept the offer to facilitate execution of the one or more services (e.g., a driving habit tracking service), and grant access to the particular portion (e.g., a velocity sensor, e.g., a speedometer) of the device (e.g., a motor vehicle).

Figure 7C:
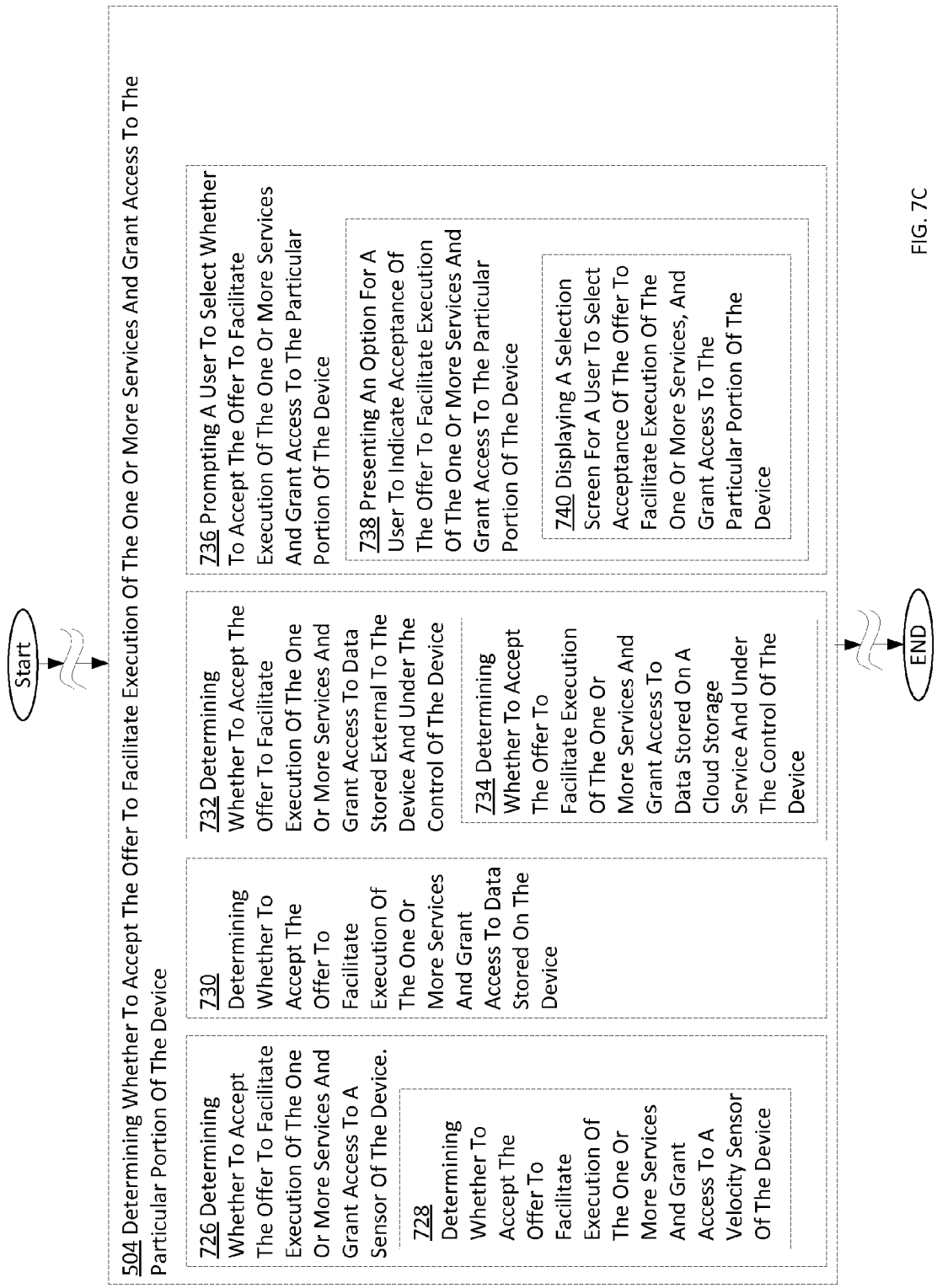
FIG. 7C is a high-level logic flow chart of a process depicting alternate implementations of a determining whether to accept the offer module 504, according to one or more embodiments.

Referring now to FIG. 7C, operation 504 may include operation 726 determining whether to accept the offer to facilitate execution of the one or more services and grant access to a sensor of the device. For example, FIG. 3, e.g., FIG. 3C, shows proposal to assist in performing the at least one service related to a device sensor to which access is requested acceptance determining module 326 determining whether to accept the offer to facilitate execution of the one or more services (e.g., a pickup football game scheduler that compares friends' locations and schedules) and grant access to a sensor (e.g., a GPS sensor) of the device (e.g., a user's smartphone).

Referring again to FIG. 7C, operation 726 may include operation 728 depicting determining whether to accept the offer to facilitate execution of the one or more services and grant access to a velocity sensor of the device. For example, FIG. 3, e.g., FIG. 3C, shows proposal to assist in performing the at least one service related to a device speedometer to which access is requested acceptance determining module 328 determining whether to accept the offer to facilitate execution of the one or more services (e.g., a "how green are you" service that tracks the user's habits to determine their environmental impact, e.g., driving habits inside the user's motor vehicle) and grant access to a velocity sensor of the device (e.g., a user's smartphone that has a velocity sensor).

Referring again to FIG. 7C, operation 504 may include operation 730 depicting determining whether to accept the offer to facilitate execution of the one or more services and grant access to data stored on the device. For example, FIG. 3, e.g., FIG. 3C, shows proposal to assist in performing the at least one service related to particular device data to which access is requested acceptance determining module 330 determining whether to accept the offer to facilitate execution of the one or more services (e.g., a personal money and savings management service) and grant access to data (e.g., financial data from a spreadsheet, e.g., a Microsoft Excel spreadsheet) stored on the device (e.g., a computer).

Referring again to FIG. 7C, operation 504 may include operation 732 depicting determining whether to accept the offer to facilitate execution of the one or more services and grant access to data stored external to the device and under the control of the device. For example, FIG. 3, e.g., FIG. 3C, shows proposal to assist in performing the at least one service related to particular device data controlled by and external to the device to which access is requested acceptance determining module 332 determining whether to accept the offer to facilitate execution of the one or more services (e.g., a story building application that builds a narrative story out of a user's twitter feed and a user's friends' microblogging service feed, e.g., Twitter feed) and grant access to data stored external to the device (e.g., a user's tweets that the user posted to Twitter) and under the control of the device (e.g., the user can make a tweet private, or delete, remove, or otherwise control access to the tweet made by the user).

Referring again to FIG. 7C, operation 732 may include operation 734 depicting determining whether to accept the offer to facilitate execution of the one or more services and grant access to data stored on a cloud storage service and under the control of the device. For example, FIG. 3, e.g., FIG. 3C, shows proposal to assist in performing the at least one service related to particular device data controlled by the device and stored with a cloud service to which access is requested acceptance determining module 334 determining whether to accept the offer to facilitate execution of the one or more services (e.g., whether to download a program that downloads user fan art for media stored in a user's cloud storage) and grant access to data (e.g., lists of media stored on the cloud storage) stored on a cloud storage service and under the control of the device (e.g., the computer that manages what data remains in the cloud, e.g., any computer for which the user can access the data stored in their segment of the cloud storage).

Referring again to FIG. 7C, operation 504 may include operation 736 depicting prompting a user to select whether to accept the offer to facilitate execution of the one or more services and grant access to the particular portion of the device. For example, FIG. 3, e.g., FIG. 3C, shows proposal to assist in performing the at least one service related to the device particular portion to which access is requested user decision prompting module 336 prompting a user (e.g., verbally asking a user if they want to accept the service offer) to select whether to accept the offer to facilitate execution of the one or more services (e.g., an in-game item recommending service that observes a user playing a game that supports in-game purchases, and recommends items for that user to purchase in-game) and grant access to the particular portion (e.g., the portion running the game) of the device (e.g., a computer running a computer game).

Referring again to FIG. 7C, operation 736 may include operation 738 depicting presenting an option for a user to indicate acceptance of the offer to facilitate execution of the one or more services and grant access to the particular portion of the device. For example, FIG. 3, e.g., FIG. 3C, shows option for user to select a proposal to perform the at least one service related to the device particular portion to which access is requested presenting module 338 presenting an option (e.g., presenting a yes/no checkbox) for a user to indicate acceptance of the offer to facilitate execution of the one or more services (e.g., a steak dinner finding service) and grant access to the particular portion (e.g., the GPS sensor that shows the user's current location) of the device (e.g., a user's smartphone).

Referring again to FIG. 7C, operation 736 may include operation 740 depicting displaying a selection screen for a user to select acceptance of the offer to facilitate execution of the one or more services, and grant access to the particular portion of the device. For example, FIG. 3, e.g., FIG. 3C, shows selection screen for user to interact with to decide whether to accept the proposal to perform the at least one service related to the device particular portion to which access is requested screen presenting module 340 displaying a selection screen for a user to select acceptance of the offer (e.g., a screen reading "press ok to accept the ideal garden planting time calculating service") to facilitate execution (e.g., allow download of planting timetables to an application) of the one or more services (e.g., the ideal garden planting time calculating service), and grant access to the particular portion (e.g., an ambient light sensor) of the device (e.g., a garden monitoring tool).

Figure 7D:
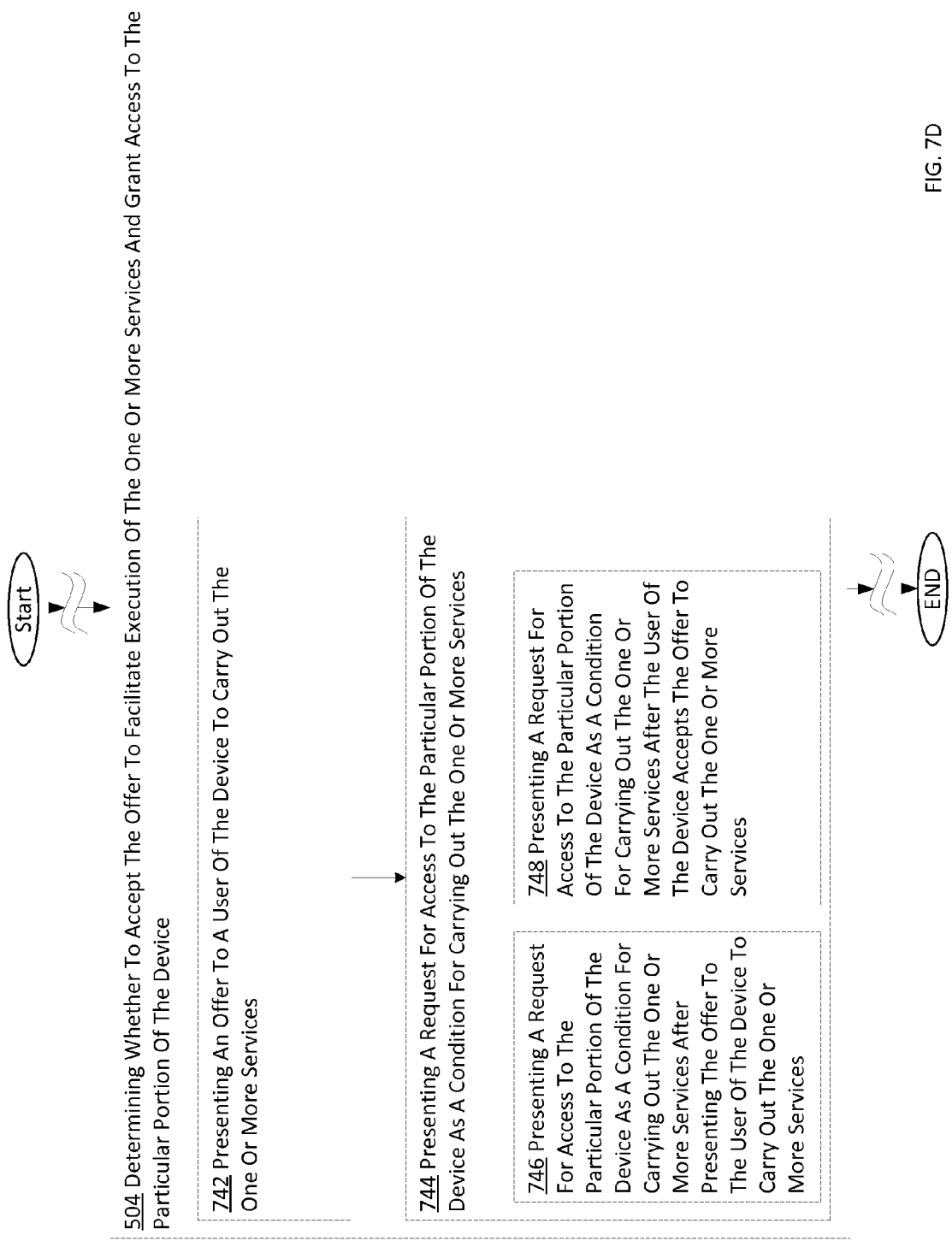
FIG. 7D is a high-level logic flow chart of a process depicting alternate implementations of a determining whether to accept the offer module 504, according to one or more embodiments.

Referring now to FIG. 7D, operation 504 may include operation 742 depicting presenting an offer to a user of the device to carry out the one or more services. For example, FIG. 3, e.g., FIG. 3D, shows proposal to carry out at least a portion of the one or more services presenting to a user of the device module 342 presenting an offer to a user of the device to carry out the one or more services (e.g., displaying a rule book for a sport or game being played in the proximity of the device)

Referring now to FIG. 7D, operation 504 may include operation 744 depicting presenting a request for access to the particular portion of the device as a condition for carrying out the one or more services. For example, FIG. 3, e.g., FIG. 3D, shows request for access to the device particular portion presenting to user as a condition for carrying out the at least a portion of the one or more services module 344 presenting a request for access to the particular portion (e.g., a location sensor) of the device (e.g., a smartphone) as a condition for carrying out the one or more services (e.g., without location, the service can't display the rule book for the sport or game being played in the proximity of the device, e.g., the BCS National Championship game in college football).

Referring again to FIG. 7D, operation 744 may include operation 746 depicting presenting a request for access to the particular portion of the device as a condition for carrying out the one or more services after presenting the offer to the user of the device to carry out the one or more services. For example, FIG. 3, e.g., FIG. 3D, shows request for access to the device particular portion presenting as a condition for carrying out the at least a portion of the one or more services to the user after presenting the proposal to carry out at least a portion of the one or more services module 346 presenting a request for access to the particular portion (e.g., the wireless radio) of the device as a condition for carrying out the one or more services (e.g., a service for managing data transfer over a tablet that has wireless and cellular connections) after presenting the offer to the user of the device to carry out the one or more services.

Referring again to FIG. 7D, operation 744 may include operation 748 depicting presenting a request for access to the particular portion of the device as a condition for carrying out the one or more services after the user of the device accepts the offer to carry out the one or more services. For example, FIG. 3, e.g., FIG. 3D, shows request for access to the device particular portion presenting as a condition for carrying out the at least a portion of the one or more services to the user after the user has accepted the proposal to carry out at least a portion of the one or more services module 348 presenting a request for access to the particular portion (e.g., an inventory stored in memory) of the device (e.g., an updating inventory of what is in the refrigerator that is stored and maintained on the device, e.g., a smart appliance, e.g., a smart refrigerator in a user's house) as a condition for carrying out the one or more services (e.g., an alternative health-food finding service) after the user of the device accepts the offer to carry out the one or more services (e.g., the alternative health-food finding service).

Figure 7E:
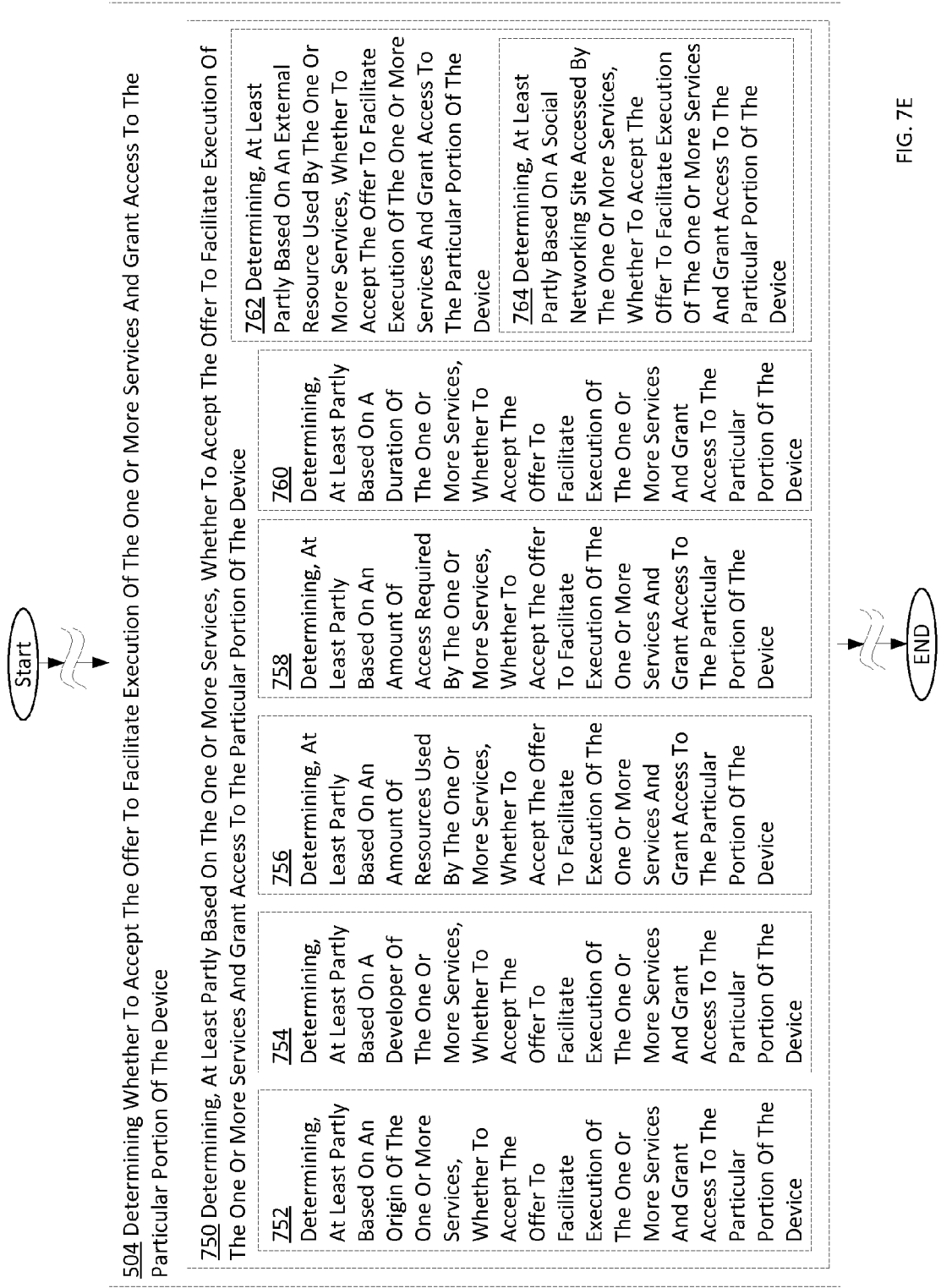
FIG. 7E is a high-level logic flow chart of a process depicting alternate implementations of a determining whether to accept the offer module 504, according to one or more embodiments.

Referring now to FIG. 7E, operation 504 may include operation 750 depicting determining, at least partly based on the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on the at least one service module 350 determining, at least partly based on the one or more services (e.g., a service identifying which grocery store has the freshest inventory of blackberries), whether to accept the offer (e.g., the decision partly factors in how much the user likes blackberries, which could be known in a number of different ways, e.g., how much time the user spends on blackberry-related websites, how much time the device is positioned in known blackberry fields, how many blackberries are bought online using the device, how many blackberry recipes are stored in the user's online recipe book, and so forth) to facilitate execution of the one or more services (e.g., the service identifying which grocery store has the freshest inventory of blackberries) and grant access to the particular portion of the device (e.g., a location sensor to determine where the nearest grocery stores are).

Referring again to FIG. 7E, operation 750 may include operation 752 depicting determining, at least partly based on an origin of the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining least partly based on an origination property of the at least one service module 352 determining, at least partly based on an origin (e.g., a server that the service originated from, e.g., if a money management service originated from the U.S. Mint, then that might weigh in favor (or against, in other embodiments) of accepting the offer because the service is ostensibly a government-sanctioned service) of the one or more services (e.g., a service designed to teach the user to conserve money and save wisely), whether to accept the offer to facilitate execution of the one or more services and grant access to the particular portion of the device (e.g., the user's spreadsheet of their finances).

Referring again to FIG. 7E, operation 750 may include operation 754 depicting determining, at least partly based on a developer of the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on a creator of the at least one service module 354 determining, at least partly based on a developer of the one or more services (e.g., a workout designing service developed by a company founded by Arnold Schwarzenegger, for example), whether to accept the offer to facilitate execution of the one or more services, and grant access to the particular portion (e.g., heart rate monitor) of the device (e.g., a training assistance device).

Referring again to FIG. 7E, operation 750 may include operation 756 depicting determining, at least partly based on an amount of resources used by the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on an amount of device resources demanded by the at least one service module 358 determining, at least partly based on an amount of resources (e.g., an amount of time the image capturing sensor will be occupied) used by the one or more services (e.g., an automatic trip logging and scrapbooking service that uses the device camera for a variety of functions, e.g., logging locations and landmarks), whether to accept the offer to facilitate execution of the one or more services and grant access to the particular portion (e.g., the image capturing sensor) of the device (e.g., a tablet device, e.g., an Apple iPad).

Referring again to FIG. 7E, operation 750 may include operation 758 depicting determining, at least partly based on an amount of access required by the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on an amount of device access demanded by the at least one service module 360 determining, at least partly based on an amount of access (e.g., if there is a service that only uses a histogram information of a picture to classify the picture, that might be alright, but a service that captures the entire picture for use might not be allowed access) required by the one or more services (e.g., a photograph cataloging service), whether to accept the offer to facilitate execution of the one or more services (e.g., the photograph cataloging service) and grant access to the particular portion of the device (e.g., the photo storage on a tablet device, e.g., an Asus A500 tablet).

Referring again to FIG. 7E, operation 750 may include operation 760 depicting determining, at least partly based on a duration of the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on an estimated duration of the at least one service module 360 determining, at least partly based on a duration of the one or more services (e.g., for a trip planning service, whether the service stops when the trip is over, or continues until explicitly removed), whether to accept the offer to facilitate execution of the one or more services (e.g., a trip planning service) and grant access to the particular portion (e.g., the velocity sensor) of the device (e.g., a personal navigation system mounted in a vehicle windshield).

Referring again to FIG. 7E, operation 750 may include operation 762 depicting determining, at least partly based on an external resource used by the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on one or more external resources requested by the at least one service module 362 determining, at least partly based on an external resource (e.g., an online game profile stored on a game manufacturer server) used by the one or more services (e.g., a cross-game competition platform that tracks a user's score across multiple games and creates a total gamer score used to compare with other game players that might be playing a different set of games), whether to accept the offer to facilitate execution of the one or more services (e.g., a game competition platform) and grant access to the particular portion (e.g., the portion that logs gameplay time and which game is being played) of the device (e.g., the video game system, e.g., the Nintendo Wii).

Referring again to FIG. 7E, operation 750 may include operation 764 depicting determining, at least partly based on a social networking site accessed by the one or more services, whether to accept the offer to facilitate execution of the one or more services and grant access to the particular portion of the device. For example, FIG. 3, e.g., FIG. 3E, shows proposal to assist in performing the at least one service related to the device particular portion to which access is requested acceptance determining at least partly based on one or more external social networking site resources requested by the at least one service module 364 determining, at least partly based on a social networking site (e.g., Facebook) accessed by the one or more services (e.g., a "profile attractiveness increasing service" designed to get a user's Facebook profile, e.g., for a user's band, more exposure), whether to accept the offer (e.g., some users and/or devices may not wish for a service to have access to social networking site, e.g., Facebook, information) to facilitate execution of the one or more services (e.g., the profile attractiveness increasing service) and grant access to the particular portion (e.g., names of the band's songs stored on the device) of the device (e.g., a band member's smartphone). It is noted that, in an embodiment, the particular portion of the device is the portion that controls at least a portion of the social networking site interaction. In another embodiment, the particular portion may be unrelated or not directly related via the one or more services to the social networking site access required to carry out the service.

Figure 7F:
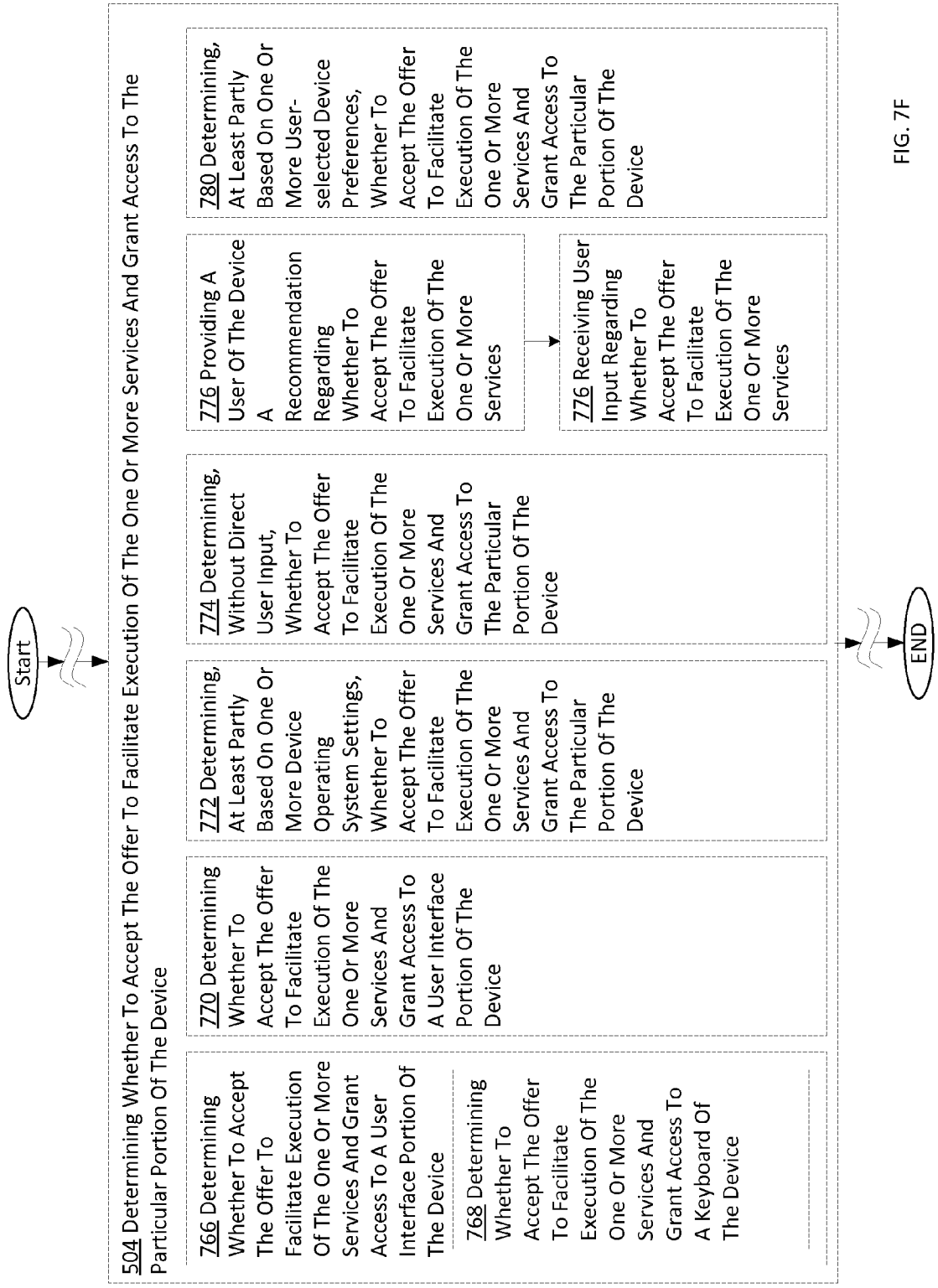
FIG. 7F is a high-level logic flow chart of a process depicting alternate implementations of a determining whether to accept the offer module 504, according to one or more embodiments.

Referring now to FIG. 7F, operation 504 may include operation 766 depicting determining whether to accept the offer to facilitate execution of the one or more services and grant access to a user interface portion of the device. For example, FIG. 3, e.g., FIG. 3F, shows proposal to assist in performing the at least one service related to a device user interface to which access is requested acceptance determining module 366 determining whether to accept the offer to facilitate execution of the one or more services (e.g., determining one or more books a user of the device might like to read) and grant access to a user interface portion (e.g., see which books the user selects on the touchscreen by receiving the input/output data from the user interface, e.g., the touchscreen) of the device (an e-reader, e.g., an Amazon Kindle, or a Barnes and Noble Nook).

Referring again to FIG. 7F, operation 766 may include operation 768 depicting determining whether to accept the offer to facilitate execution of the one or more services and grant access to a keyboard of the device. For example, FIG. 3, e.g., FIG. 3F, shows proposal to assist in performing the at least one service related to a device keyboard to which access is requested acceptance determining module 368 determining whether to accept the offer to facilitate execution of the one or more services (e.g., a Wikipedia caching service which captures a user's entries into Wikipedia via the keyboard, and caches the related sites for further research offline at a later date) and grant access to a keyboard of the device (e.g., a netbook, e.g., an ASUS EeePc).

Referring again to FIG. 7F, operation 504 may include operation 770 depicting determining, at least partly based on one or more device settings, whether to accept the offer to facilitate execution of the one or more services and grant access to the particular portion of the device. For example, FIG. 3, e.g., FIG. 3F, shows proposal to assist in performing the at least one service related to the device particular portion to which access is requested acceptance determining, at least partly based on one or more device settings module 370 determining, at least partly based on one or more device settings (e.g., a device may be set to "always allow access to services from Amazon.com," which, in an embodiment, e.g., in the event of buying a tablet device from Amazon, e.g., a Kindle Fire, that setting may be programmed into the device; and, in another embodiment, e.g., an ASUS tablet is purchased from Amazon.com, that setting may be set to on as a default, but changeable by the user), whether to accept the offer to facilitate execution of the one or more services (e.g., determining one or more books a user of the device might like to read) and grant access to the particular portion of the device (e.g., the user's e-book reading history).

Referring again to FIG. 7F, operation 504 may include operation 772 depicting determining, at least partly based on one or more device operating system settings, whether to accept the offer to facilitate execution of the one or more services and grant access to the particular portion of the device. For example, FIG. 3, e.g., FIG. 3F, shows proposal to assist in performing the at least one service related to the device particular portion to which access is requested acceptance determining, at least partly based on one or more device operating system settings module 372 determining, at least partly based on one or more device operating system (e.g., Microsoft Windows, Google Android, Apple iOS, and the like) settings (e.g., an Apple iOS setting may be configured to always grant access to a set of Apple-branded services), whether to accept the offer to facilitate execution of the one or more services (e.g., a service that shows what other Apple products that might interest the user are available for purchase at the nearest Apple store, based on the user's previous activity) and grant access to the particular portion (e.g., device location history and web browsing history) of the device (e.g., a smartphone, e.g., an Apple iPhone).

Referring again to FIG. 7F, operation 504 may include operation 774 depicting determining, without direct user input, whether to accept the offer to facilitate execution of the one or more services and grant access to the particular portion of the device. For example, FIG. 3, e.g., FIG. 3F, shows proposal to assist in performing the at least one service related to the device particular portion to which access is requested acceptance determining, in an absence of direct user input regarding the proposal module 374 determining, without direct user input (e.g., on a laptop, a user set a flag to "never allow access to services regardless of what they offer"), whether to accept the offer to facilitate execution of the one or more services (e.g., a service that estimates how much time until it starts raining) and grant access to the particular portion (e.g., a home weather station peripheral attached to a computer) of the device (e.g., the home weather station peripheral of a user's home computer).

Referring again to FIG. 7F, operation 504 may include operation 776 depicting providing a user of the device a recommendation regarding whether to accept the offer to facilitate execution of the one or more services. For example, FIG. 3, e.g., FIG. 3F, shows recommendation to user regarding whether to accept the proposal to assist in performing the at least one service providing module 376 providing a user of the device a recommendation (e.g., this could be in the form of a statistic, e.g., "this service will utilize less than 2% of the device available resources," or in the form of "Google recommends you install this service," or a middle ground, e.g., "Apple has analyzed this service and recommends that you accept this service!") regarding whether to accept the offer to facilitate execution of the one or more services (e.g., a service that displays on a map for the user, a legend of the nearest automated teller machine devices ("ATMs") and the service fee for each of the ATMs).

Referring again to FIG. 7F, operation 504 may include operation 778 depicting receiving user input regarding whether to accept the offer to facilitate execution of the one or more services. For example, FIG. 3, e.g., FIG. 3F, shows user selection regarding acceptance of the proposal to assist in performing the at least one service receiving module 378 receiving user input (e.g., the user presses a soft button on a touchscreen to either "accept" or "deny" regarding whether to accept the offer to facilitate execution of the one or more services (e.g., a service to provide the user with directions to the nearest public bathroom and information regarding the rating of the public bathroom by other users).

Referring again to FIG. 7F, operation 504 may include operation 780 depicting determining, at least partly based on one or more user-selected device preferences, whether to accept the offer to facilitate execution of the one or more services and grant access to the particular portion of the device. For example, FIG. 3, e.g., FIG. 3G, shows proposal to assist in performing the at least one service related to the device particular portion to which access is requested acceptance determining at least partly based on a user-configured preference module 380 determining, at least partly based on one or more user-selected device preferences (e.g., always allow access to the position sensor but not the velocity sensor," or "only allow access to pictures stored in the 'Work Pictures' folder"), whether to accept the offer to facilitate execution of the one or more services (e.g., mapping the population density in the vicinity of the user of the device) and grant access to the particular portion (e.g., the position sensor) of the device (e.g., the user's smartphone).

Figure 8A:
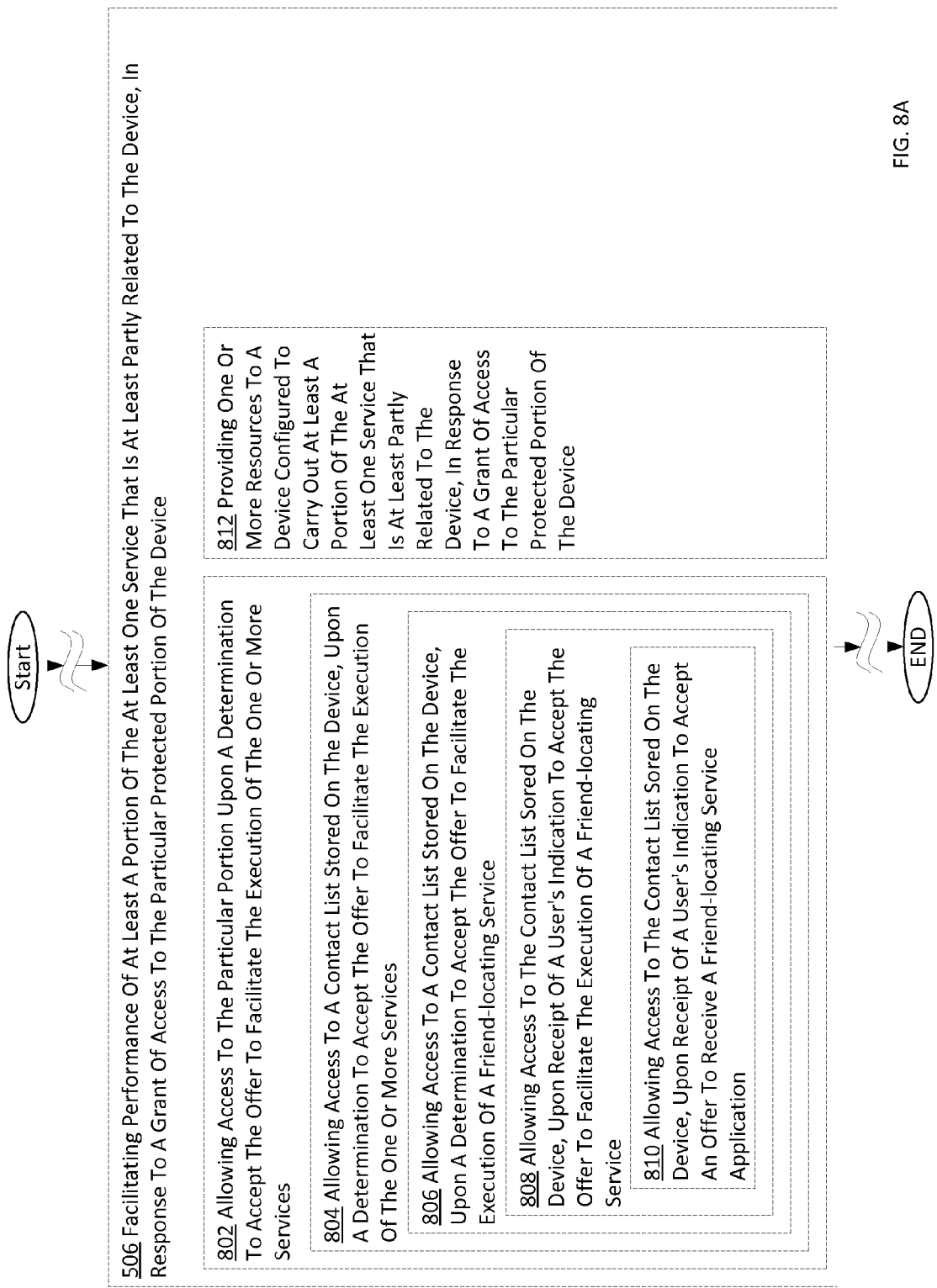
FIG. 8A is a high-level logic flow chart of a process depicting alternate implementations of a particular portion access facilitating operation 506, according to one or more embodiments.
Figure 8B:
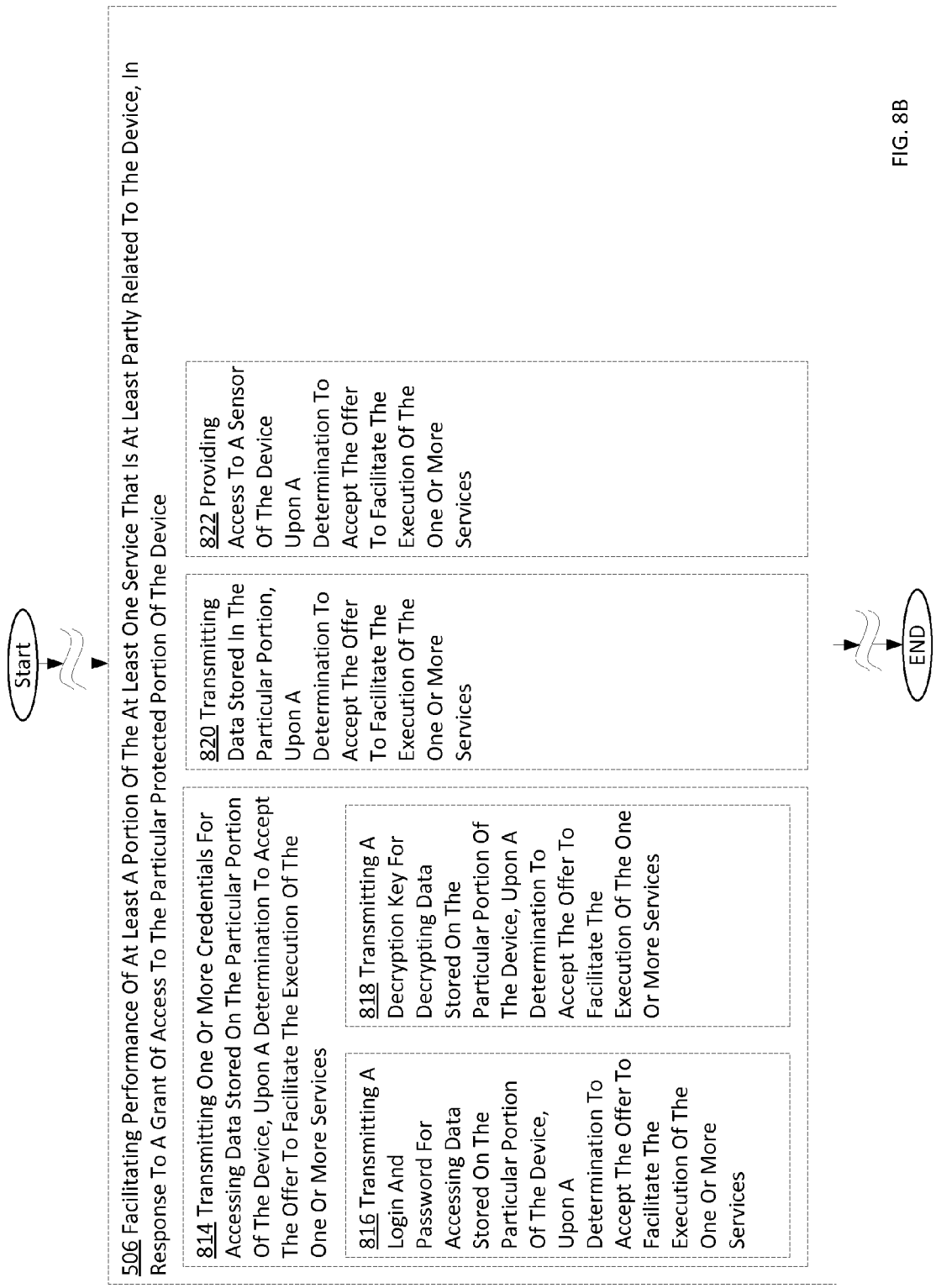
FIG. 8B is a high-level logic flow chart of a process depicting alternate implementations of a particular portion access facilitating operation 506, according to one or more embodiments.

FIGS. 8A-8C depict various implementations of operation 506 depicting facilitating access to the particular portion upon a determination to accept the offer to facilitate the execution of the one or more services, according to embodiments. Referring now to FIG. 8A, operation 506 may include operation 802 depicting allowing access to the particular portion upon a determination to accept the offer to facilitate the execution of the one or more services. For example, FIG. 4, e.g., FIG. 4A, shows access to the device particular portion allowing upon decision to accept proposal to assist in performing the at least one service module 402 allowing access to the particular portion (e.g., a device memory that stores a user's prior reviews of different desserts that were posted online) upon a determination to accept the offer to facilitate the execution of the one or more services (e.g., a restaurant dessert comparison service).

Referring again to FIG. 8A, operation 802 may include operation 804 depicting allowing access to a contact list stored on the device, upon a determination to accept the offer to facilitate the execution of the one or more services. For example, FIG. 4, e.g., FIG. 4A, shows access to a previously stored contact list upon decision to accept proposal to assist in performing the at least one service module 404 allowing access to a contact list stored on the device (e.g., a user's work computer running a thin-client with access to Microsoft Outlook email and contact management service), upon a determination to accept the offer to facilitate the execution of the one or more services (e.g., a service that automatically sends an email to each person in the contact list on their birthday).

Referring again to FIG. 8A, operation 804 may include operation 806 depicting allowing access to a contact list stored on the device, upon a determination to accept the offer to facilitate the execution of a friend-locating service. For example, FIG. 4, e.g., FIG. 4A, shows access to a previously stored contact list upon decision to accept proposal to assist in performing a friend in contact list finding service module 404 allowing access to a contact list stored on the device (e.g., a user's smartphone), upon a determination to accept the offer (e.g., the device settings indicate that access to contact lists should be provided to company-sponsored services, so acceptance can be handled without direct user input) to facilitate the execution of a friend-locating service.

Referring again to FIG. 8A, operation 806 may include operation 808 depicting allowing access to the contact list stored on the device, upon receipt of a user's indication to accept the offer to facilitate the execution of a friend-locating service. For example, FIG. 4, e.g., FIG. 4A, shows access to a previously stored contact list upon receipt of user instruction to accept proposal to assist in performing a friend in contact list finding service module 408 allowing access to the contact list stored on the device, upon receipt of a user's indication to accept the offer to facilitate the execution of the friend-locating service.

Referring again to FIG. 8A, operation 808 may include operation 810 depicting allowing access to the contact list stored on the device, upon receipt of a user's indication to accept an offer to receive a friend-locating service application. For example, FIG. 4, e.g., FIG. 4A, shows access to a previously stored contact list upon receipt of user instruction to accept proposal to receive an application configured to perform the friend in contact list finding service module 410 allowing access to the contact list stored on the device (e.g., a tablet device), upon receipt of a user's indication (e.g., via interaction with a touchscreen of the device) to accept an offer to receive a friend-locating service application (e.g., from a network site sponsored by an operating system producer of the device, e.g., Google's Android).

Referring again to FIG. 8A, operation 506 may include operation 812 depicting granting access to the particular portion upon a determination to accept the offer to facilitate the execution of the one or more services. For example, FIG. 4, e.g., FIG. 4A, shows access to the device particular portion granting upon completion of a device operation for determining whether to accept proposal to assist in performing the at least one service module 412 granting access to the particular portion (e.g., a positioning sensor) upon a determination to accept the offer to facilitate the execution of the one or more services (e.g., a service that shows where the nearest available taxi is to the device's position).

Referring now to FIG. 8B, operation 506 may include operation 814 depicting transmitting one or more credentials for accessing data stored on the particular portion of the device, upon a determination to accept the offer to facilitate the execution of the one or more services. For example, FIG. 4, e.g., FIG. 4B, shows one or more device particular portion access credentials transmitting upon decision to accept proposal to assist in performing the at least one service module 414 transmitting one or more credentials (e.g., a copy of a certificate of verification performed by the device) for accessing data (e.g., photograph data) stored on the particular portion of the device (e.g., stored in the memory of a desktop computer), upon a determination to accept the offer to facilitate the execution of the one or more services (e.g., an auto-scrapbooking service that generates automated scrapbooks from unsorted pictures stored on a device).

Referring again to FIG. 8B, operation 814 may include operation 816 depicting transmitting a login and password for accessing data stored on the particular portion of the device, upon a determination to accept the offer to facilitate the execution of the one or more services. For example, FIG. 4, e.g., FIG. 4B, shows login and password information for device particular portion transmitting upon decision to accept proposal to assist in performing the at least one service module 416 transmitting a login and a password for accessing data (e.g., web browser history) stored on the particular portion (e.g., device memory made for web browsing history) of the device, upon a determination to accept the offer to facilitate the execution of the one or more services (e.g., a service that shows if there is a store within five miles of the device's location that has the item that the user has viewed a website for purchasing for a less expensive price).

Referring again to FIG. 8B, operation 814 may include operation 818 depicting transmitting a decryption key for decrypting data stored on the particular portion of the device, upon a determination to accept the offer to facilitate the execution of the one or more services. For example, FIG. 4, e.g., FIG. 4B, shows data stored in device particular portion unlocking information transmitting upon decision to accept proposal to assist in performing the at least one service module 418 transmitting a decryption key for decrypting data (e.g., financial account numbers) stored on the particular portion of the device (e.g., a portion of a desktop computer where a user's personal financial information is stored, e.g., inside a spreadsheet), upon a determination to accept the offer to facilitate the execution of the one or more services (e.g., a day trading service that targets people who were identified anonymously as having more than 100,000 dollars in assets to trade).

Referring again to FIG. 8B, operation 506 may include operation 820 depicting transmitting data stored in the particular portion, upon a determination to accept the offer to facilitate the execution of the one or more services. For example, FIG. 4, e.g., FIG. 4B, shows data under control of device particular portion transmitting upon decision to accept proposal to assist in performing the at least one service module 420 transmitting data stored in the particular portion (e.g., transmitting data stored in the particular portion (e.g., location data), upon a determination to accept the offer to facilitate the execution (e.g., to allow access to updated mapping services performed at a server) of the one or more services (e.g., service that shows a route through Washington, D.C., that avoids all roundabouts that has been made available to an OEM-produced motor vehicle control system, upon acceptance of the offer to allow access to the location data).

Referring again to FIG. 8B, operation 506 may include operation 822 depicting providing access to a sensor of the device upon a determination to accept the offer to facilitate the execution of the one or more services. For example, FIG. 4, e.g., FIG. 4B, shows access to at least one sensor that is part of the device particular portion granting upon decision to accept proposal to assist in performing the at least one service module 422 providing access to a sensor (e.g., a wireless radio) of the device (e.g., a tablet device) upon a determination to accept the offer to facilitate the execution of the one or more services (e.g., a service that looks to optimize wireless network strength and connectivity based on a user's location and available wireless networks, and by analyzing throughput and speed of those networks).

Referring now to FIG. 8C, operation 506 may include operation 824 depicting transmitting an acceptance of the offer to facilitate the execution of the one or more services. For example, FIG. 4, e.g., FIG. 4C, shows acceptance of proposal to assist in performing the at least one service transmitting module 424 transmitting an acceptance if the offer to facilitate the execution of the one or more services (e.g., a hiking trail status tracking application configured to determine which trails in proximity to the user are open, based on time of year, current climate conditions, and one or more other factors).

Referring again to FIG. 8C, operation 506 may include operation 826 depicting permitting access to the particular portion of the device. For example, FIG. 4, e.g., FIG. 4C, shows access to the device particular portion granting module 426 permitting (e.g., granting, or allowing, for an entity that previously did not have something) access to the particular portion (e.g., a user's deleted emails) of the device (e.g., a user's office computer connected to an enterprise network).

Referring again to FIG. 8C, operation 826 may include operation 828 depicting modifying a permission setting for the particular portion of the device. For example, FIG. 4, e.g., FIG. 4C, shows permission setting for the device particular portion modifying to grant access module 428 modifying a permission setting (e.g., from "limited access" to "full access" or from "no access" to "read-only access") for the particular portion (e.g., the position information) of the device (e.g., a smartphone, e.g., a Nokia Windows Phone 920).

Referring again to FIG. 8C, operation 826 may include operation 830 depicting adding a provider of the one or more services to a list of entities permitted to access the particular portion of the device. For example, FIG. 4, e.g., FIG. 4C, shows provider of the one or more services adding to device particular portion permitted entity access list module 430 adding a provider (e.g., an entity that provides the one or more services, e.g., a third party developer, e.g., Zynga game developers) of the one or more services (e.g., a new game service) to a list of entities permitted to access the particular portion (e.g., the user's real name and game account) of the device (e.g., a portable gaming system, e.g., a Sony PlayStation Portable).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
   circuitry configured for transmitting an indication of a sensed position of a device, the position of the device sensed at least partially using at least one hardware-based position sensor of the device;
   circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image;
   circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image; and
   circuitry configured for facilitating access to the storage portion of the device for transmission of the at least one image upon accepting a user input associated with capturing the at least one image, at least one transmission of the at least one image occurring subsequent to capture of the at least one image.

2. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
   circuitry configured for detecting an offer-triggering event; and
   circuitry configured for retrieving an offer to facilitate cloud-based storage of at least one image to be accessible to one or more other users of the cloud-based storage in exchange for access to a storage portion of the device in response to the offer-triggering event.

3. The system of claim 2, wherein circuitry configured for detecting an offer-triggering event comprises:
   circuitry configured for receiving notification of a particular condition of the device.

4. The system of claim 3, wherein circuitry configured for receiving notification of a particular condition of the device comprises:
   circuitry configured for receiving notification that a hardware-based position sensor of the device has detected that the device is at a particular location at which at least one image is desired to be stored by the cloud-based storage.

5. The system of claim 3, wherein circuitry configured for receiving notification of a particular condition of the device comprises:
   circuitry configured for receiving notification that a wireless radio of the device has detected that the device is connected to a network configured to deliver data transfer speeds greater than a particular threshold data transfer speed.

6. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
   circuitry configured for transmitting data regarding the storage portion of the device; and
   circuitry configured for receiving an offer to facilitate cloud-based storage of at least one image to be accessible to one or more other users of the cloud-based storage at least partly based on the transmitted data in exchange for access to the storage portion of the device.

7. The system of claim 6, wherein circuitry configured for transmitting data regarding the storage portion of the device comprises:

circuitry configured for transmitting data regarding at least one of a type of data or a property of data stored in the storage portion of the device.

8. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
- circuitry configured for acquiring particular data from the storage portion of the device;
- circuitry configured for generating anonymized data from the acquired particular data;
- circuitry configured for transmitting the generated anonymized data; and
- circuitry configured for receiving an offer to facilitate cloud-based storage of at least one image to be accessible to one or more other users of the cloud-based storage in exchange for access to the particular data.

9. The system of claim 8, wherein circuitry configured for generating anonymized data from the acquired particular data comprises:
- circuitry configured for removing data that uniquely identifies the device from the acquired particular data.

10. The system of claim 8, wherein circuitry configured for generating anonymized data from the acquired particular data comprises:
- circuitry configured for altering data that uniquely identifies the device from the acquired particular data.

11. The system of claim 8, wherein circuitry configured for generating anonymized data from the acquired particular data comprises:
- circuitry configured for adding, to the acquired particular data, data that is similar in format to data that uniquely identifies the device, and that is nonsense data.

12. The system of claim 8, wherein circuitry configured for receiving an offer to facilitate cloud-based storage of at least one image to be accessible to one or more other users of the cloud-based storage in exchange for access to the particular data comprises:
- circuitry configured for receiving an offer to facilitate cloud-based storage of at least one image to be accessible to one or more other users of the cloud-based storage at least partly based on the transmitted anonymized data.

13. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
- circuitry configured for receiving an offer to transmit one or more services that utilize the storage portion of the device in exchange for access to the storage portion of the device.

14. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
- circuitry configured for receiving an application configured to carry out one or more services that utilize the storage portion of the device in exchange for access to the storage portion of the device.

15. The system of claim 14, wherein circuitry configured for receiving an application configured to carry out one or more services that utilize the storage portion of the device in exchange for access to the storage portion of the device comprises:
- circuitry configured for receiving an application configured to carry out one or more services that require access to the storage portion of the device in exchange for access to the storage portion of the device.

16. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
- circuitry configured for requesting a user input related to whether to capture and upload at least one image for cloud-based storage of the at least one image to be accessible to one or more other users of the cloud-based storage.

17. The system of claim 16, wherein circuitry configured for requesting a user input related to whether to capture and upload at least one image for cloud-based storage of the at least one image to be accessible to one or more other users of the cloud-based storage comprises:
- circuitry configured for causing the at least one notification to the user of the device, the at least one notification associated with informing the user of the device that the user is located proximate to at least one location of interest at least partially based on the transmitted indication of the sensed position of the device.

18. The system of claim 17, wherein circuitry configured for causing the at least one notification to the user of the device, the at least one notification associated with informing the user of the device that the user is located proximate to at least one location of interest at least partially based on the transmitted indication of the sensed position of the device comprises:
- circuitry configured for signaling an operating system of the device to at least one of chime, vibrate, or light an indicator of the device in accordance with at least one user-selected device preferences associated with a manner of notification.

19. The system of claim 16, wherein circuitry configured for requesting a user input related to whether to capture and upload at least one image for cloud-based storage of the at least one image to be accessible to one or more other users of the cloud-based storage comprises:
- circuitry configured for causing the device to display at least one indication of a location of interest in proximity of the sensed position of the device and to display a request to at least one of capture or upload at least one image of the location of interest in proximity of the sensed position of the device.

20. The system of claim 19, wherein circuitry configured for causing the device to display at least one indication of a location of interest in proximity of the sensed position of the device and to display a request to at least one of capture or upload at least one image of the location of interest in proximity of the sensed position of the device comprises:
circuitry configured for causing the device to display a message informing a user of the device that the at least one image of the location of interest in proximity of the sensed position of the device that is at least one of captured or uploaded will be accessible to one or more individuals with access to the cloud-based storage.

21. The system of claim 16, wherein circuitry configured for requesting a user input related to whether to capture and upload at least one image for cloud-based storage of the at least one image to be accessible to one or more other users of the cloud-based storage comprises:
circuitry configured for receiving at least one indication that the user of the device intends to capture at least one image while in proximity of the sensed position of the device;
circuitry configured for activating an image sensor of the device to capture the at least one image; and
circuitry configured for transmitting the at least one image for cloud-based storage of the at least one image.

22. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
circuitry configured for determining whether to accept the offer to facilitate the cloud-based storage of the at least one image and to grant access by one or more other users of the cloud-based storage to the at least one image via the cloud-based storage.

23. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
circuitry configured for prompting a user to select whether to accept the offer to facilitate the cloud-based storage of the at least one image and grant access by one or more other users of the cloud-based storage to the at least one image via the cloud-based storage.

24. The system of claim 23, wherein circuitry configured for prompting a user to select whether to accept the offer to facilitate the cloud-based storage of the at least one image and grant access by one or more other users of the cloud-based storage to the at least one image via the cloud-based storage comprises:
circuitry configured for presenting an option for a user to indicate acceptance of the offer to facilitate the cloud-based storage of the at least one image and grant access by one or more other users of the cloud-based storage to the at least one image via the cloud-based storage.

25. The system of claim 24, wherein circuitry configured for presenting an option for a user to indicate acceptance of the offer to facilitate the cloud-based storage of the at least one image and grant access by one or more other users of the cloud-based storage to the at least one image via the cloud-based storage comprises:
circuitry configured for displaying a selection screen for a user to select acceptance of the offer to facilitate the cloud-based storage of the at least one image and grant access to the particular portion of the device.

26. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
circuitry configured for presenting a notification to the user of the device that a location of interest is within proximity of the device and an offer to to facilitate cloud-based storage of at least one image of the location of interest; and
circuitry configured for presenting a request that the user of the device upload one or more of at least one captured image or at least one stored image associated with the location of interest for storage in the cloud-based storage.

27. The system of claim 26, wherein circuitry configured for presenting a request that the user of the device upload one or more of at least one captured image or at least one stored image associated with the location of interest for storage in the cloud-based storage comprises:
circuitry configured for presenting a request that the user of the device grant access by one or more other users to the at least one captured image or at least one stored image associated with the location of interest as a condition for facilitating the cloud-based storage.

28. The system of claim 27, wherein circuitry configured for presenting a request that the user of the device grant access by one or more other users to the at least one captured image or at least one stored image associated with the location of interest as a condition for facilitating the cloud-based storage comprises:
circuitry configured for inferring a grant of access by one or more other users to the at least one captured image or at least one stored image associated with the location of interest from acceptance by the user of the device of at least one set of terms and conditions relating to usage of at least one of the cloud-based storage or the device previous to acquiring the offer.

29. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to (i) accept the offer to facilitate the cloud-based storage of the at least one image to be accessible to one or more other users of the cloud-based storage, the at least one image presumed to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image.

30. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device in a manner configured by one or more user-selected device preferences, (b) at least one display of the device to prompt the user of the device to capture the at least one image while in proximity of the sensed position of the device, and (c) accepting a user input indicative of whether the user of the device desires to provide the at least one image.

31. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to accept the offer to facilitate cloud-based storage of the at least one image by at least one search engine provider.

32. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to accept the offer to facilitate cloud-based storage of the at least one image by at least one wireless telecommunications carrier.

33. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to accept the offer to facilitate cloud-based storage of the at least one image by at least one, at least partly based on a social networking site.

34. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:
  circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to provide at least one image, including prompting the user of the device to at least one of capture the at least one image while in proximity of the sensed position of the device or upload at least one other image, and (c) accepting a user input indicative of whether the user of the device desires to provide the at least one image.

35. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:

circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) activation by the user of an image sensing component of the device.

36. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:

circuitry configured for providing a user of the device a recommendation regarding whether to accept the offer to facilitate the cloud-based storage of the at least one image; and circuitry configured for receiving user input regarding whether to accept the offer to facilitate the cloud-based storage of the at least one image.

37. The system of claim 1, wherein circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image comprises:

circuitry configured for determining whether to (i) accept the offer to facilitate the cloud-based storage of the at least one image to be accessible to one or more other users of the cloud-based storage, the at least one image to be captured by the device while in proximity of the sensed position of the device, and (ii) grant access by the one or more other users of the cloud-based storage to the at least one image, the at least one image having been stored at least temporarily in the storage portion of the device previous to the at least one image being transmitted to the cloud-based storage, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image.

38. The system of claim 1, wherein circuitry configured for facilitating access to the storage portion of the device for transmission of the at least one image upon accepting a user input associated with capturing the at least one image, at least one transmission of the at least one image occurring subsequent to capture of the at least one image comprises:

circuitry configured for transmitting the at least one image for storage in the cloud-based storage in association with one or more other images related to a location of interest proximate to the sensed position of the device captured by one or more other users.

39. The system of claim 1, wherein circuitry configured for facilitating access to the storage portion of the device for transmission of the at least one image upon accepting a user input associated with capturing the at least one image, at least one transmission of the at least one image occurring subsequent to capture of the at least one image comprises:

circuitry configured for transmitting the at least one image for storage in the cloud-based storage, the at least one image to be accessible by the one or more other users at least partially via a search by the one or more other users related to a location of interest assumed to be a subject of the at least one image.

40. The system of claim 1, wherein circuitry configured for facilitating access to the storage portion of the device for transmission of the at least one image upon accepting a user input associated with capturing the at least one image, at least one transmission of the at least one image occurring subsequent to capture of the at least one image comprises:

circuitry configured for transmitting the at least one image for storage in the cloud-based storage, the at least one image to be accessible by the one or more other users at least partially via a search by the one or more other users related to a street address associated with a location of interest assumed to be a subject of the at least one image.

41. The system of claim 1, wherein circuitry configured for facilitating access to the storage portion of the device for transmission of the at least one image upon accepting a user input associated with capturing the at least one image, at least one transmission of the at least one image occurring subsequent to capture of the at least one image comprises:

circuitry configured for transmitting the at least one image from the storage portion of the device to the cloud-based storage subsequent to capture by the user of the device of the at least one image.

42. The system of claim 1, wherein circuitry configured for facilitating access to the storage portion of the device for transmission of the at least one image upon accepting a user input associated with capturing the at least one image, at least one transmission of the at least one image occurring subsequent to capture of the at least one image comprises:

circuitry configured for facilitating access to a photo gallery portion of the device for transmission of at least one image stored in the photo gallery portion of the device.

43. A system, comprising
at least one processing device; and
one or more instructions which, when executed by the at least one processing device, cause the at least one processing device to perform one or more operations including at least:
  transmitting an indication of a sensed position of a device, the position of the device sensed at least partially using at least one hardware-based position sensor of the device;
  acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image;
  determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via causing (a) at least one notification to the user of the device, (b) at least one display of the device to prompt the user of the device to capture the at least one image while in proximity of the sensed position of the device, and (c) accepting a user input indicative of whether the user of the device desires to provide the at least one image; and
  facilitating access to the storage portion of the device for transmission of the at least one image upon accepting a user input associated with capturing the at least one image, at least one transmission of the at least one image occurring subsequent to capture of the at least one image.

44. A method, comprising:
transmitting an indication of a sensed position of a device, the position of the device sensed at least partially using at least one hardware-based position sensor of the device;
acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image;
determining whether to (i) accept the offer to facilitate the cloud-based storage of the at least one image to be accessible to one or more other users of the cloud-based storage, the at least one image to be captured by the device while in proximity of the sensed position of the device, and (ii) grant access to the storage portion of the device, at least partially via (a) at least one notification to the user of the device, (b) causing at least one display of the device to prompt the user of the device to capture the at least one image while in proximity of the sensed position of the device, and (c) accepting a user input indicative of whether the user of the device desires to provide the at least one image; and
facilitating access to the storage portion of the device for transmission of the at least one image upon accepting a user input associated with capturing the at least one image, at least one transmission of the at least one image occurring subsequent to capture of the at least one image,
wherein at least one of the transmitting, acquiring, determining, or facilitating is at least partially implemented using at least one processing device.

45. The system of claim 1, wherein circuitry configured for transmitting an indication of a sensed position of a device, the position of the device sensed at least partially using at least one hardware-based position sensor of the device comprises:
  circuitry configured for transmitting an indication of a sensed position of a device, the position of the device sensed at least partially using one or more of at least one GPS sensor of the device, at least one WiFi interface of the device, or at least one cellular transmission interface of the device.

46. The system of claim 1, wherein circuitry configured for transmitting an indication of a sensed position of a device, the position of the device sensed at least partially using at least one hardware-based position sensor of the device comprises:
  circuitry configured for transmitting at least one indication of at least one image having been captured by the device, including at least transmitting at least one indication of at least one position where the at least one image was captured, the at least one position where the at least one image was captured sensed at least partially using at least one hardware-based position sensor of the device.

47. The system of claim 1, wherein circuitry configured for acquiring an offer to facilitate cloud-based storage of at least one image to be accessible to one or more other users of the cloud-based storage, the at least one image to be captured by the device while in proximity of the sensed position of the device, in exchange for access to a storage portion of the device, the storage portion of the device storing the at least one image subsequent to a user of the device capturing the at least one image comprises:
  circuitry configured for receiving at least one notification that the user is at a place where the user can be the first to add a photo of the place to a public place image store maintained by an internet service.

* * * * *

UNITED STATES PATENT AND TRADEMARK OFFICE
CERTIFICATE OF CORRECTION

PATENT NO.       : 9,736,004 B2
APPLICATION NO.  : 13/692829
DATED            : August 15, 2017
INVENTOR(S)      : Edward K. Y. Jung et al.

It is certified that error appears in the above-identified patent and that said Letters Patent is hereby corrected as shown below:

On the Title Page

Item (60) is missing. Please add --Provisional application 61/720,245 filed 10/30/2012 and provisional application 61/720,874 filed 10/31/2012.--

In the Specification

In Column 1, Line 38 "application of which a currently application is entitled to the" should be --application of which a currently co-pending application is entitled to the--

In Column 1, Line 48 "application of which a currently application is entitled to the" should be --application of which a currently co-pending application is entitled to the--

In the Claims

In Column 60, Line 37, Claim 33 "image by at least one, at least partly based on a social" should be --image by at least one social--

Signed and Sealed this
Twenty-fourth Day of October, 2017

Joseph Matal
*Performing the Functions and Duties of the
Under Secretary of Commerce for Intellectual Property and
Director of the United States Patent and Trademark Office*